(12) United States Patent
Mukawa et al.

(10) Patent No.: US 8,396,339 B2
(45) Date of Patent: Mar. 12, 2013

(54) OPTICAL DEVICE, AND VIRTUAL IMAGE DISPLAY DEVICE

(75) Inventors: Hiroshi Mukawa, Kanagawa (JP); Katsuyuki Akutsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/453,071

(22) Filed: Apr. 23, 2012

(65) Prior Publication Data
US 2012/0206811 A1    Aug. 16, 2012

Related U.S. Application Data

(60) Continuation of application No. 13/279,997, filed on Oct. 24, 2011, now Pat. No. 8,213,755, which is a continuation of application No. 13/102,397, filed on May 6, 2011, now Pat. No. 8,073,296, which is a continuation of application No. 12/778,290, filed on May 12, 2010, now Pat. No. 8,023,783, which is a division of application No. 12/134,846, filed on Jun. 6, 2008, now Pat. No. 7,747,113, which is a division of application No. 10/555,180, filed as application No. PCT/JP2005/005761 on Mar. 28, 2005, now Pat. No. 7,418,170.

(30) Foreign Application Priority Data

Mar. 29, 2004    (JP) ................. 2004-097222

(51) Int. Cl.
*G02B 6/26* (2006.01)
*G02B 5/32* (2006.01)
*G02F 1/1335* (2006.01)

(52) U.S. Cl. ............... 385/31; 359/15; 359/16; 359/17; 359/18; 359/19; 359/31; 359/32; 359/33; 359/34; 349/11; 385/37; 385/129; 385/130; 385/131

(58) Field of Classification Search .................... 385/31, 385/37, 129–131; 359/15–19, 32–34; 349/11
See application file for complete search history.

(56) References Cited

U.S. PATENT DOCUMENTS

| | | | | |
|---|---|---|---|---|
| 4,248,093 A * | 2/1981 | Andersson et al. | ............. | 73/656 |
| 4,711,512 A * | 12/1987 | Upatnieks | .......................... | 345/7 |
| 5,119,454 A * | 6/1992 | McMahon | ....................... | 385/49 |
| 5,224,198 A * | 6/1993 | Jachimowicz et al. | ........ | 385/133 |
| 5,295,208 A * | 3/1994 | Caulfield et al. | ................ | 385/27 |
| 5,465,311 A * | 11/1995 | Caulfield et al. | ................ | 385/27 |
| 5,515,184 A * | 5/1996 | Caulfield et al. | ................ | 359/34 |
| 5,619,586 A * | 4/1997 | Sibbald | .......................... | 382/127 |

(Continued)

FOREIGN PATENT DOCUMENTS

| | | |
|---|---|---|
| EP | 0795775 | 9/1997 |
| JP | 2000-56259 | 2/2000 |

(Continued)

*Primary Examiner* — Brian Healy
*Assistant Examiner* — Guy Anderson
(74) *Attorney, Agent, or Firm* — SNR Denton US LLP

(57) ABSTRACT

A virtual image display device with an optical waveguide to guide, by internal total reflection, parallel pencil groups meeting a condition of internal total reflection, a first reflection volume hologram grating to diffract and reflect the parallel pencil groups incident upon the optical waveguide from outside and traveling in different directions as they are so as to meet the condition of internal total reflection inside the optical waveguide and a second reflection volume hologram grating to project the parallel pencil groups guided by internal total reflection inside the optical waveguide as they are from the optical waveguide by diffraction and reflection thereof so as to depart from the condition of internal total reflection inside the optical waveguide.

8 Claims, 35 Drawing Sheets

U.S. PATENT DOCUMENTS

| | | | |
|---|---|---|---|
| 5,682,255 A * | 10/1997 | Friesem et al. | 359/15 |
| 5,986,746 A | 11/1999 | Metz | |
| 6,169,613 B1 * | 1/2001 | Amitai et al. | 359/15 |
| 6,580,529 B1 | 6/2003 | Amitai et al. | |
| 6,825,987 B2 * | 11/2004 | Repetto et al. | 359/633 |
| 2003/0067685 A1 | 4/2003 | Niv | |
| 2003/0202247 A1 * | 10/2003 | Niv et al. | 359/569 |
| 2004/0004767 A1 | 1/2004 | Song | |
| 2005/0141066 A1 * | 6/2005 | Ouchi | 359/15 |

FOREIGN PATENT DOCUMENTS

| | | |
|---|---|---|
| JP | 2000-267042 | 9/2000 |
| JP | 2001-27739 | 1/2001 |
| JP | 2002-162598 | 6/2002 |
| JP | 09-90312 | 6/2008 |

\* cited by examiner

OPTICAL DEVICE, AND VIRTUAL IMAGE DISPLAY DEVICE

RELATED APPLICATION DATA

This application is a continuation of U.S. patent application Ser. No. 13/279,997, filed Oct. 24, 2011, which is a continuation of U.S. patent application Ser. No. 13/102,397, filed May 6, 2011, now issued as U.S. Pat. No. 8,073,296, which is a continuation of U.S. patent application Ser. No. 12/778,290, filed May 12, 2010, now issued as U.S. Pat. No. 8,023,783, which is a division of U.S. patent application Ser. No. 12/134,846, filed Jun. 6, 2008, now issued as U.S. Pat. No. 7,747,113, which is a division of U.S. patent application Ser. No. 10/555,180, filed Oct. 31, 2005, now issued as U.S. Pat. No. 7,418,170, the entirety all of which are incorporated herein by reference to the extent permitted by law. U.S. patent application Ser. No. 10/555,180 is the Section 371 National Stage of PCT/JP2005/005761. This application claims the benefit of priority to PCT International Application No. PCT/JP2005/005761, filed Mar. 28, 2005 and Japanese Patent Application No. 2004-097222 filed on Mar. 29, 2004.

BACKGROUND

The present invention generally relates to a virtual image display device for displaying a two-dimensional image enlarged through a virtual image optical system for viewing by an viewer, and more particularly to a slim optical device using a hologram optical element, especially, a reflection volume hologram grating, to guide an image light to be displayed to the pupil of the viewer and a virtual image display device using the optical device.

For viewing of a virtual image in a magnified form by a viewer, a virtual image viewing optical system as shown in FIG. 1 has been proposed.

In the virtual image viewing optical system shown in FIG. 1, an image light displayed on an image display device 301 is first incident upon an optical waveguide 302 having a transmission hologram lens 303 provided therein. While being formed by the transmission hologram lens 303 into a parallel light, the incident image light is deflected at an angle for total reflection inside the optical waveguide 302.

The optical waveguide 302 has also a transmission hologram grating 304 provided therein in line with the transmission hologram lens 303 at a predetermined distance from the latter. After traveling through the optical waveguide 302 while being totally reflected, the image light is incident upon the transmission hologram grating 304 by which the image light is diffracted again and projected in the parallel-light state to outside the optical waveguide 302 and toward the viewer's pupil.

For viewing of a virtual image in a magnified form by a viewer, there has also been proposed a virtual image viewing optical system as shown in FIG. 2.

In the virtual image viewing optical system shown in FIG. 2, an image light displayed on an image display element 401 is directed for incidence upon an optical waveguide 403 through a free-form surfaced prism 402. As shown in FIG. 3, the optical waveguide 403 includes a first HOE (Holographic Optical Element) 404 and second HOE 405 provided in an incident region Z1 at the incident side of the optical waveguide 403, and a third HOE 405 and fourth HOE 406 provided in an outgoing region Z2 at the outgoing side. The image light incident upon the optical waveguide 403 is continuously diffracted and reflected at the light-incident side of the optical waveguide 403, first HOE 404 provided on a surface opposite to the light-incident side and at the second HOE 405 provided at the light-incident side, and deflected inside the optical waveguide 304 to go at a larger angle than a critical angle for total reflection. More specifically, image light L1 incident upon the optical waveguide 403 is diffracted and reflected at a first incident-side diffraction-reflecting surface D1 of the first HOE 404 and then at a second incident-side diffraction-reflecting surface D2 of the second HOE 405 to go at a larger angle $\alpha_2$ than the critical angle. It should be noted that when the image light L1 is diffracted and reflected at the first diffraction-reflecting surface D1, it will go at a smaller angle $\alpha_1$ than the critical angle.

The image light L2 directed at the larger angle than the critical angle inside the optical waveguide 403 travels while being totally reflected inside the optical waveguide 403, and is then continuously diffracted and reflected at a first outgoing-side diffraction-reflecting surface D3 of a fourth HOE 407 and then at a second outgoing-side diffraction-reflecting surface D4 of a third HOE 406 to go at a smaller angle $\alpha_3$ than the critical angle and outgo toward the optical pupil of the viewer outside the optical waveguide 403.

However, the virtual image viewing optical system shown in FIG. 1 is disadvantageous as will be described below:

Firstly, in the virtual image viewing optical system shown in FIG. 1, divergent light projected from an image display device 301 is incident directly upon the transmission hologram lens 303 in the optical waveguide 302. When the distance between the image display device 301 and transmission hologram lens 303 is increased, namely, when the focal distance of the transmission hologram lens 303 is increased, for an increased magnification of the optical system, the diameter of the pupil 305 cannot be increased because the transmission hologram lens 303 has only a relatively small diffraction acceptance angle.

Secondly, since the interference fringe of the transmission hologram lens 303 has a complicated structure having a spherical phase component, it is difficult to combine or laminate the interference fringes together for a larger diffraction acceptance angle and the lens 303 cannot be designed to diffract light rays equal in wavelength and incident angle to each other with different efficiencies at the same diffraction angle.

Thirdly, in the virtual image viewing optical system shown in FIG. 1, since the transmission hologram lens 303 provided on the optical waveguide 302 diffracts image light rays coming from the image display device 301 while forming the light rays into a parallel pencil of rays, that is, while generating an optical power, a large monochromatic eccentric aberration will be caused, which will also lead to a reduced resolution of an image projected on the pupil.

Fourthly, the virtual image viewing optical system shown in FIG. 1 uses the transmission hologram grating 304 to correct achromatic aberration occurring in the transmission hologram lens 303. Since light rays incident upon the transmission hologram grating 304 is deflected only in the direction in the plane of the drawing in FIG. 1, aberration occurring in a direction perpendicular to at least the drawing plane cannot be canceled. The diffraction-caused chromatic aberration takes place because the two transmission holograms (transmission hologram lens 303 and transmission hologram grating 304) provided in the optical waveguide 302 are different from each other and there can be used substantially only a light source of which the waveband is narrow, which is a large constraint to this conventional virtual image viewing optical system.

A simulation was actually made by retracing the light incident upon the pupil in the virtual image viewing optical system shown in FIG. 1. The result of simulation shows that even when the chromatic aberration was corrected by the two transmission holograms, it was found that a wavelength shift of ±2 nm resulted in a shift of ±30 μm of image light on the image display device 301.

If the two transmission holograms are identical transmission volume hologram gratings having no optical power, for example, another problem described below will take place.

It is well known that at a constant incident angle, the diffraction acceptance waveband of the transmission volume hologram is broader than that of the reflection volume hologram. Therefore, incase the waveband of a light source is broad or in case the wavelength interval of a light source for each of RGB (R: Red light; G: Green light; B: Blue light) that are three primary colors of light is narrow (in case the waveband of each color light is broad), chromatic dispersion due to vast diffraction, that is, diffraction chromatic dispersion will take place.

Even a transmission volume hologram prepared for green (of 550 nm in central wavelength), for example, has a diffraction efficiency of about 10% with a waveband of 400 to 630 nm and will partially diffract light from a blue LED (Light Emitting Diode) (of 410 to 490 nm in light-emitting wavelength) and light from a red LED (of 600 to 660 nm in light-emitting wavelength).

The chromatic aberration due to the diffraction chromatic dispersion can be canceled by two holograms equal in grating pitch to each other. However, in case the chromatic dispersion made by one of the holograms is larger, a pencil of rays traveling inside an optical waveguide will spread largely, resulting in a following problem. When the largely spread pencil of rays having been diffracted by the first hologram and traveled inside the optical waveguide is diffracted at the second hologram and projected from the optical waveguide, it will spread largely in the traveling direction on the basis of its wavelength and lead to a deteriorated color uniformity of a virtual image on the viewer's pupil.

On the other hand, in the reflection volume hologram, the diffraction acceptance waveband one interference fringe has is narrow. Therefore, in case image light is colored, the colors (total reflection angle inside the optical waveguide) can be equalized in diffraction angle by laminating hologram layers together for each of RGB or combining the interference fringe of each of RGB.

On the contrary, with a constant incident wavelength, the diffraction acceptance angle of the transmission volume hologram is smaller than that of the reflection volume hologram and thus it will be difficult to increase the diameter of the pupil 305 or field angle.

Also, since in the virtual image viewing optical system shown in FIGS. 2 and 3, an image of the image display element 401 is intermediate-formed inside the optical waveguide 403, the first HOE 404, second HOE 405, third HOE 406 and fourth HOE 407 should have an optical power in an eccentric layout. Therefore, also in this virtual image viewing optical system, eccentric aberration will occur as in the virtual image viewing optical system shown in FIG. 1.

In the virtual image viewing optical system shown in FIGS. 2 and 3, the free-form surfaced prism 402, first HOE 404, second HOE 405, third HOE 406 and fourth HOE 407 are provided axial-symmetrically with respect to each other to reduce the eccentric aberration. However, since the upper limit of the diffraction efficiency of each HOE is substantially 70 to 80%, the total of the diffraction efficiency of the four HOEs is the fourth power of 70 to 80% and thus the diffraction efficiency will be considerably lower.

As above, in a hologram having a complicated interference patter, it is difficult to increase the diffraction acceptance of the interference fringe by laminating hologram layers together or combining the interference fringe. Therefore, the pupil diameter cannot be increased.

Also, since convergent light (down to intermediate image formation) or divergent light (after the intermediate image formation) travels inside the optical waveguide 403, a pencil of rays not diffracted by the first reflection and diffraction but totally reflected again in the plane of the optical waveguide 403 cannot be used a any image display light or image light any longer. Therefore, the conventional virtual image viewing optical system can neither use light with any improved efficiency nor enlarge the viewable range.

SUMMARY OF THE INVENTION

Accordingly, the present invention has an object to overcome the above-mentioned drawbacks of the related art by providing an optical device and virtual image viewing optical system in which the image resolution is increased by eliminating or reducing monochromatic aberration and diffraction chromatic aberration, light is diffracted with a higher efficiency by reducing the number of hologram elements used, color of display image is uniformized and pupil diameter is increased.

The above object can be attained by providing an optical device including according to the present invention:

an optical waveguide to guide groups of pencils of rays meeting a condition of internal total reflection inside the optical waveguide by internal total reflection of the parallel pencil groups;

a first reflection volume hologram grating to diffract and reflect the parallel pencil groups incident upon the optical waveguide from outside and traveling in different directions as they are so as to meet the condition of internal total reflection inside the optical waveguide; and a second reflection volume hologram grating to project the parallel pencil groups guided by internal total reflection inside the optical waveguide as they are from the optical waveguide by diffraction and reflection thereof so as to depart from the condition of internal total reflection inside the optical waveguide, some parallel pencils of the parallel pencil groups guided through the optical waveguide being totally reflected different numbers of times for a period from external incidence upon the optical waveguide until outgoing from the optical waveguide.

Also the above object can be attained by providing a virtual image viewing optical system including according to the present invention:

an image display element;

a collimating optical system to form a pencil of rays coming from each pixel of the image display element into parallel pencil groups traveling in different directions;

an optical waveguide to guide, by internal total reflection, parallel pencil groups meeting a condition of internal total reflection inside the optical waveguide;

a first reflection volume hologram grating to diffract and reflect the parallel pencil groups incident upon the optical waveguide from outside and traveling in different directions as they are so as to meet the condition of internal total reflection inside the optical waveguide; and a second reflection volume hologram grating to project the parallel pencil groups guided by internal total reflection inside the optical waveguide as they are from the optical waveguide by diffraction and reflection thereof so as to depart from the condition of internal total reflection inside the optical waveguide, some parallel pencils of the parallel pencil groups guided through the optical waveguide being totally reflected different numbers of times for a period from external incidence upon the optical waveguide until outgoing from the optical waveguide.

Also the above object can be attained by providing a virtual image viewing optical system including according to the present invention:

a light source to emit a pencil of rays;

a collimating optical system to form the pencil of rays from the light source into a parallel pencil;

a scanning optical system to form, by horizontal and vertical scan, the parallel pencil into parallel pencil groups traveling in different directions;

an optical waveguide to guide, by internal total reflection, the parallel pencil groups meeting a condition of internal total reflection inside the optical waveguide;

a first reflection volume hologram grating to diffract and reflect the parallel pencil groups incident upon the optical waveguide from the canning optical system and traveling in different directions as they are so as to meet the condition of internal total reflection inside the optical waveguide; and a second reflection volume hologram grating to project the parallel pencil groups guided by internal total reflection inside the optical waveguide as they are from the optical waveguide by diffraction and reflection thereof so as to depart from the condition of internal total reflection inside the optical waveguide, some parallel pencils of the parallel pencil groups guided through the optical waveguide being totally reflected different number of times for a period from external incidence upon the optical waveguide until outgoing from the optical waveguide.

According to the present invention, parallel pencil groups incident upon the optical waveguide from outside and traveling in different directions is diffracted and reflected by the first reflection volume hologram grating as they are so as to meet the condition of internal total reflection inside the optical waveguide, and the parallel pencil groups guided by total reflection inside the optical waveguide is projected by diffraction and reflection by the second reflection volume hologram grating as they are from the optical waveguide so as to depart from the condition of internal total reflection inside the optical waveguide.

At this time, since some parallel pencils of the parallel pencil groups guided by internal total reflection inside the optical waveguide are incident upon the optical waveguide from outside and totally reflected different number of times for a period until outgoing from the optical waveguide, the optical waveguide can be formed very thin and sufficiently large along the length thereof.

Therefore, the virtual image optical device according to the present invention can be designed more lightweight and compact, and can be produced with less costs. Also, in case this virtual image optical device is used as an HMD (Head Mounted Display), possible discomfort given to the user when it is mounted on the user's head can considerably be reduced.

Also, according to the present invention, diffraction can be made with an improved efficiency since only two reflection volume hologram gratings, first and second, are used. Further, since the reflection volume hologram grating is smaller in diffraction acceptance wavelength and larger in diffraction acceptance angle than the transmission volume hologram grating, so a display image can be uniformized in colors and the pupil diameter can be increased.

Further, since the first and second reflection volume hologram gratings used in the present invention do not act as any lens, so the monochromatic eccentric aberration can be eliminated. Also, since the diffraction acceptance wavelength is small and thus the diffraction chromatic aberration can be reduced, an image of a high resolution can be displayed on the viewer's pupil.

Moreover, according to the present invention, the interference fringe recorded on the first reflection volume hologram grating is equal in pitch on the hologram surface to that recorded on the second reflection volume hologram grating. Therefore, parallel rays of light incident at the same wavelength and incident angle can be prevented from being diffracted and reflected at different angles of diffraction and a virtual image of a high resolution can be displayed on the viewer's pupil.

Also, since the interference fringe recorded on each of the first and second reflection volume hologram gratings used in the present invention is a simple diffraction grating in which the interference fringe is simple, so the interference fringes can easily be combined together and the hologram layers each having the interference fringe recorded thereon can be laminated together. Thus, it is possible to diffract and reflect parallel pencil groups different in wavelength from each other, for example, RGB (R: Red light G: Green light; B: Blue light) as three primary colors of light, with an increased diffraction acceptance angle and without occurrence of diffraction chromatic aberration and reduction of color gamut.

These objects and other objects, features and advantages of the present invention will become more apparent from the following detailed description of the best mode for carrying out the present invention when taken in conjunction with the accompanying drawings.

DETAILED DESCRIPTION OF THE PRESENTLY PREFERRED EMBODIMENTS

The present invention will be described in detail below concerning an optical device and virtual image display device as the embodiments thereof with reference to the accompanying drawings.

Prior to description of the embodiments of the present invention, the characteristics of the reflection volume hologram grating used in each of the embodiments will be described in comparison with those of the transmission volume hologram grating used in the conventional optical devices and virtual image display devices.

As having previously been described concerning the conventional technology, the reflection volume hologram grating is smaller in diffraction acceptance waveband and diffraction acceptance angle than the transmission volume hologram grating.

Figure 1:
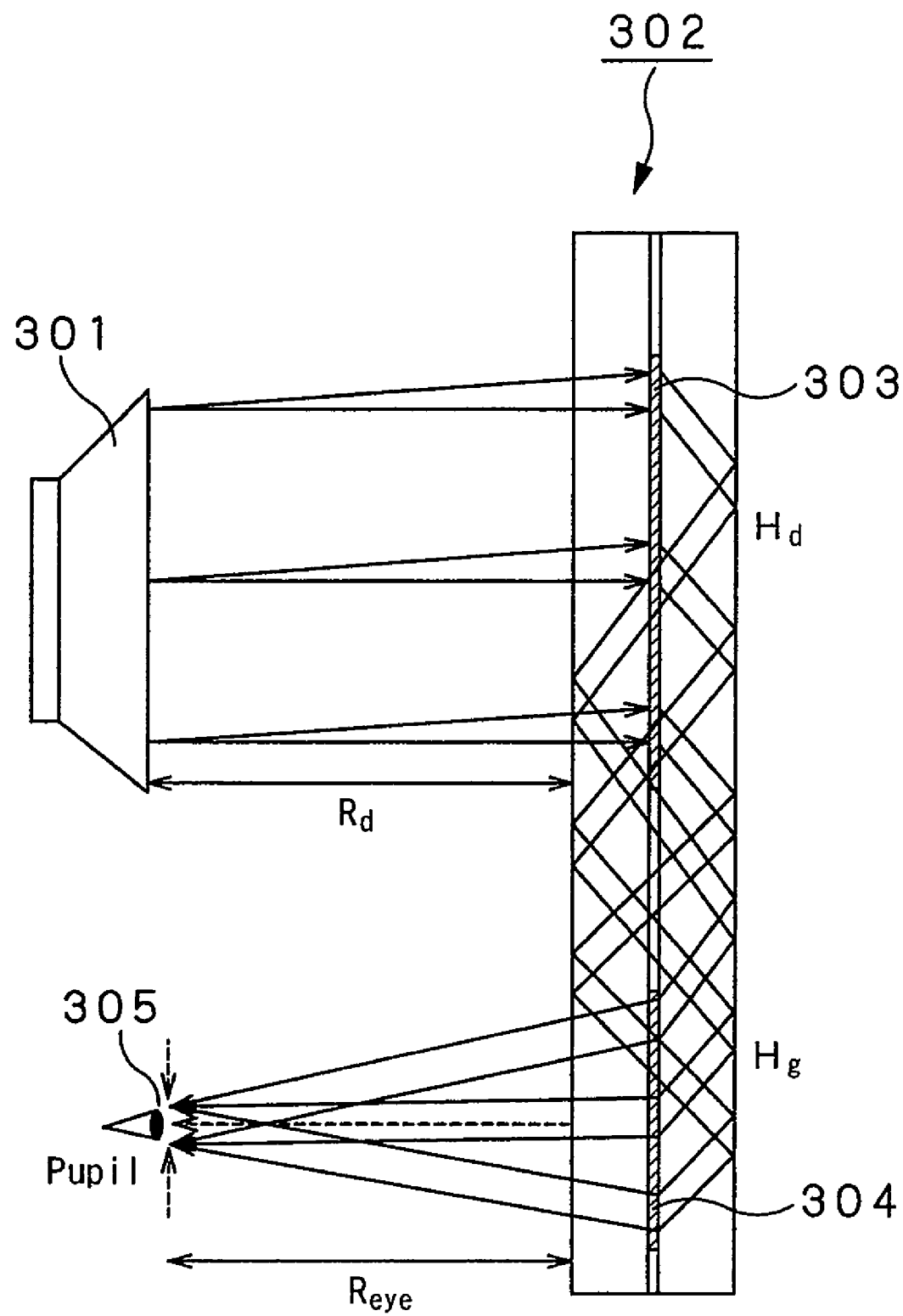
FIG. 1 is a side elevation of a conventional virtual image viewing optical system.
Figure 2:
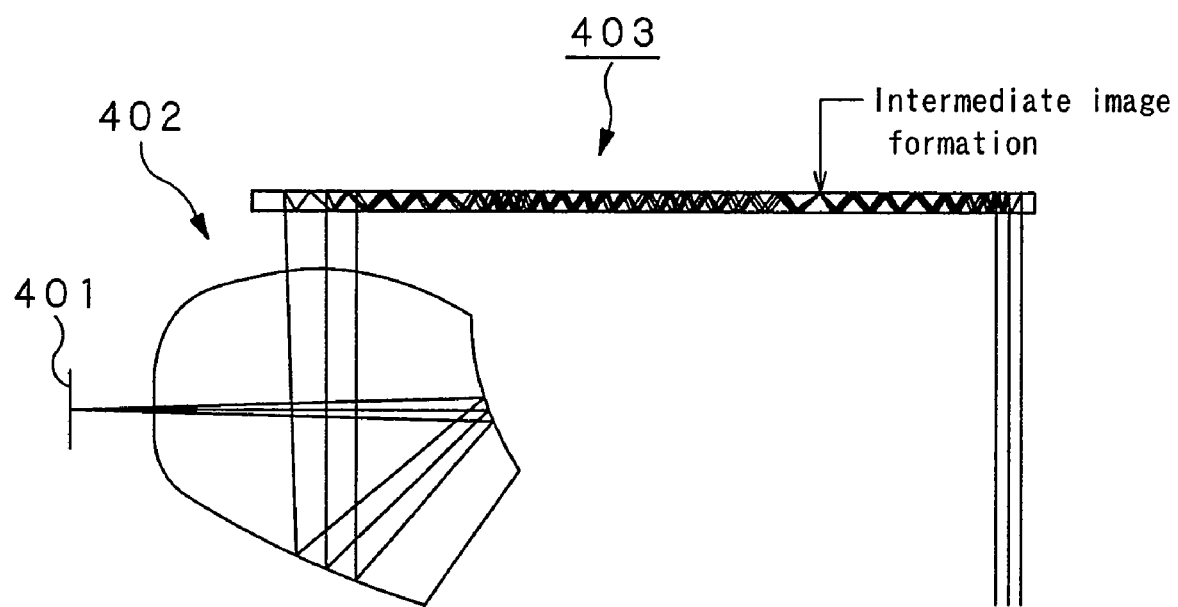
FIG. 2 is also a side elevation of another conventional virtual image viewing optical system.
Figure 3:
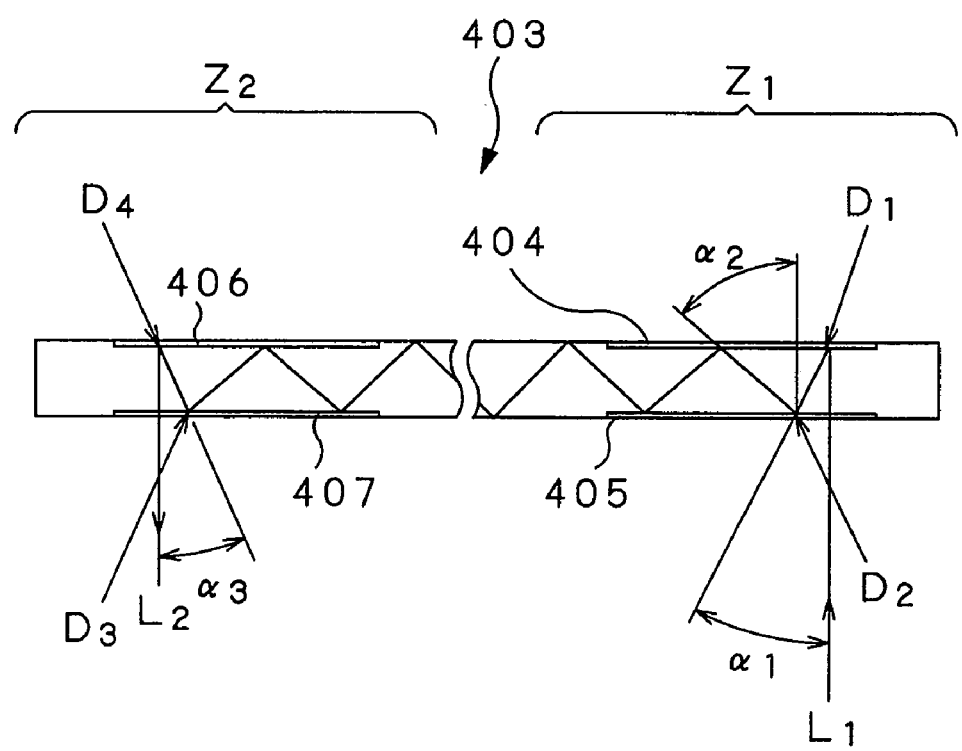
FIG. 3 is a side elevation of an optical waveguide included in the conventional virtual image viewing optical system shown in FIG. 2.
Figure 4:
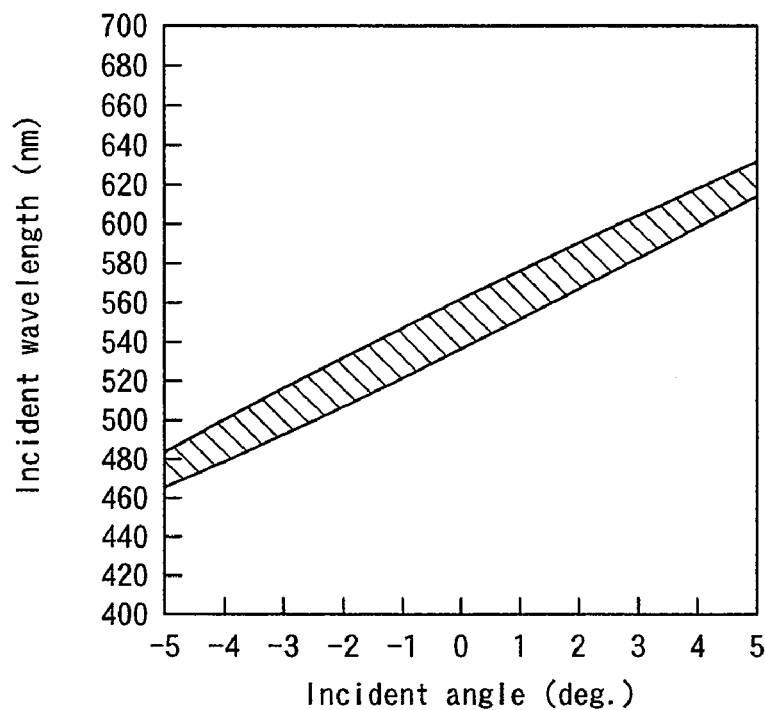
FIG. 4 shows a diffraction efficiency distribution of a transmission volume hologram grating.

The above will be described in detail herebelow with reference to FIGS. 4 to 7. FIG. 4 shows the diffraction efficiency distribution of the transmission volume hologram grating that transmits, by diffraction, vertically incident parallel pencils of 550 nm in wavelength at an angle of 45 deg. in a medium of 1.52 in refractive index, and FIG. 5 shows the diffraction efficiency distribution of the reflection volume hologram grating that diffracts and reflects parallel pencil groups (of 400 to 700 nm in wavelength) incident at an angle of vertical incidence ±5 deg. at an angle of 45 deg. in a medium of 1.52 in refractive index.

Figure 5:
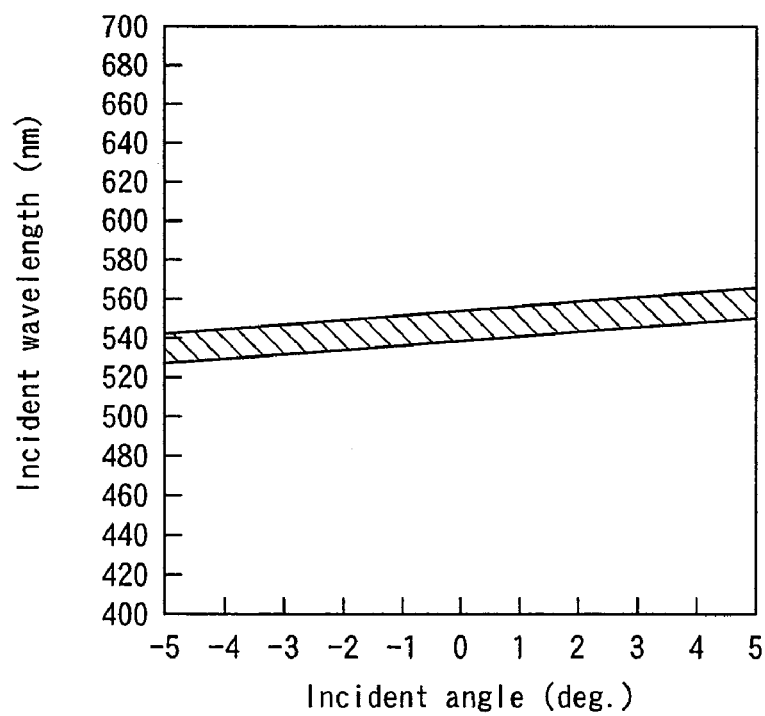
FIG. 5 shows a diffraction efficiency distribution of a reflection volume hologram grating.

In FIGS. 4 and 5, the hatched portion indicates a region defined by an incident wavelength and incident angle that assure the diffraction efficiency. The refractive index modulation of each hologram was selected to be 0.05, and a thickness of the hologram layer was selected for a peak diffraction efficiency of 99% or more.

As seen from the diffraction efficiency distributions of the transmission and reflection volume hologram gratings shown in FIGS. 4 and 5, respectively, the variation of a wavelength that can be diffracted by the reflection volume hologram grating varies less than that by the transmission volume hologram grating in the same range of incident angle or the diffraction acceptance angle in the reflection volume hologram grating is larger than that in the transmission volume hologram grating in the same range of incident wavelength.

Figure 6:
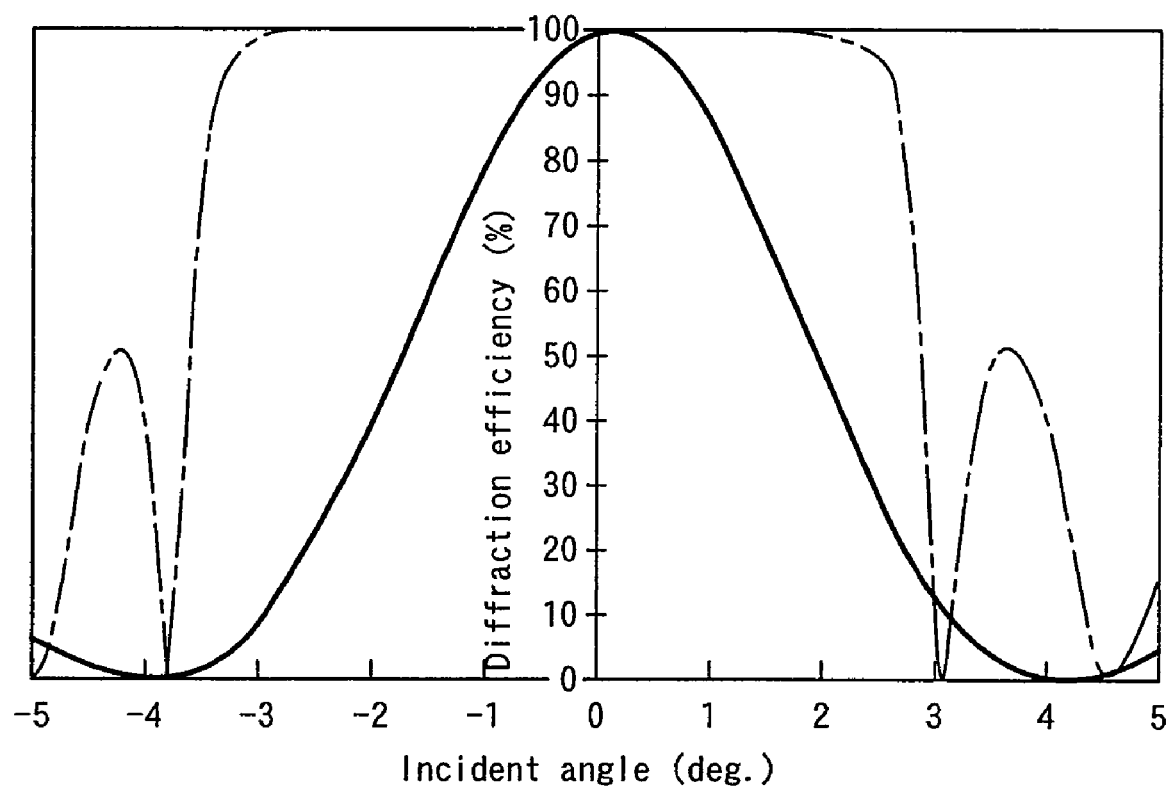
FIG. 6 shows the dependency on incident angle of the diffraction efficiency of the transmission and reflection volume hologram gratings.
Figure 7:
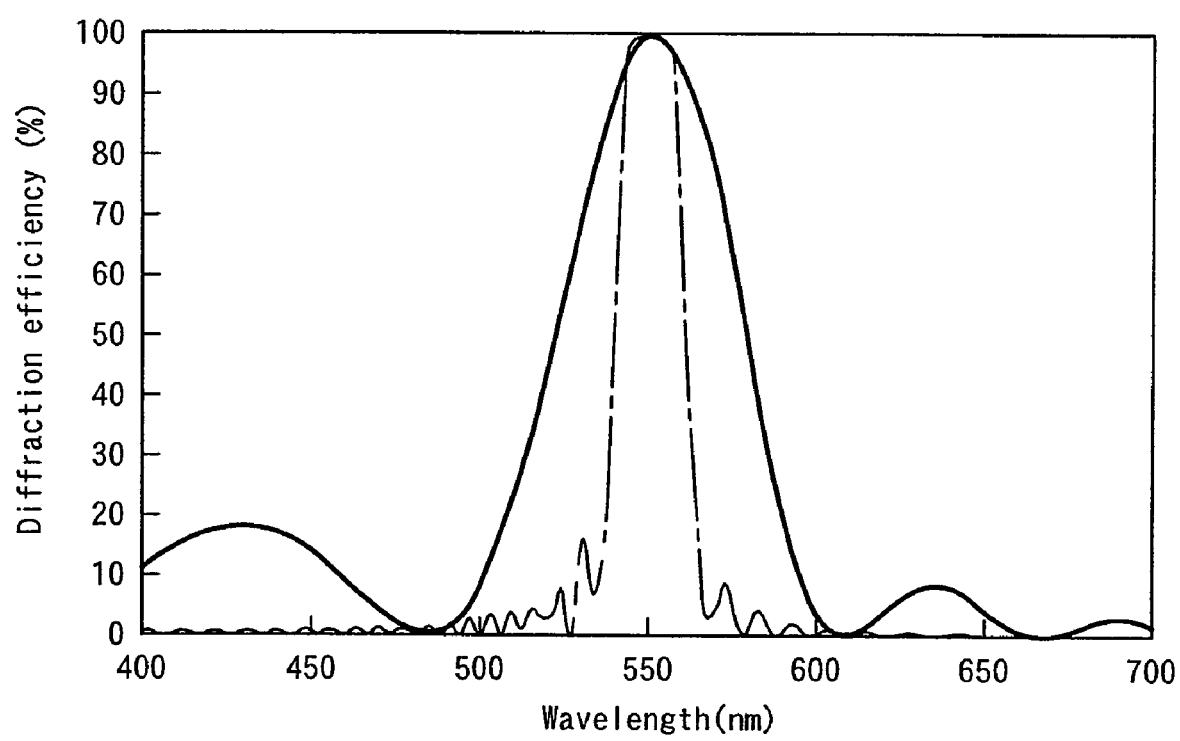
FIG. 7 shows the dependency on incident wavelength of the diffraction efficiency of the transmission and reflection volume hologram gratings.

FIGS. 6 and 7 show, in other forms, the diffraction efficiency distributions shown in FIGS. 4 and 5. FIG. 6 shows the dependency on incident angle (incident wavelength of 550 nm) of the diffraction efficiency of the transmission and reflection volume hologram gratings. It should be noted that in FIG. 6, the solid line indicates the dependency on incident angle of the transmission volume hologram grating while the dashed line indicates the dependency on incident angle of the reflection volume hologram grating. As apparent from FIG. 6, the reflection volume hologram grating is larger in diffraction acceptance angle than the transmission volume hologram grating.

Also, FIG. 7 shows the dependency on incident wavelength (incident angle of 0 deg.) of the diffraction efficiency of the transmission and reflection volume hologram gratings. It should be noted that in FIG. 7, the solid line indicates the dependency on incident wavelength of the transmission volume hologram grating while the dashed line indicates the dependency on incident wavelength of the reflection volume hologram grating. As apparent from FIG. 7, the reflection volume hologram grating is larger in diffraction acceptance wavelength than the transmission volume hologram grating.

Based on the general characteristics of the reflection volume hologram grating, there will be explained the first to sixth embodiments given herein as the best modes for carrying out the present invention.

First Embodiment

Figure 8:
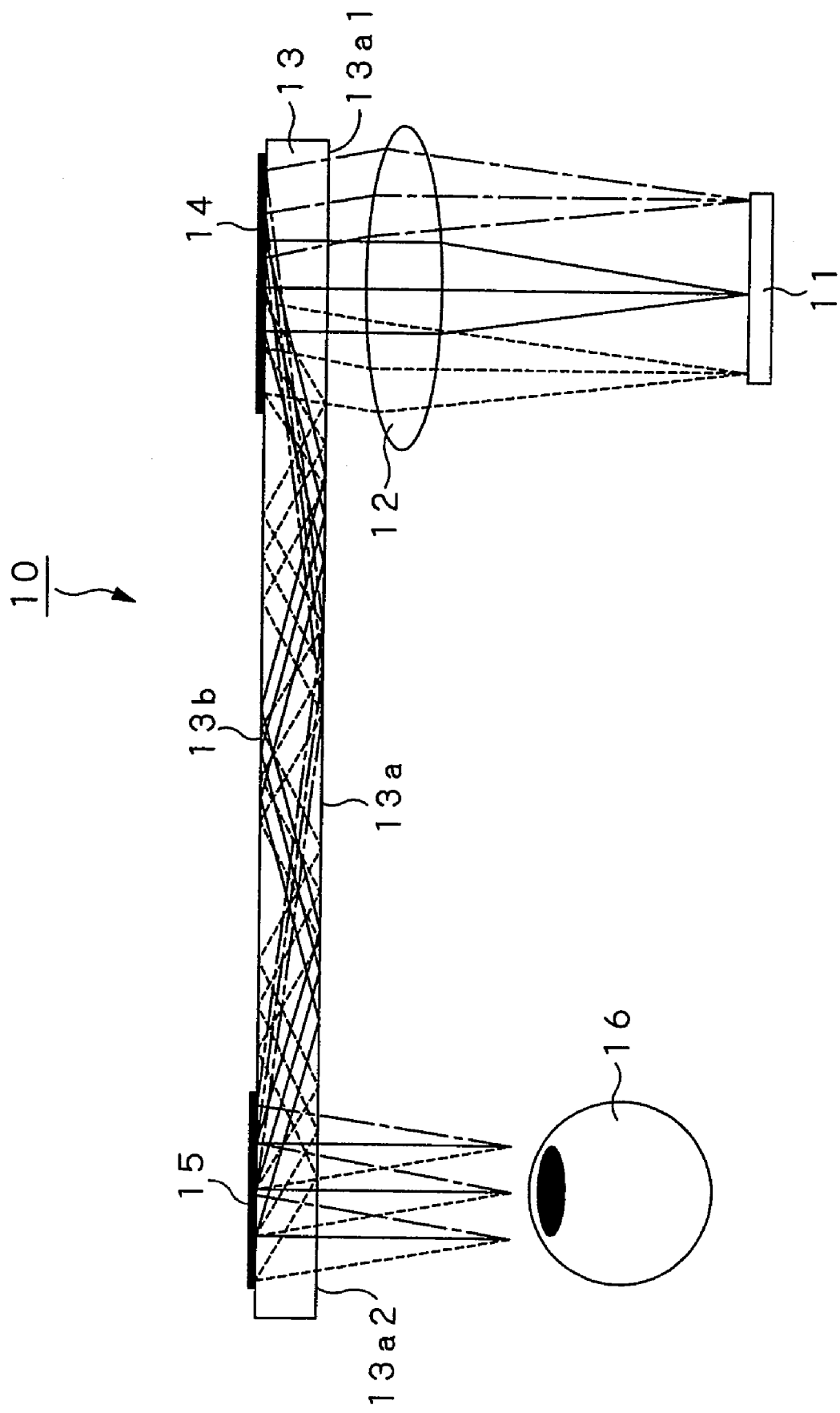
FIG. 8 is a side elevation of a virtual image display device as a first embodiment of the present invention.

FIG. 8 shows a virtual image display device as a first embodiment of the present invention. The virtual image display device is generally indicated with a reference numeral 10. The virtual image display device 10 includes an image display element 11 to display an image, and a virtual image optical system to guide incident display light from the image display element 11 to a pupil 16 of the viewer.

The image display element 11 is for example an organic EL (Electro Luminescence) display, inorganic EL display, liquid crystal display (LCD) or the like.

The virtual image optical system includes a collimating optical system 12, optical waveguide 13, and a first reflection volume hologram grating 14 and second reflection volume hologram grating 15 provided on the optical waveguide 13.

The collimating optical system 12 receives an incident pencil from each pixel of the image display element 11 and forms the pencils into parallel pencil groups different in angle of field from each other. The parallel pencil groups projected from the collimating optical system 12 and different in angle of field from each other are incident upon the optical waveguide 13.

The optical waveguide 13 is a slim, parallel, flat optical waveguide including mainly an optical surface 13a having provided at one end thereof a light-incident port 13a1 upon which there are incident parallel pencil groups projected from the collimating optical system 12 and different in angle of field from each other and at the other end a light-outgoing port 13a2 from which the light is projected, and an optical surface 13b opposite to the optical surface 13a.

On the optical surface 13b of the optical waveguide 13, there are provided the first reflection volume hologram grating 14 in a position where it is opposite to the light-incident port 13a1 at the optical surface 13a and the second reflection volume hologram grating 15 in a position where it is opposite to the light-outgoing port 13a2 at the optical surface 13a.

Figure 9:
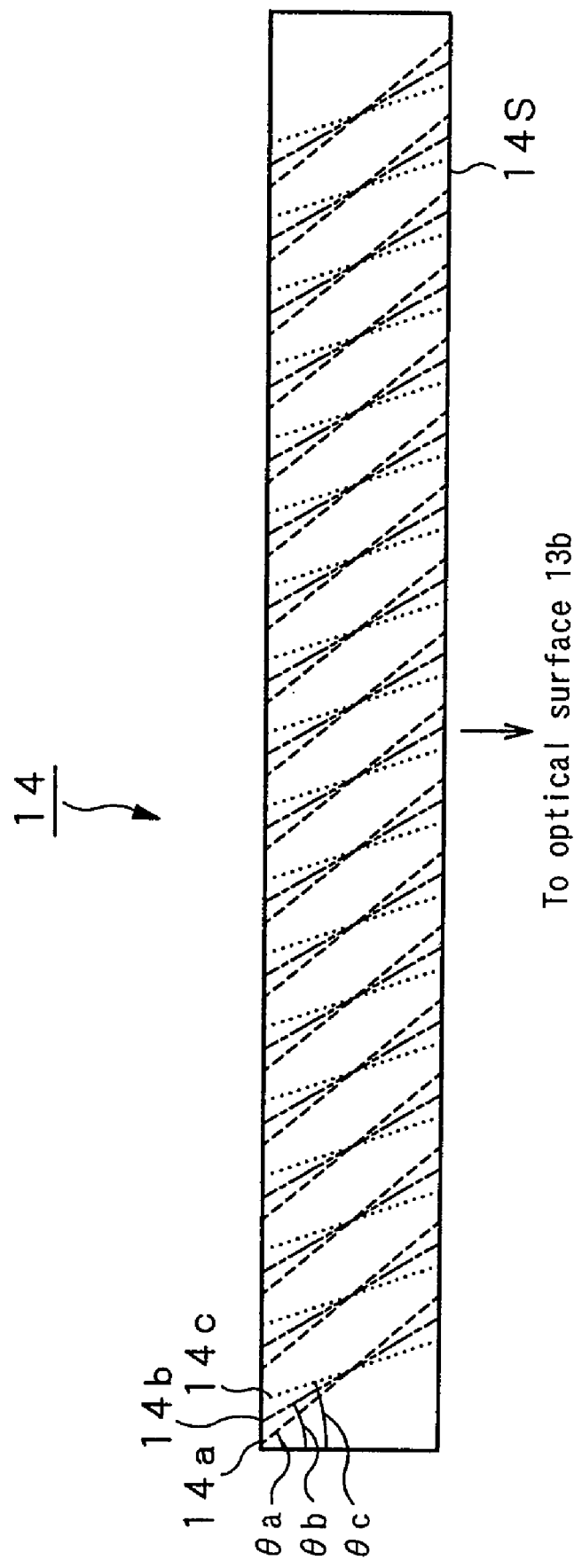
FIG. 9 is a side elevation of a first reflection volume hologram grating included in the image display device in FIG. 8.
Figure 10:
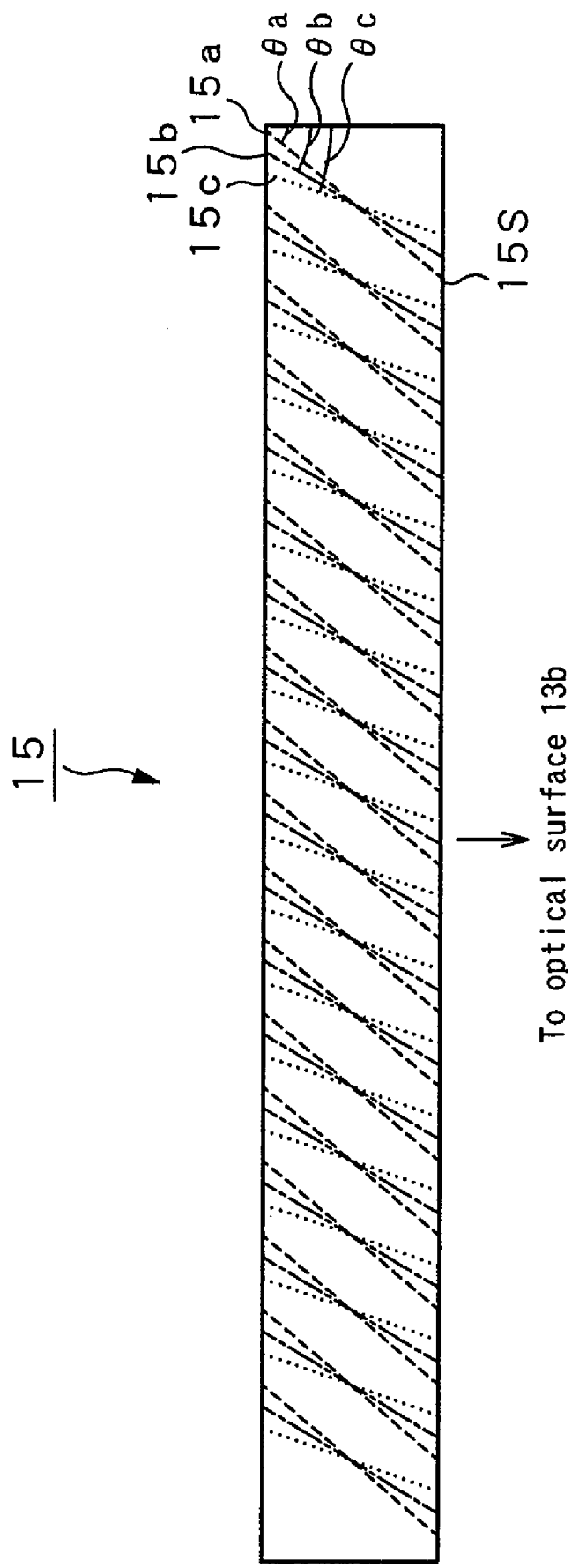
FIG. 10 is a side elevation of a second reflection volume hologram grating included in the image display device in FIG. 8.

FIGS. 9 and 10 show the first and second reflection volume hologram gratings 14 and 15 each having interference fringes recorded thereon. As shown in FIGS. 9 and 10, the first and second reflection volume hologram gratings 14 and 15 have recorded on hologram surfaces 14S and 15S thereof, respectively, three types of interference fringes different in slant angle that is an angle of the interference fringes slanting from each other. A combination of the three types of interference fringes are recorded with the same pitch on the hologram surfaces 14S and 15S, respectively. Each of the first and second reflection volume hologram gratings 14 and 15 is a monochromatic hologram grating of about 20 nm in diffraction acceptance waveband and has the diffraction acceptance angle thereof increased by recording the three types of interference fringes difference in slant angle from each other as above.

As shown in FIG. 9, the reflection volume hologram grating 14 has a plurality of interference fringes 14a, 14b and 14c recorded thereon at slant angles θa, θb and θc, respectively, with the same pitch independently of the locations of the interference fringes. Similarly, the second reflection volume hologram grating 15 shown in FIG. 10 has a plurality of interference fringes 15a, 15b and 15c at slant angles θa, θb and θc, respectively, with the same pitch. Therefore, the first and second reflection volume hologram gratings 14 and 15 have their interference fringes disposed on the optical surface 13b of the optical waveguide 13 to be symmetrical with respect to a plane perpendicular to the optical surface 13b.

The parallel pencil groups incident upon the light-incident port 13a1 of the optical waveguide 13 and different in angle of field from each other are incident upon the above-mentioned first reflection volume hologram grating 14 and diffracted and reflected as they are. The parallel pencil groups thus diffracted and reflected will travel while being repeatedly totally reflected between the optical surfaces 13a and 13b of the optical waveguide 13 and will be incident upon the above-mentioned second reflection volume hologram grating 15.

The length, and thickness between the optical surfaces 13a and 13b, of the optical waveguide 13 are set to provide such an optical path length that parallel light beans different in angle of field from each other and traveling inside the optical waveguide 13 are totally reflected different numbers of times correspondingly to their angles of field until they arrive at the second reflection volume hologram grating 15.

More specifically, ones of the parallel pencils in group incident upon the optical waveguide 13 while being slanted toward the second reflection volume hologram grating 15, that is, parallel pencils incident at a larger angle, are reflected a smaller number of times than parallel pencils incident upon the optical waveguide 13 while not being slanted toward the second reflection volume hologram grating 15, that is, parallel pencils incident at a smaller angle for the reason that the parallel pencil groups incident upon the optical waveguide 13 will be different in angle of field from each other. Namely, since the parallel pencils are incident upon the first reflection volume hologram grating 14 at different angles and thus projected at different angles of diffraction, they are totally reflected at different angles. Thus, when the optical waveguide 13 is designed slim having a sufficient length, the parallel pencils will be reflected different numbers of times, respectively.

A group of parallel pencils different in angle of field from each other and incident upon the second reflection volume hologram grating 15 are diffracted and reflected to depart from the condition of total reflection, projected at the light-outgoing port 13a2 of the optical waveguide 13, and incident upon the pupil 16 of the viewer.

As above, the second reflection volume hologram grating 15 is provided on the optical surface 13b of the optical waveguide 13 so that the interference fringes recorded thereon take the same shape as that of the interference fringes on the first reflecting volume hologram grating 14, rotated 180 deg. on the hologram surface. Therefore, since the parallel pencil groups to be reflected by the second reflection volume hologram grating 15 will be reflected at an angle equal to the angle of incidence upon the first reflecting volume hologram grating 14, a display image will be displayed on the pupil 16 with a high resolution without blurring.

Provided with the first and second reflection volume hologram gratings 14 and 15 that do not act as any lens, the virtual image display device 10 can eliminate and reduce monochromatic eccentric aberration and diffraction chromatic aberration.

Note that although the first and second reflection volume hologram gratings 14 and 15 are disposed for their hologram surfaces 14S and 15S to be parallel to the optical surface 13b of the optical waveguide 13, the present invention is not limited to this geometry but they may be disposed for their hologram surfaces 14S and 15S to be at a predetermined angle in relation to the optical surface 13b.

Second Embodiment

Figure 11:
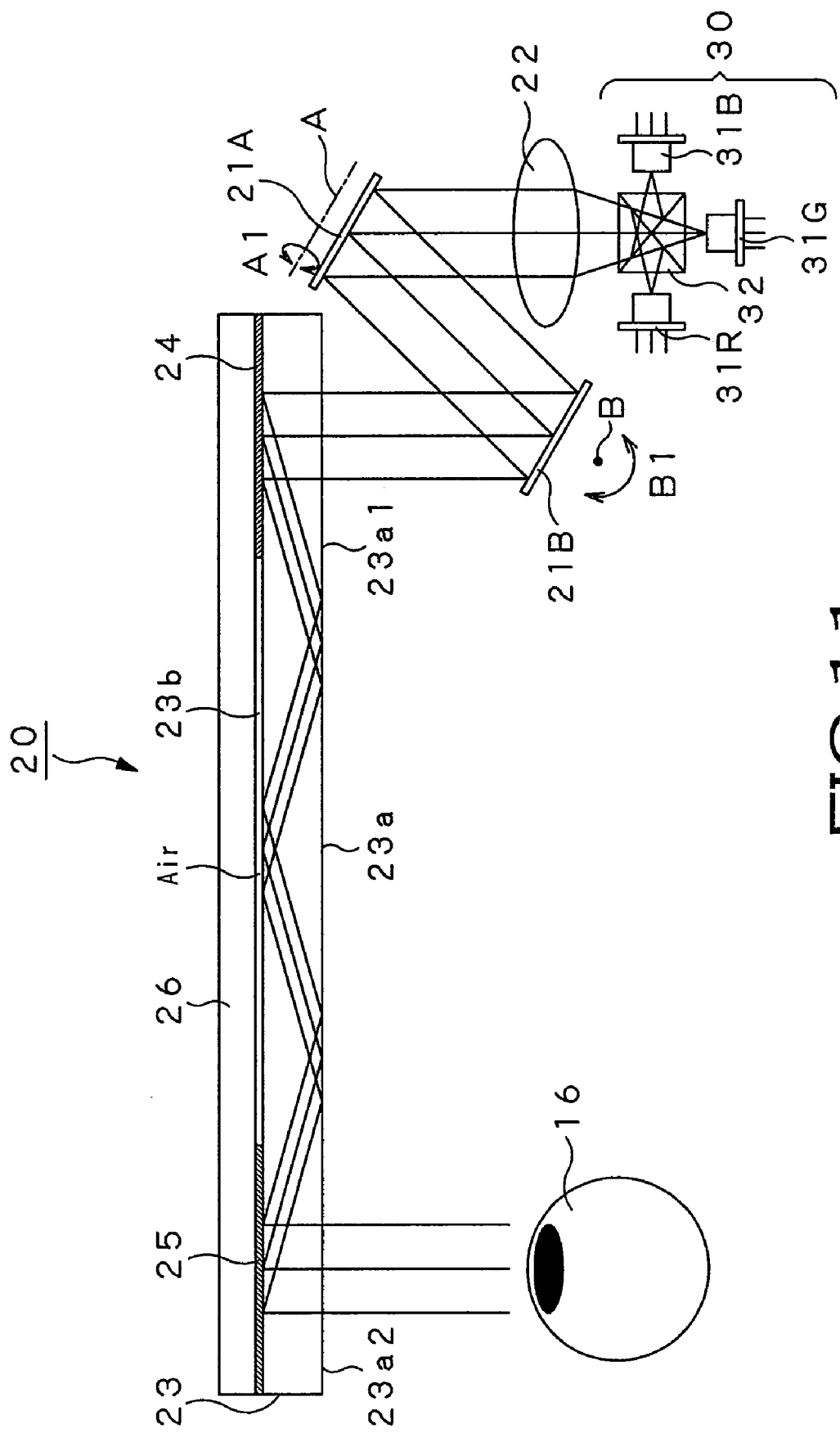
FIG. 11 is a side elevation of a virtual image display device as a second embodiment of the present invention.

FIG. 11 shows a virtual image display device as a second embodiment of the present invention. The virtual image display device is generally indicated with a reference numeral 20. The virtual image display device 20 as the second embodiment of the present invention displays a virtual image of a color image. It should be noted that in FIG. 11, only light rays directed at the central angle of field are illustrated mainly for easy viewing of the drawing.

The virtual image display device 20 includes an illumination optical system 30 forming a light source, and a virtual image optical system to guide incident illumination light from the illumination optical system 30 to the pupil 16 of the viewer.

The illumination optical system 30 includes an LED (light-emitting diode) light source 31R to emit red light, LED light source 31G to emit green light, LED light source 31B to emit blue light, and a color synthesizing prism 32.

Red light, green light and blue light emitted from the LED light sources 31R, 31G and 31B are blended by the color synthesizing prism 32 that is a cross prism into white light, and projected to the virtual image optical system.

The virtual image optical system includes a collimating optical system 22 to form illumination light emitted from the illumination optical system 30 into a parallel pencil, rotating mirrors 21A and 21B to make spatial modulation of the parallel pencil from the collimating optical system 22, optical waveguide 23 receive the illumination light having subjected to the spatial modulation in the rotating mirrors 21A and 21B, and a first reflection volume hologram grating 24 and second reflection volume hologram grating 25 provided on the optical waveguide 23.

The collimating optical system 22 forms the illumination light into a parallel pencil and emits the latter to the rotating mirror 21A that works as a downstream spatial modulator.

The rotating mirrors 21A and 21B function each as a spatial modulator to make spatial modulation of the parallel pencils from the collimating optical system 22. As shown in FIG. 11, the rotating mirror 21A rotates about an axis of rotation A parallel to the plane of the drawing in the direction of arrow A1. The rotating mirror 21B rotates about an axis of rotation B perpendicular to the axis of rotation A and normal to the plane of the drawing in the direction of arrow B1. The rotating mirrors 21A and 21B have the rotation thereof controlled by a microcomputer (not shown) correspondingly to an image to be displayed.

The parallel pencil emitted from the collimating optical system 22 to the rotating mirror 21A is reflected toward the rotating mirror 21B while being scanned by the rotating prism 21A as it is in a direction perpendicular to the plane of the drawing. The parallel pencil incident upon the rotating mirror 21B is reflected as parallel pencil groups different in traveling direction from each other toward the optical waveguide 23 while being scanned as it is in a direction parallel to the plane of the drawing.

Note that specifically, the rotating mirrors 21A and 21B form together a scanning optical system that forms the parallel pencils emitted from the collimating optical system 22 into parallel pencil groups traveling in different directions by scanning the parallel pencils from the collimating optical system 22.

The optical waveguide 23 is a slim, parallel, flat optical waveguide including mainly an optical surface 23*a* having provided at one end thereof a light-incident port 23*a*1 upon which there are incident parallel pencil groups reflected by the rotating mirror 21B and at the other end a light-outgoing port 23*a*2 from which the light is projected, and an optical surface 23*b* opposite to the optical surface 23*a*.

On the optical surface 23*b* of the optical waveguide 23, there are provided the first reflection volume hologram grating 24 in a position where it is opposite to the light-incident port 23*a*1 at the optical surface 23*a* and the second reflection volume hologram grating 25 in a position where it is opposite to the light-outgoing port 23*a*2 at the optical surface 23*a*.

Also, the optical waveguide 23 has a transparent substrate 26 provided at the side thereof where the first and second reflection volume hologram gratings 24 and 25 are provided. Between the optical surface 23*b* of the optical waveguide 23 and the transparent substrate 26, there will be laid an airspace Air in a place where the first and second reflection volume hologram gratings 24 and 25 are not provided.

Because of the transparent substrate 26 provided as above, it is possible to protect the optical surface 23*b* being a total-reflecting surface and the first and second reflection volume hologram gratings 24 and 25.

Figure 12:
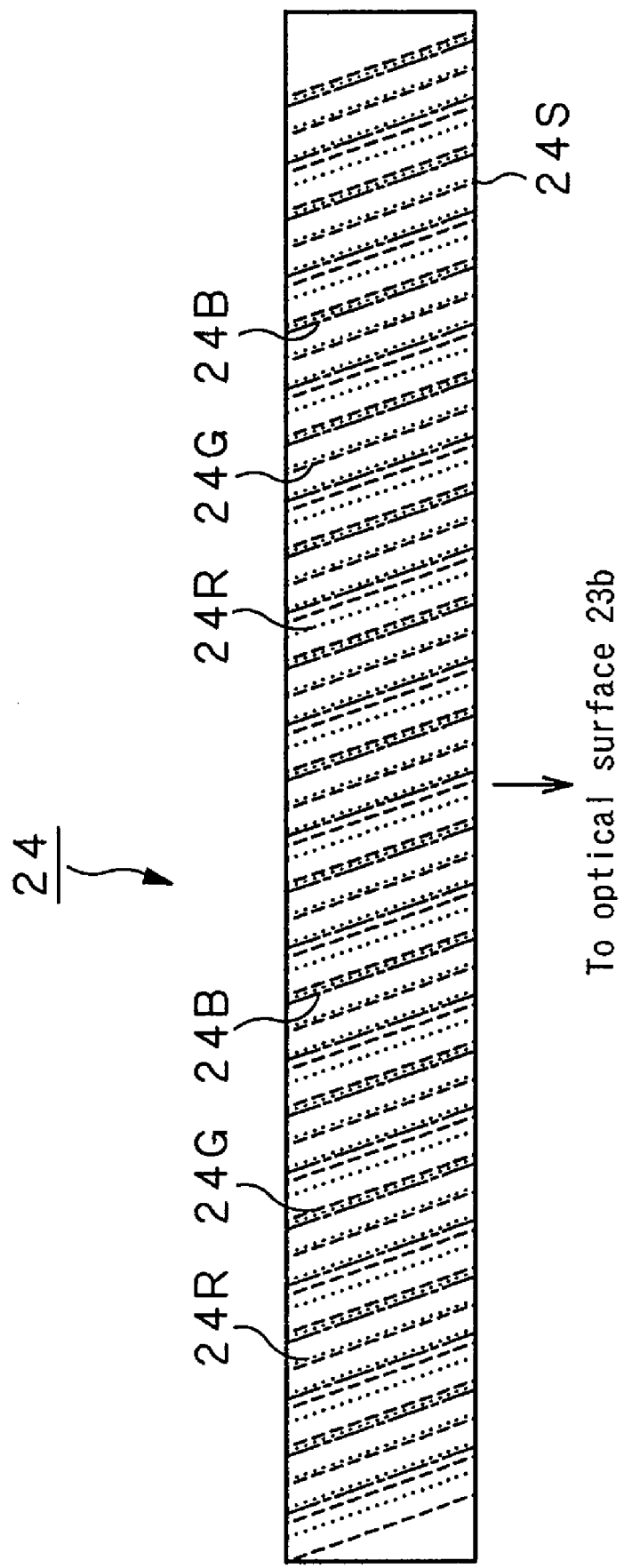
FIG. 12 is a side elevation of a first reflection volume hologram grating included in the image display device in FIG. 11.
Figure 13:
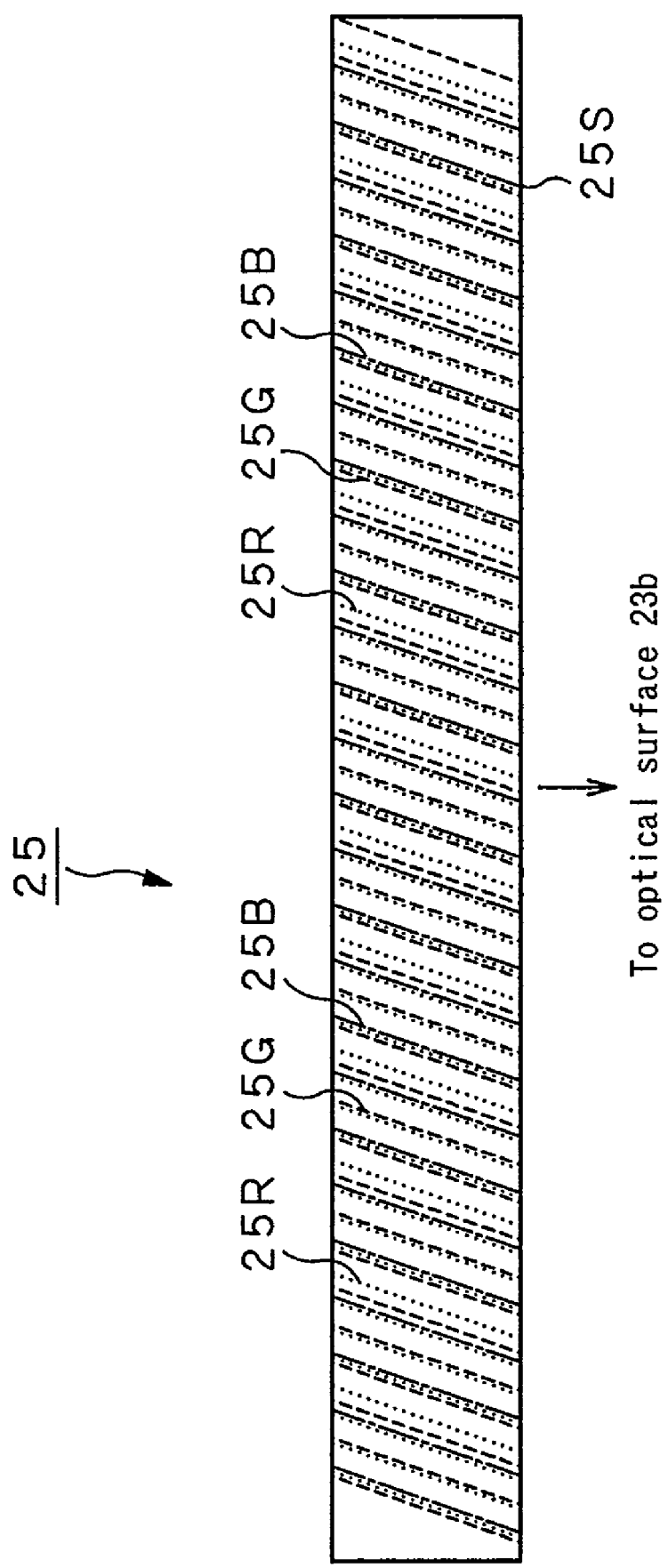
FIG. 13 is a side elevation of a second reflection volume hologram grating included in the image display device in FIG. 11.

FIGS. 12 and 13 show the first and second reflection volume hologram gratings 24 and 25 each having interference fringes recorded thereon.

As shown in FIGS. 12 and 13, each of the reflection volume hologram gratings 24 and 25 has recorded thereon a combination of three types of interference fringes that diffract and reflect mainly red light, green light and blue light, that is, red-light interference fringe 24R, green-light interference fringe 24G and blue-light interference fringe 24B. The three types of interference fringes are recorded so that grating pitches on the hologram surfaces 24S and 25S will be equal for each of the types of interference fringes and different from one type of interference fringe to another.

Note that the reflection volume hologram gratings 24 and 25 may have a combination of three types of interference fringes recorded on one hologram layer as shown in FIGS. 12 and 13 but each of the types of interference fringes, that is, each of a red-color interference fringe 24R, green-light interference fringe 24G and blue-color interference fringe 24B, may be recorded on one hologram layer and the three hologram layers each having an interference fringe recorded thereon may be stacked together.

As shown in FIG. 12, the reflection volume hologram grating 24 has a plurality of interference fringes 24R, 24G and 24B recorded thereon at the same slant with the same pitch independently of the locations of the interference fringes. Similarly, the reflection volume hologram grating 25 shown in FIG. 13 has a plurality of interference fringes 25R, 25G and 25B at the same slant angle with the same pitch. Therefore, the first and second reflection volume hologram gratings 24 and 25 have their interference fringes disposed on the optical surface 23*b* of the optical waveguide 23 to be symmetrical with respect to a plane perpendicular to the optical surface 23*b*.

Parallel pencil groups incident upon the light-incident port 23*a*1 of the optical waveguide 23 are incident upon the above-mentioned first reflection volume hologram grating 24 and diffracted and reflected they are at a nearly same angle. The parallel pencil groups thus diffracted and reflected will travel while being repeatedly totally reflected between the optical surfaces 23*a* and 23*b* of the optical waveguide 23 and will be incident upon the above-mentioned second reflection volume hologram grating 25.

The length, and thickness between the optical surfaces 23*a* and 23*b*, of the optical waveguide 23 are set to provide such a thickness and to such a sufficient length that parallel light beans traveling inside the optical waveguide 23 while being totally reflected are totally reflected different numbers of times correspondingly to their angles of field until they arrive at the second reflection volume hologram grating 25.

More specifically, ones of the parallel pencils in group incident upon the optical waveguide 23 while being slanted toward the second reflection volume hologram grating 25, that is, parallel pencils incident at a larger angle, are reflected a smaller number of times than parallel pencils incident upon the optical waveguide 23 while not being slanted toward the second reflection volume hologram grating 25, that is, parallel pencils incident at a smaller angle for the reason that the parallel pencil groups incident upon the optical waveguide 23 will be different in angle of field from each other. Namely, since the parallel pencils are incident upon the first reflection volume hologram grating 24 at different angles and thus projected at different angles of diffraction, they are totally reflected at different angles. Thus, when the optical waveguide 23 is designed slim having a sufficient length, the parallel pencils will be reflected different numbers of times, respectively.

Parallel pencil groups different in angle of field from each other and incident upon the second reflection volume hologram grating 25 are diffracted and reflected to depart from the condition of total reflection, projected at the light-outgoing port 23a2 of the optical waveguide 23, and incident upon the pupil 16 of the viewer.

As above, the second reflection volume hologram grating 25 is provided on the optical surface 23b of the optical waveguide 23 so that the interference fringes recorded thereon take the same shape as that of the interference fringes on the first reflecting volume hologram grating 24, rotated 180 deg. on the hologram surface. Therefore, since the parallel pencil groups to be reflected by the second reflection volume hologram grating 25 will be reflected at an angle equal to the angle of incidence upon the first reflecting volume hologram grating 24, a display image will be displayed on the pupil 16 with a high resolution without blurring.

Including the first and second reflection volume hologram gratings 24 and 25 that do not act as any lens, the virtual image display device 20 can eliminate monochromatic eccentric aberration and diffraction chromatic aberration.

Note that although the first and second reflection volume hologram gratings 24 and 25 are disposed for their hologram surfaces 24S and 25S to be parallel to the optical surface 23b of the optical waveguide 23, the present invention is not limited to this geometry but they may be disposed for their hologram surfaces 24S and 25S to be at a predetermined angle in relation to the optical surface 23b.

Third Embodiment

Figure 14:
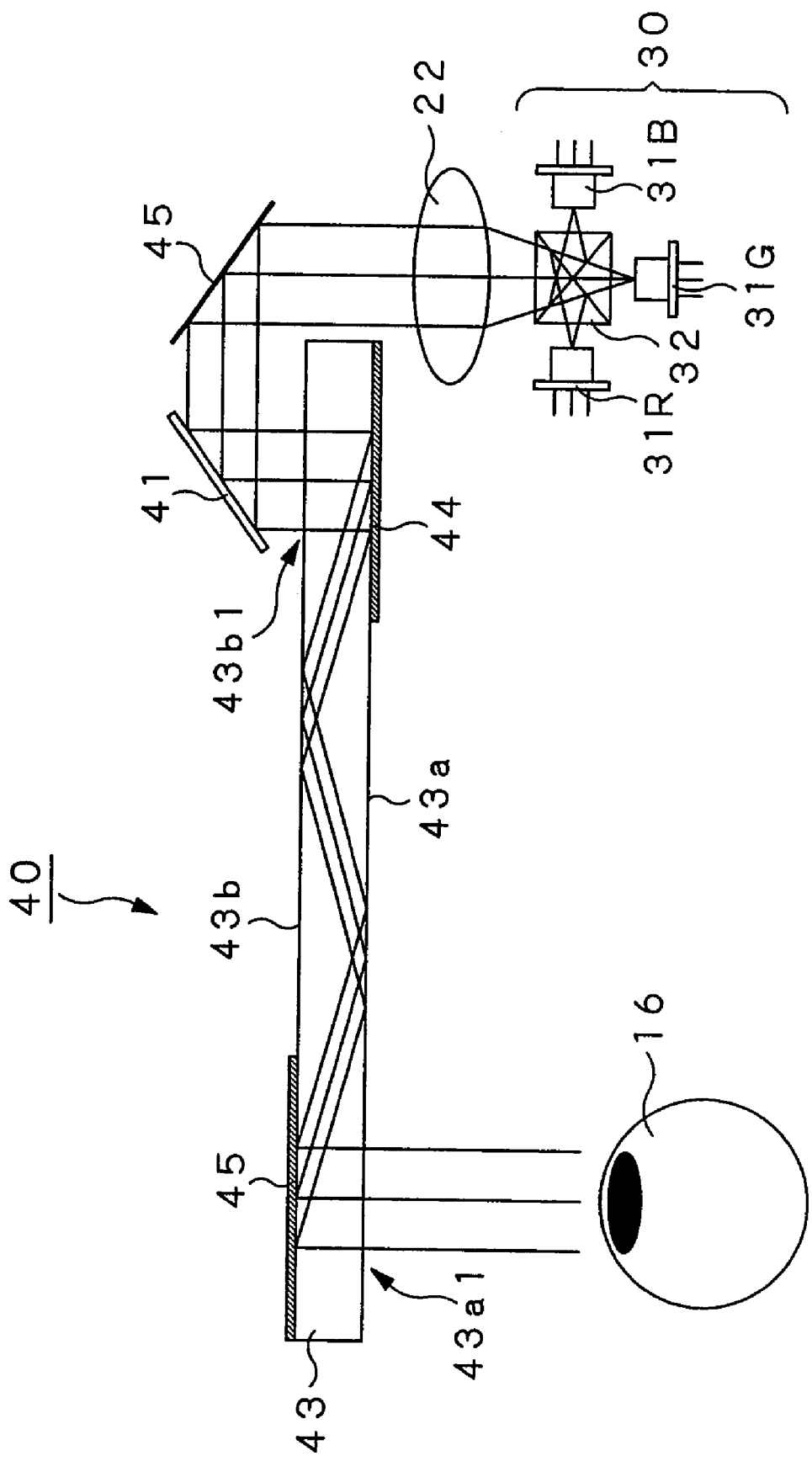
FIG. 14 is a side elevation of a virtual image display device as a third embodiment of the present invention.

FIG. 14 shows a virtual image display device as a third embodiment of the present invention. The virtual image display device is generally indicated with a reference numeral 40. The virtual image display device 40 as the third embodiment of the present invention displays a virtual image of a color image similarly to the virtual image display device 20 as the aforementioned second embodiment. It should be noted that in FIG. 14, only light rays directed at the central angle of field are illustrated mainly for easy viewing of the drawing.

The virtual image display device 40 includes an illumination optical system 30 also used in the second embodiment, and a virtual image optical system to guide incident illumination light from the illumination optical system 30 to the pupil 16 of the viewer.

The virtual image optical system includes a collimating optical system 22, reflecting mirror 45 to reflect a parallel pencil coming from the collimating optical system 22, MEMS (Micro Mechanical System) mirror 41 to make spatial modulation of the parallel pencil reflected by the reflecting mirror 45, optical waveguide 43 upon which the illumination light having been subjected spatial modulation by the MEMS mirror 41 and a first reflection volume hologram grating 44 and second reflection volume hologram grating 45 provided on the optical waveguide 43. It should be noted that the illumination optical system 30 and collimating optical system 22 having already been described will not be explained any more.

The MEMS mirror 41 functions as a scanning optical system to form the parallel pencil into parallel pencil groups traveling in different directions by scanning the parallel pencil horizontally and vertically.

White light coming from the illumination optical system 30 goes as illumination light to the virtual image optical system to the collimating optical system 22 which will form the light into a parallel pencil. The parallel pencil is projected to the reflecting mirror 45.

The reflecting mirror 45 is fixedly provided and projects the parallel pencil coming from the collimating optical system 22 to the MEMS mirror 41.

The MEMS mirror 41 is a functional element prepared with the semiconductor manufacturing technology. It works as a spatial optical modulator to make spatial modulation of an incident parallel pencil. The MEMS mirror 41 is freely movable in a two-dimensional direction. It forms an image through spatial modulation of an incident parallel pencil by reflecting the incident pencil so as to scan it in a direction perpendicular to the plane of the drawing and in a direction parallel to the plane of the drawing. The MEMS mirror 41 operates under the control of a microcomputer (not shown) correspondingly to an image to be displayed.

The parallel pencil coming from the MEMS mirror 41 is reflected as parallel pencil groups different in traveling direction from each other toward the optical waveguide 43 while being scanned as they are in a direction perpendicular to the plane of the drawing and in a direction parallel to the drawing plane.

The optical waveguide 43 is a slim, parallel, flat optical waveguide including mainly an optical surface 43b having provided at one end thereof a light-incident port 43b1 upon which there are incident parallel pencil groups reflected by the MEMS mirror 41, and an optical surface 43a opposite to the optical surface 43b and having a light-outgoing port 43a1 provided at the end thereof opposite to the light-incident port 43b1 of the optical surface 43b.

The first reflection volume hologram grating 44 is provided on the optical surface 43a of the optical waveguide 43 in a position where it is opposite to the light-incident port 43b1 at the optical surface 43b, and the second reflection volume hologram grating 45 is provided on the optical surface 43b in a position where it is opposite to the light-outgoing port 43a1 at the optical surface 43a.

Figure 15:
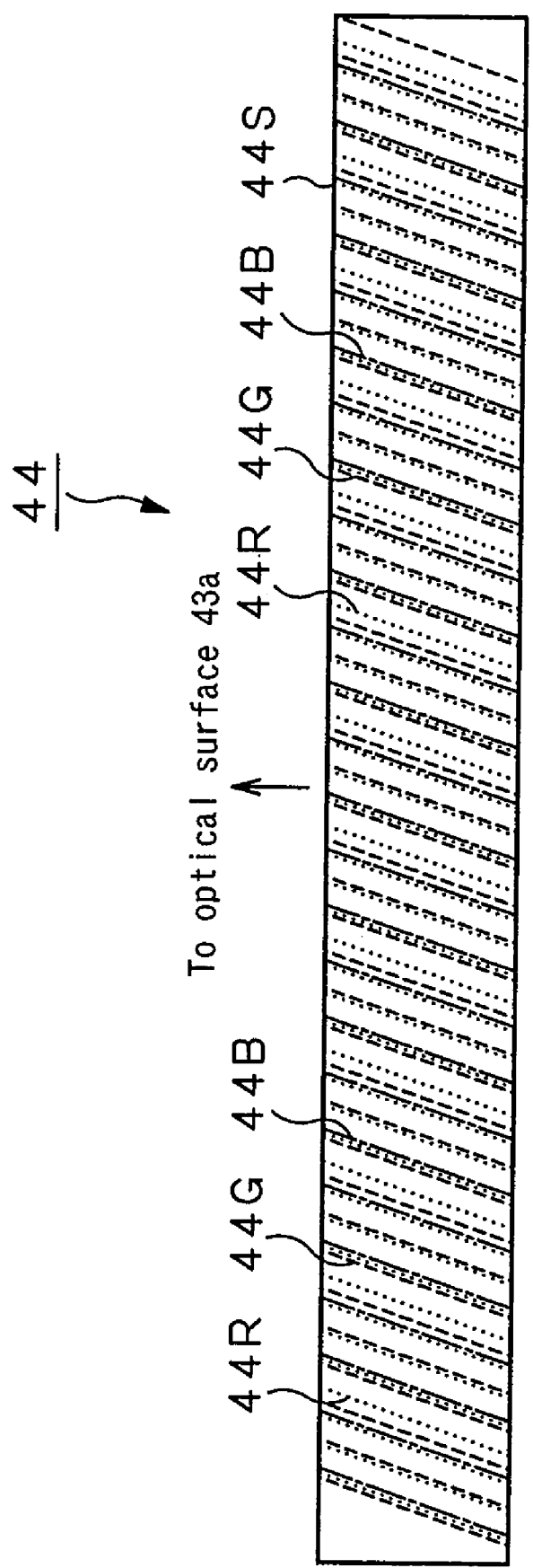
FIG. 15 is a side elevation of a first reflection volume hologram grating included in the image display device in FIG. 14.
Figure 16:
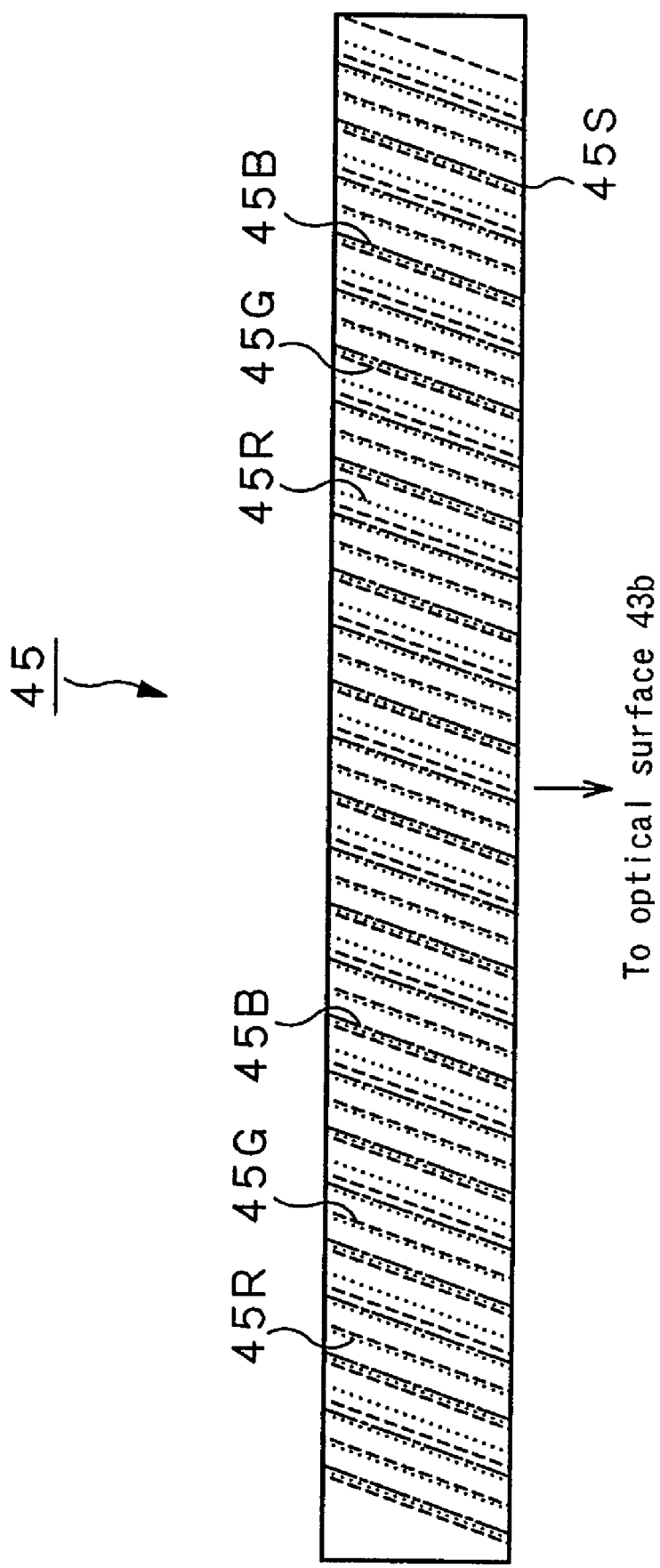
FIG. 16 is a side elevation of a first reflection volume hologram grating included in the image display device in FIG. 14.

FIGS. 15 and 16 show the first and second reflection volume hologram gratings 44 and 45 each having interference fringes recorded thereon. These first and second reflection volume hologram gratings 44 and 45 are quite the same in configuration as the first and second reflection volume hologram gratings 24 and 25 having already been described with reference to FIGS. 12 and 13 except that the first and second reflection volume hologram gratings 44 and 45 are provided in the positions where the second and first reflection volume hologram grating 25 and 24 are provided, respectively.

As shown in FIGS. 15 and 16, each of the reflection volume hologram gratings 44 and 45 has recorded thereon a combination of three types of interference fringes that diffract and reflect mainly red light, green light and blue light, that is, red-light interference fringe 44R, green-light interference fringe 44G and blue-light interference fringe 44B. The three types of interference fringes are recorded so that grating pitches on the hologram surfaces will be equal for each of the types of interference fringes and different from one type of the interference fringe to another.

Note that the reflection volume hologram gratings 44 and 45 may have a combination of three types of interference fringes recorded on one hologram layer as shown in FIGS. 15 and 16 but each of the types of interference fringes, that is, each of a red-color interference fringe 44R, green-light interference fringe 44G and blue-color interference fringe 44B, may be recorded on one hologram layer and the three hologram layers each having an interference fringe recorded thereon may be stacked together.

As shown in FIG. 15, the first reflection volume hologram grating 44 has a plurality of interference fringes 44R, 44G and 44B recorded thereon at the same slant with the same pitch independently of the locations of the interference fringes. Similarly, the second reflection volume hologram grating 45 shown in FIG. 16 has a plurality of interference fringes 45R, 45G and 45B at the same slant angle with the same pitch.

Parallel pencil groups incident from the light-incident port 43b1 of the optical waveguide 43 are incident upon the above-mentioned first reflection volume hologram grating 44 and diffracted and reflected as they are at a nearly same angle. The parallel pencil groups thus diffracted and reflected will travel while being repeatedly totally reflected between the optical surfaces 43a and 43b of the optical waveguide 43 and will be incident upon the above-mentioned second reflection volume hologram grating 45.

The length, and thickness between the optical surfaces 43a and 43b, of the optical waveguide 43 are set to provide such a thickness and to such a sufficient length that parallel light beans traveling inside the optical waveguide 43 while being totally reflected are totally reflected different numbers of times correspondingly to their angles of field until they arrive at the second reflection volume hologram grating 45.

More specifically, ones of the parallel pencil groups incident upon the optical waveguide 43 while being slanted toward the second reflection volume hologram grating 45, that is, parallel pencils incident at a larger angle, are reflected a smaller number of times than parallel pencils incident upon the optical waveguide 43 while not being slanted toward the second reflection volume hologram grating 45, that is, parallel pencils incident at a smaller angle for the reason that the parallel pencil groups incident upon the optical waveguide 43 will be different in angle of field from each other. Namely, since the parallel pencils are incident upon the first reflection volume hologram grating 44 at different angles and thus projected at different angles of diffraction, they are totally reflected at different angles. Thus, when the optical waveguide 43 is designed slim having a sufficient length, the parallel pencils will be reflected different numbers of times, respectively.

Parallel pencil groups different in angle of field from each other and incident upon the second reflection volume hologram grating 45 are diffracted and reflected to depart from the condition of total reflection, projected at the light-outgoing port 43a1 of the optical waveguide 43, and incident upon the pupil 16 of the viewer.

As above, the second reflection volume hologram grating 45 is provided on the optical surface 43b of the optical waveguide 43 so that the interference fringes recorded thereon take the same shape as that of the interference fringes on the first reflecting volume hologram grating 44, rotated 360 deg. on the hologram surface. Therefore, since the parallel pencil groups to be reflected by the second reflection volume hologram grating 45 will be reflected at an angle equal to the angle of incidence upon the first reflecting volume hologram grating 44, a display image will be displayed on the pupil 16 with a high resolution without blurring.

Including the first and second reflection volume hologram gratings 44 and 45 that do not act as any lens, the virtual image display device 40 can eliminate monochromatic eccentric aberration and diffraction chromatic aberration.

Note that although the first and second reflection volume hologram gratings 44 and 45 are disposed for their hologram surfaces 44S and 45S to be parallel to the optical surfaces 43a and 43b, respectively, of the optical waveguide 43, the present invention is not limited to this geometry but they may be disposed for their hologram surfaces 44S and 45S to be at a predetermined angle in relation to the optical surfaces 43a and 43b, respectively.

Fourth Embodiment

Figure 17:
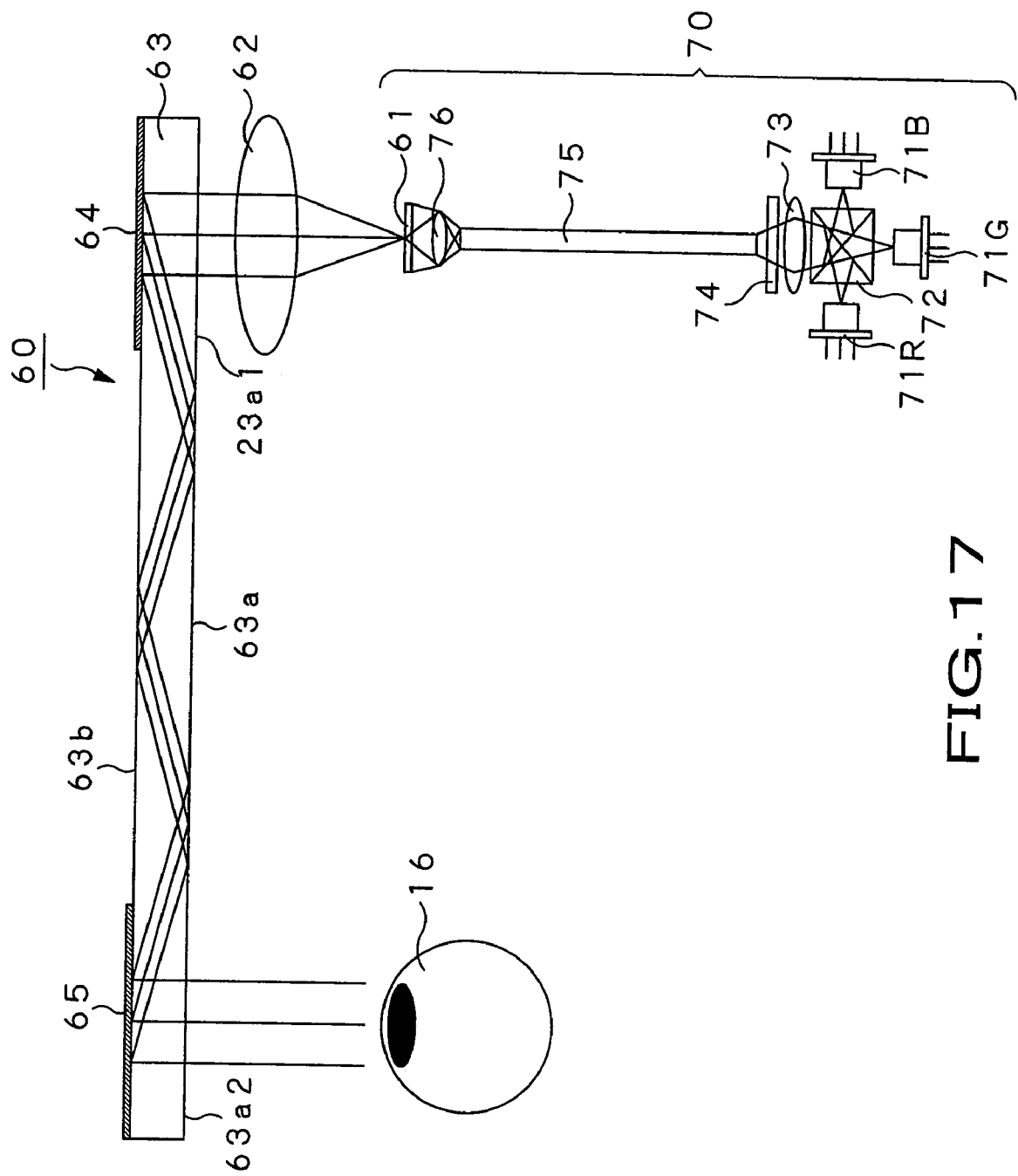
FIG. 17 is a side elevation of a virtual image display device as a fourth embodiment of the present invention.

FIG. 17 shows a virtual image display device as a fourth embodiment of the present invention. The virtual image display device is generally indicated with a reference numeral 60. The virtual image display device 60 as the fourth embodiment of the present invention displays a virtual image of a color image. It should be noted that in FIG. 17, only light rays directed at the central angle of field are illustrated mainly for easy viewing of the drawing.

The virtual image display device 60 includes an illumination optical system 70, spatial optical modulator 61 to make spatial modulation of illumination light from the illumination optical system 70, and a virtual image optical system to guide the incident illumination light spatial-modulated by the spatial optical modulator 61 to the pupil 16 of the viewer.

The illumination optical system 70 includes a laser light source 71R to emit red light, laser light source 71G to emit green light, laser light source 71B to emit blue light, color synthesizing prism 72, coupling optical system 73, speckle reducing means 74, optical fiber 75 and a condenser lens 76.

Red, green and blue light emitted from the laser light sources 71R, 71G and 71B, respectively, are mixed by the color synthesizing prism 32 that is a cross prism to provide white light, and the white light is led by the coupling optical system 73 to the optical fiber 75 via the speckle reducing means 74. The white light transmitted through the optical fiber 75 and projected from the latter illuminates the spatial optical modulator 61 via the condenser lens 76.

The spatial optical modulator 61 is for example a transmission liquid crystal display to make spatial modulation of the incident illumination light per pixel. The illumination light thus spatial-modulated is incident upon the virtual image optical system.

The virtual image optical system includes a collimating optical system 62, optical waveguide 63, and first and second reflection volume hologram gratings 64 and 65 provided on the optical waveguide 63.

The collimating optical system 62 forms incident illumination light spatial-modulated by the spatial optical modulator 61 into parallel pencil groups different in angle of field from each other. The parallel pencil groups coming from the collimating optical system 62 is incident upon the optical waveguide 63.

The optical waveguide 63 is a slim, parallel, flat optical waveguide including mainly an optical surface 63a having provided at one end thereof a light-incident port 63a1 upon which there are incident parallel pencil groups coming from the collimating optical system 62, and at the other end a light-outgoing port 63a2 from which the light is projected, and an optical surface 63b opposite to the optical surface 63a.

On the optical surface 63b of the optical waveguide 63, there are provided the first reflection volume hologram grating 64 in a position where it is opposite to the light-incident port 63a1 at the optical surface 63a and the second reflection volume hologram grating 65 in a position where it is opposite to the light-outgoing port 63a2 at the optical surface 63a.

Figure 18:
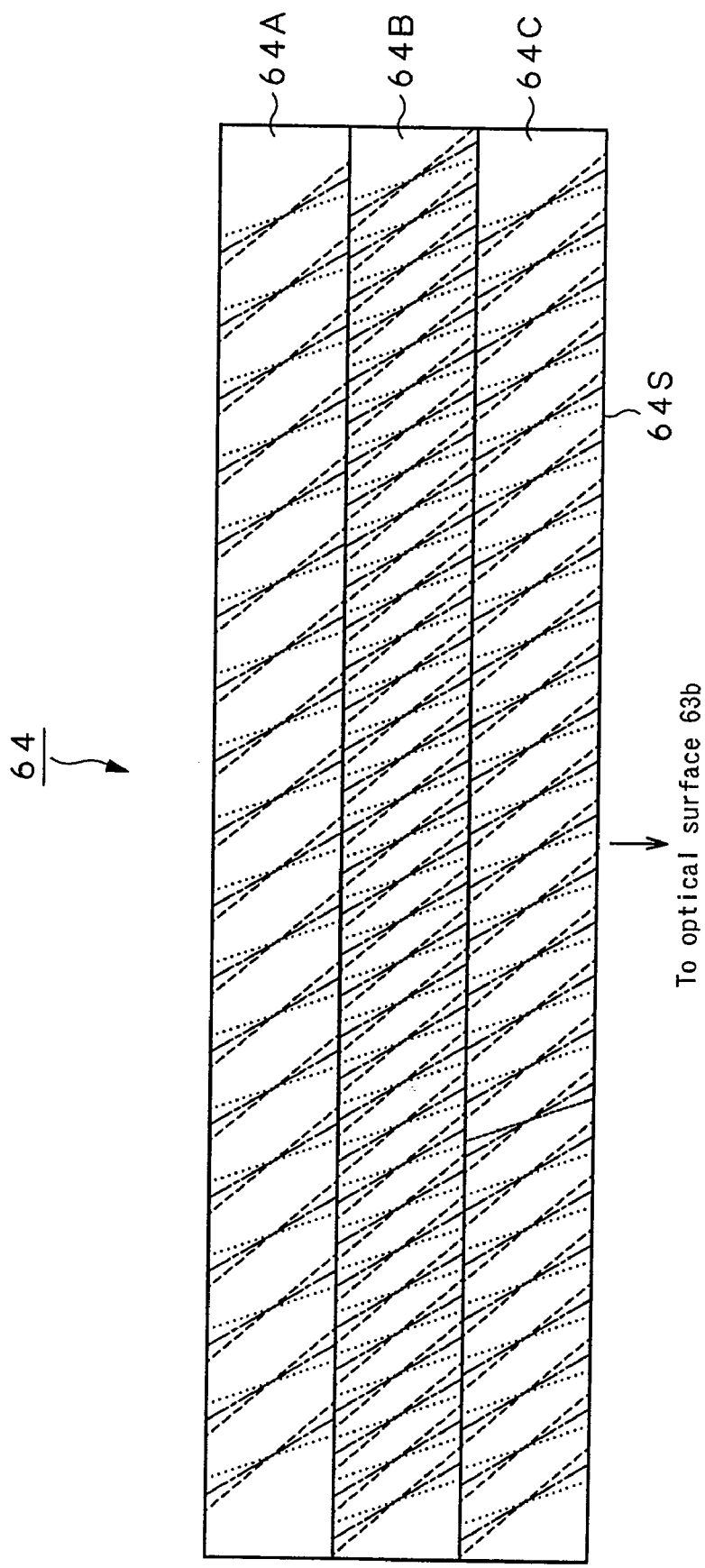
FIG. 18 is a side elevation of a first reflection volume hologram grating included in the image display device in FIG. 17.
Figure 19:
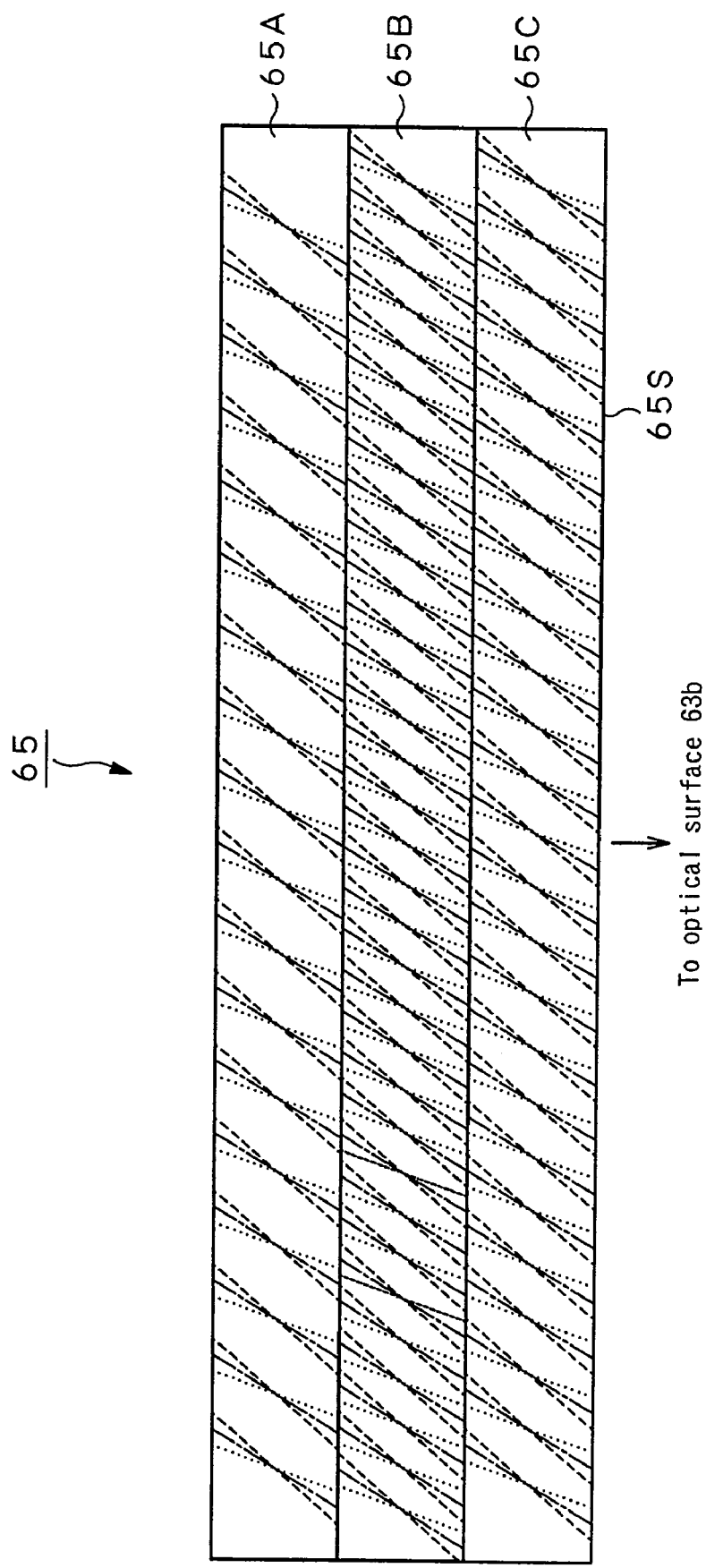
FIG. 19 is a side elevation of a second reflection volume hologram grating included in the image display device in FIG. 17.

FIGS. 18 and 19 show the first and second reflection volume hologram gratings 64 and 65 each having interference fringes recorded thereon.

As shown in FIGS. 18 and 19, the first and second reflection volume hologram gratings 64 and 65 are formed each from three hologram layers 64A, 64B and 64C stacked together and three hologram layers 65A, 65B and 65C stacked together, respectively. Each of the hologram layers of each reflection volume hologram grating has recorded thereon interference fringes to diffract and reflect mainly red, green and blue light. For example, the hologram layer 64A of the first reflection volume hologram grating 64 has recorded thereon an interference fringe to diffract and reflect mainly red light, the hologram layer 64B has recorded thereon an interference fringe to diffract and reflect mainly green light, and the hologram layer 64C has recorded thereon an interference fringe to diffract and reflect mainly blue light. This is also true for the second reflection volume hologram grating 65.

Also, the inference fringe recorded on each hologram layer is formed from a combination of three types of interference fringes different in slant angle from each other and laid with the same pitch on the hologram surface for a larger diffraction acceptance angle in relation to a parallel pencil of a waveband to be diffracted and reflected by each hologram layer as in the interference fringe recorded on the first and second reflection volume hologram gratings 14 and 15 in the first embodiment.

Also, the first and second reflection volume hologram gratings 64 and 65 may be constructed as below. This will be explained concerning the second reflection volume hologram grating 65 with reference to FIG. 20. It should be noted that although the first reflection volume hologram grating 64 will not be explained at all, it is quite the same in construction as the second reflection volume hologram grating 65.

Figure 20:
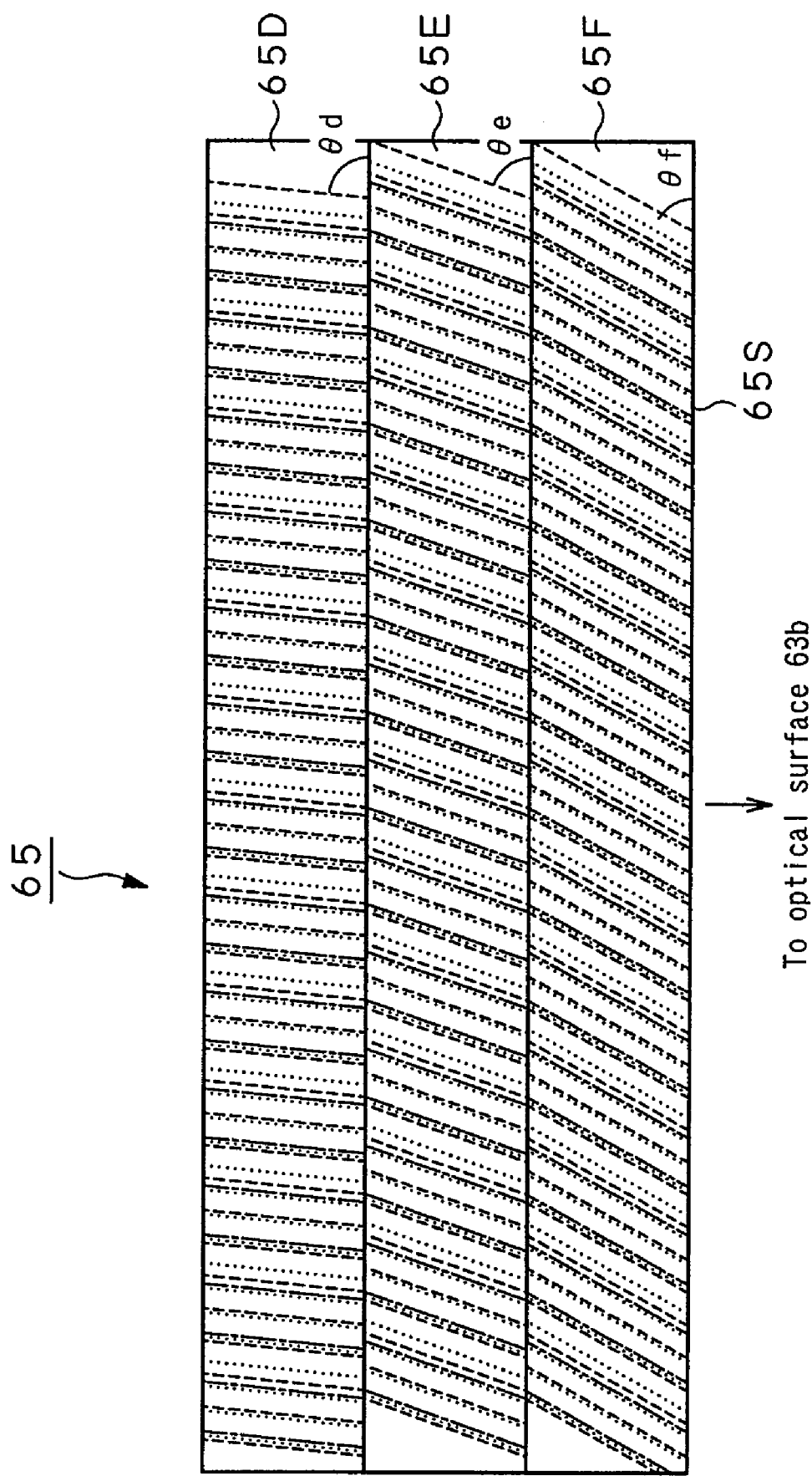
FIG. 20 is a side elevation of a variant of the second reflection volume hologram grating included in the image display device in FIG. 17.

As shown in FIG. 20, the second reflection volume hologram grating 65 is formed from a stack of three hologram layers 65D, 65E and 65F. Each of the hologram layers forming together the second reflection volume hologram grating 65 has recorded thereon a combination of three types of interference fringes for diffraction and reflection of rays of light different in waveband from each other for a wider range of diffraction acceptance wavelength. The three types of interference fringes are recorded for the grating pitch on the hologram surface to be equal for each type of the interference fringe and different from one type of interference fringe to another. Namely, each hologram layer of the second reflection volume hologram grating 65 has recorded thereon similar interference fringes to those on the first and second reflection volume hologram gratings 24 and 25 used in the second embodiment.

Also, the interference fringes recorded on the hologram layers 65D, 65E and 65F have slant angles θd, θe and θf. The slant angles are quite identical to each other in the same hologram layer, but they are different from one hologram layer to another for a larger diffraction acceptance angle.

Parallel pencil groups incident from the light-incident port 63a1 of the optical waveguide 63 are incident upon the above-mentioned first reflection volume hologram grating 64 and diffracted and reflected. The parallel pencil groups thus diffracted and reflected will travel while being repeatedly totally reflected between the optical surfaces 63a and 63b of the optical waveguide 63 and will be incident upon the above-mentioned second reflection volume hologram grating 65.

The length, and thickness between the optical surfaces 63a and 63b, of the optical waveguide 63 are set to provide such a thickness and to such a sufficient length that parallel light beans traveling inside the optical waveguide 63 while being totally reflected are totally reflected different numbers of times correspondingly to their angles of field until they arrive at the second reflection volume hologram grating 65.

More specifically, ones of the parallel pencil groups incident upon the optical waveguide 63 while being slanted toward the second reflection volume hologram grating 65, that is, parallel pencils incident at a larger angle, are reflected a smaller number of times than parallel pencils incident upon the optical waveguide 63 while not being slanted toward the second reflection volume hologram grating 65, that is, parallel pencils incident at a smaller angle for the reason that the parallel pencils incident upon the optical waveguide 63 will be different in angle of field from each other. Namely, since the parallel pencils are incident upon the first reflection volume hologram grating 64 at different angles and thus projected at different angles of diffraction, they are totally reflected at different angles. Thus, when the optical waveguide 63 is designed slim having a sufficient length, the parallel pencils will be reflected considerably different numbers of times, respectively.

Parallel pencil groups different in angle of field from each other and incident upon the second reflection volume hologram grating 65 is diffracted and reflected to depart from the condition of total reflection, projected at the light-outgoing port 63a2 of the optical waveguide 63, and incident upon the pupil 16 of the viewer.

As above, the second reflection volume hologram grating 65 is provided on the optical surface 63b of the optical waveguide 63 so that the interference fringes recorded thereon take the same shape as that of the interference fringes on the first reflecting volume hologram grating 64, rotated 180 deg. on the hologram surface. Therefore, since the parallel pencil groups to be reflected by the second reflection volume hologram grating 65 will be reflected at an angle equal to the angle of incidence upon the first reflecting volume hologram grating 64, a display image will be displayed on the pupil 16 with a high resolution without blurring.

Including the first and second reflection volume hologram gratings 64 and 65 that do no act as any lens, the virtual image display device 60 can eliminate monochromatic eccentric aberration and diffraction chromatic aberration.

Note that although the first and second reflection volume hologram gratings 64 and 65 are disposed for their hologram surfaces 64S and 65S to be parallel to the optical surface 63b of the optical waveguide 63, the present invention is not limited to this geometry but they may be disposed for their hologram surfaces 64S and 65S to be at a predetermined angle in relation to the optical surface 63b.

Fifth Embodiment

Figure 21:
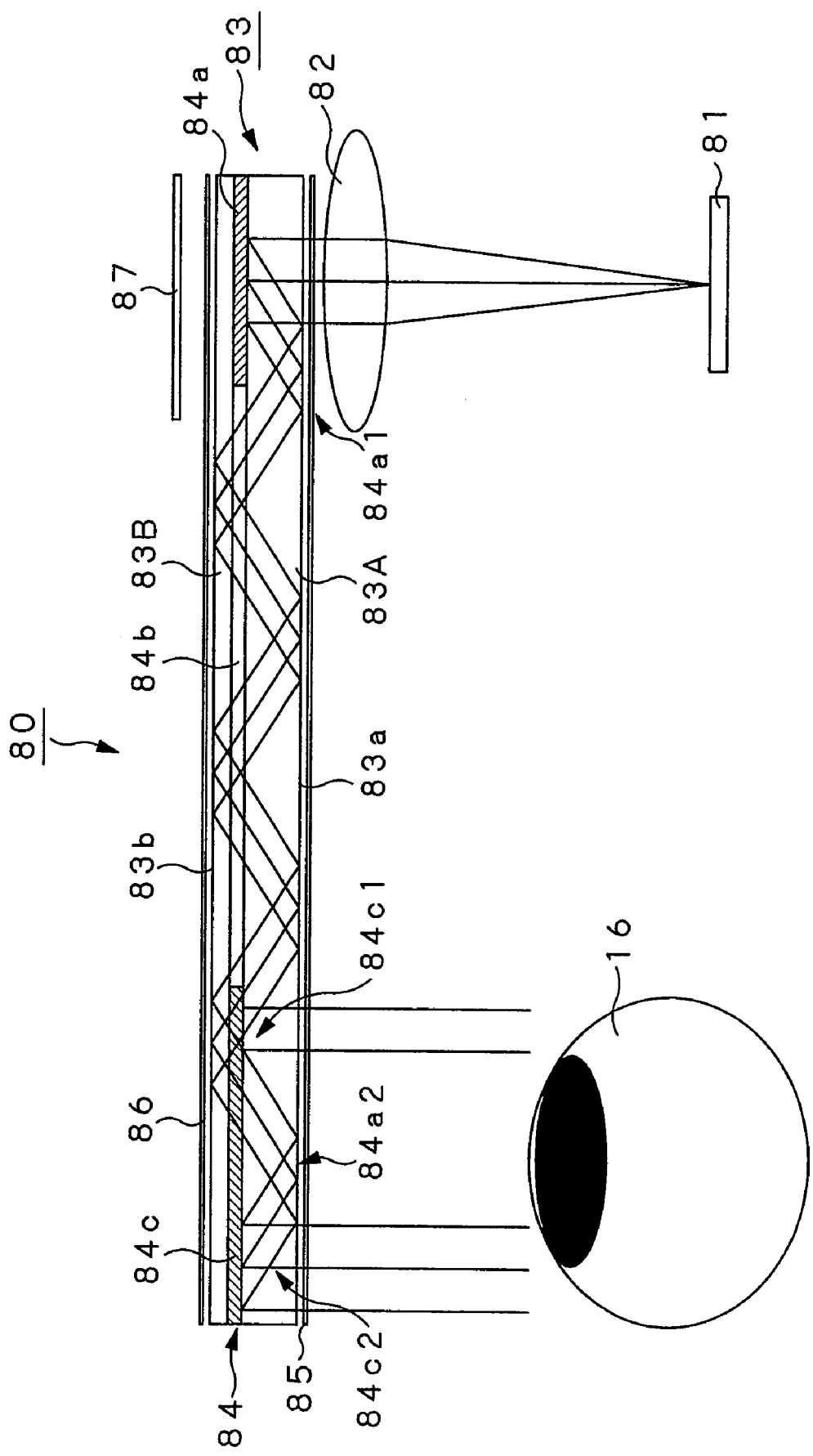
FIG. 21 is a side elevation of a virtual image display device as a fifth embodiment of the present invention.

FIG. 21 shows a virtual image display device as a fifth embodiment of the present invention. The virtual image display device is generally indicated with a reference numeral 80. The virtual image display device 80 includes an image display element 81 to display an image, and a virtual image optical system to guide incident display light from the image display element 81 to a pupil 16 of the viewer.

The image display element 81 is for example an organic EL (Electro Luminescence) display, inorganic EL display, liquid crystal display (LCD) or the like.

The virtual image optical system includes a collimating optical system 82 and an optical waveguide 83 which incorporates a hologram layer 84.

The collimating optical system 82 is to receive a pencil from each pixel of the image display element 81 and form the pencils into parallel pencil groups different in angle of field from each other. The parallel pencil groups coming from the collimating optical system 82 and different in angle of field from each other are incident upon the optical waveguide 83.

The optical waveguide 83 is of a structure in which the hologram layer 84 is laid between transparent substrates 83A and 83B. The optical waveguide 83 is a slim, parallel, flat optical waveguide including mainly an optical surface 83a having provided at one end thereof a light-incident port 83a1 upon which there are incident parallel pencil groups projected from the collimating optical system 82 and different in angle of field from each other and at the other end a light-outgoing port 83a2 from which the light is projected, and an optical surface 83b opposite to the optical surface 83a.

Protective sheets 85 and 86 are provided on the optical surfaces 83a and 83b, respectively, of the optical waveguide 83 to protect the optical surfaces 83a and 83b, respectively. The protective sheet 86 provided on the optical surface 83b has provided thereon in the same position as the light-incident port 83a1 of the optical waveguide 83 a light shield 87 that prevents the efficiency of light utilization from being reduced by leakage of an image displayed on the image display element 81 and magnified by the collimating optical system 82 to outside the optical waveguide 83.

The hologram layer 84 has a first reflection volume hologram grating 84a in a position corresponding to the light-incident port 83a1 and a second reflection volume hologram grating 84c in a position corresponding to the light-outgoing port 83a2. The rest of the hologram layer 84 is an area 84b having no interference fringe recorded therein.

Each of the first and second reflection volume hologram gratings 84a and 84c has interference fringes with an identical pitch of the hologram surface. Also, the second reflection volume hologram grating 84c is designed to be different in diffraction efficiency from one portion thereof to another. The second reflection volume hologram grating 84c is lower in diffraction efficiency in a position near the light-incident port 83a1 and higher in diffraction efficiency in a position distant from the light-incident port 83a1 so that the light can be diffracted and reflected a plurality of times.

Parallel pencil groups incident upon the light-incident port 83a1 of the optical waveguide 83 and different in angle of field from each other are incident upon the above-mentioned first reflection volume hologram grating 84a and diffracted and reflected as they are. The parallel pencil groups thus diffracted and reflected will travel while being repeatedly totally reflected between the optical surfaces 83a and 83b of the optical waveguide 83 and will be incident upon the above-mentioned second reflection volume hologram grating 84c.

The length, and thickness between the optical surfaces 83a and 83b, of the optical waveguide 83 are set to provide such an optical length that parallel light beans different in angle of field from each other and traveling inside the optical waveguide 83 are totally reflected different numbers of times correspondingly to their angles of field until they arrive at the second reflection volume hologram grating 84c.

More specifically, ones of the parallel pencil groups incident upon the optical waveguide 83 while being slanted toward the second reflection volume hologram grating 84c, that is, parallel pencils incident at a larger angle, are reflected a smaller number of times than parallel pencils incident upon the optical waveguide 83 while not being slanted toward the second reflection volume hologram grating 84c, that is, parallel pencils incident at a smaller angle for the reason that the parallel pencils incident upon the optical waveguide 83 will be different in angle of field from each other. Namely, since the parallel pencils are incident upon the first reflection volume hologram grating 84a at different angles and thus projected at different angles of diffraction, they are totally reflected at different angles. Thus, when the optical waveguide 83 is designed slim having a sufficient length, the parallel pencils will be reflected different numbers of times, respectively.

Parallel pencil groups different in angle of field from each other and incident upon the second reflection volume hologram grating 84c are diffracted and reflected to depart from the condition of total reflection, projected at the light-outgoing port 83a2 of the optical waveguide 83, and incident upon the pupil 16 of the viewer.

In case the second reflection volume hologram grating 84c is designed to be different in diffraction efficiency from one portion thereon to another as in this embodiment, the pupil diameter, that is, the viewer's virtual image viewing range, can be increased.

More specifically, on the assumption that the diffraction efficiency of the second reflection volume hologram grating 84c is 40% in a position 84c1 near the light-incident port 83a1 and 70% in a position 84c2 distant from the light-outgoing port 83a2, for example, a first group of parallel pencils incident upon the second reflection volume hologram grating 84c will have 40% thereof diffracted and reflected in the position 84c1 and 60% allowed to pass by. The parallel pencil groups allowed to pass by will be totally reflected inside the optical waveguide 83 and incident upon the second reflection volume hologram grating 84c in the position 84c2.

Since the diffraction efficiency in the position 84c2 is 70%, 60% of the first group of parallel pencils incident upon the second reflection volume hologram grating 84c is allowed to pass by. Thus, 42% (=0.6×0.7=0.42) of the parallel pencil groups will be diffracted and reflected in the position 84c2. By changing the diffraction efficiency appropriately from one position to another on the second reflection volume hologram grating 84c as above, it is possible to keep the balance in amount of the light coming from the light-outgoing port 83a2. Therefore, by increasing the area of the second reflection volume hologram grating 84c where the interference fringe is to be recorded, the range of virtual image viewing range can easily be increased.

Also, the virtual image display device 80 with the first and second reflection volume hologram gratings 84a and 84c that do not act as any lens can eliminate the monochromatic eccentric aberration and diffraction chromatic aberration.

Sixth Embodiment

Figure 22:
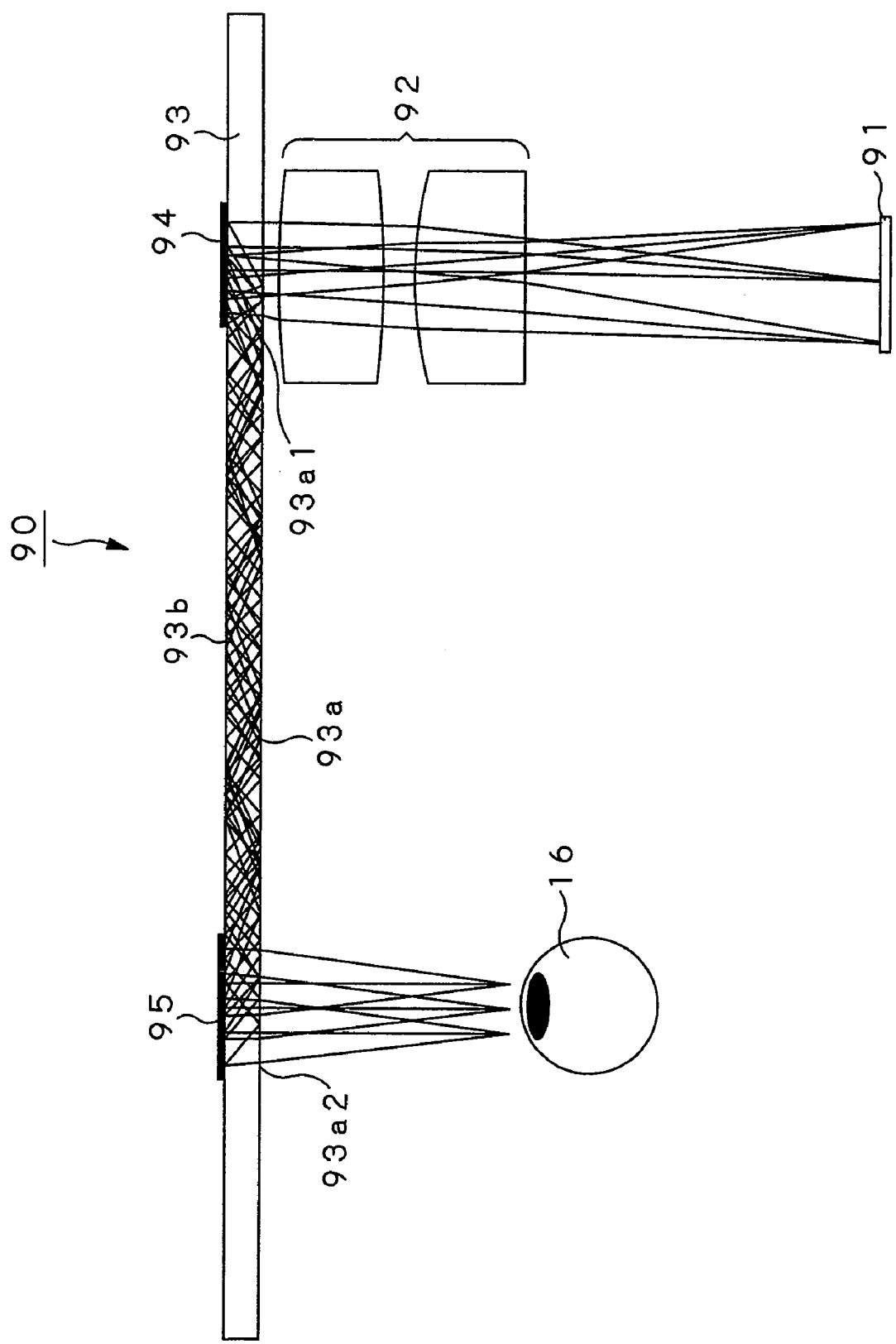
FIG. 22 is a side elevation of a virtual image display device as a sixth embodiment of the present invention.

FIG. 22 shows a virtual image display device as a sixth embodiment of the present invention. The virtual image display device is generally indicated with a reference numeral 90. The virtual image display device 90 includes an image display element 91 to display an image, and a virtual image optical system to guide incident display light from the image display element 91 to a pupil 16 of the viewer.

The image display element 91 is for example an organic EL (Electro Luminescence) display, inorganic EL display, liquid crystal display (LCD) or the like.

The virtual image optical system includes a collimating optical system 92, optical waveguide 93, and a first reflection volume hologram grating 94 and second reflection volume hologram grating 95 provided on the optical waveguide 93.

The collimating optical system 92 receives an incident pencil from each pixel of the image display element 91 and forms the pencils of rays into parallel pencil groups different in angle of field from each other. The parallel pencil groups projected from the collimating optical system 92 and different in angle of field from each other is incident upon the optical waveguide 93.

The optical waveguide 93 is a slim, parallel, flat optical waveguide including mainly an optical surface 93*a* having provided at one end thereof a light-incident port 93*a*1 upon which there are incident parallel pencil groups projected from the collimating optical system 92 and different in angle of field from each other and at the other end a light-outgoing port 93*a*2 from which the light is projected, and an optical surface 93*b* opposite to the optical surface 93*a*.

On the optical surface 93*b* of the optical waveguide 93, there are provided the first reflection volume hologram grating 94 in a position where it is opposite to the light-incident port 93*a*1 at the optical surface 93*a* and the second reflection volume hologram grating 95 in a position where it is opposite to the light-outgoing port 93*a*2 at the optical surface 93*a*.

The first and second reflection volume hologram gratings 94 and 95 will be described in detail later.

Parallel pencil groups coming from the light-incident port 63*a*1 of the optical waveguide 93 and different in angle of field from each other are incident upon the above-mentioned first reflection volume hologram grating 94 and diffracted and reflected as they are. The parallel pencil groups thus diffracted and reflected will travel while being repeatedly totally reflected between the optical surfaces 93*a* and 93*b* of the optical waveguide 93 and will be incident upon the above-mentioned second reflection volume hologram grating 95.

The length, and thickness between the optical surfaces 93*a* and 93*b*, of the optical waveguide 93 are set to provide such a thickness and to such a sufficient length that parallel light beans different in angle of field from each other and traveling inside the optical waveguide 93 while being totally reflected are totally reflected different numbers of times correspondingly to their angles of field until they arrive at the second reflection volume hologram grating 95.

More specifically, ones of the parallel pencil groups incident upon the optical waveguide 93 while being slanted toward the second reflection volume hologram grating 95, that is, parallel pencils incident at a larger angle, are reflected a smaller number of times than parallel pencils incident upon the optical waveguide 93 while not being slanted toward the second reflection volume hologram grating 95, that is, parallel pencils incident at a smaller angle for the reason that the parallel pencil groups incident upon the optical waveguide 93 will be different in angle of field from each other. Namely, since the parallel pencils are incident upon the first reflection volume hologram grating 94 at different angles and thus projected at different angles of diffraction, they are totally reflected at different angles. Thus, when the optical waveguide 93 is designed slim having a sufficient length, the parallel pencils will be reflected different numbers of times, respectively.

Parallel pencil groups different in angle of field from each other and incident upon the second reflection volume hologram grating 95 are diffracted and reflected to depart from the condition of total reflection, projected at the light-outgoing port 93*a*2 of the optical waveguide 93, and incident upon the pupil 16 of the viewer.

Next, the first and second reflection volume hologram gratings 94 and 95 will be described.

The reflection volume hologram grating 94 is quite the same in construction (not illustrated) as the first reflection volume hologram grating 64 in the fourth embodiment having already been described with FIG. 18. Therefore, the first reflection volume hologram grating 94 is formed from a stack of three hologram layers different in pitch of interference fringe to diffract and reflect red, green and blue light. Each of the hologram layers is formed from a combination of three types of interference fringes different in slant angle from each other for a larger angle of field and laid with the same pitch on the hologram surface.

Thus, the first reflection volume hologram grating 94 can diffract and reflect parallel pencils projected from the image display element 91 and collimated by the collimating optical system 92 to have a horizontal angle of field ±about 10 deg. so as to meet the condition of total reflection for the optical waveguide 93.

The parallel pencil groups diffracted and reflected by the first reflection volume hologram grating 94 will be guided inside the optical waveguide 93 while being totally reflected at different angles, respectively. As a result, the parallel pencils will be incident at different angles upon the second reflection volume hologram grating 95.

Figure 23:
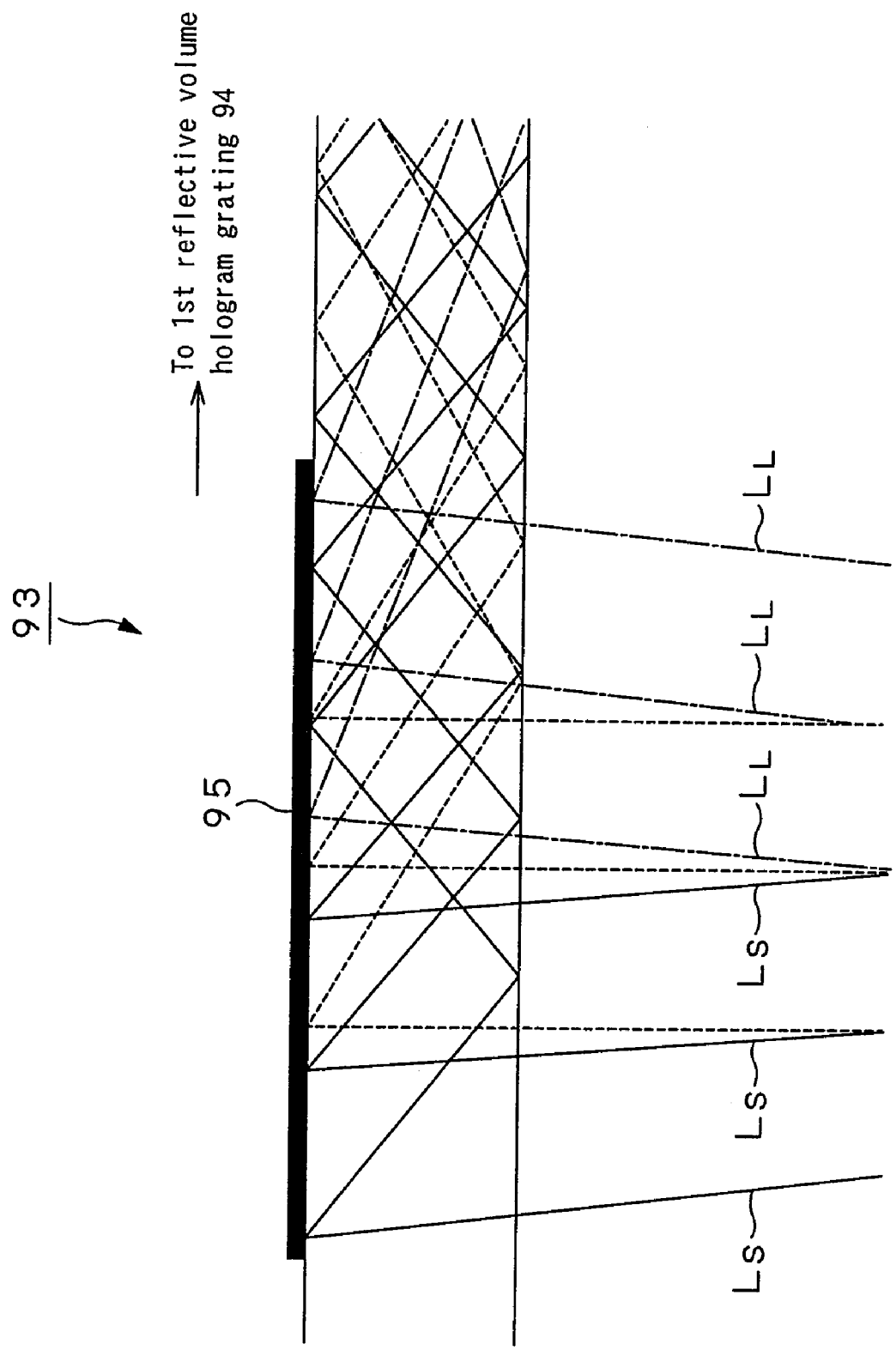
FIG. 23 is a side elevation of the second reflection volume hologram grating included in the virtual image display device in FIG. 22, showing the diffraction and reflection by the grating.

FIG. 23 shows parallel pencil groups diffracted and reflected by the first reflection volume hologram grating 94, totally reflected inside the optical waveguide 93 and incident upon the second reflection volume hologram grating 95. The parallel pencils are incident upon the second reflection volume hologram grating 95 at different angles depending upon the position of incidence as shown in FIG. 23.

More specifically, upon a position of the second reflection volume hologram grating 95, near the first reflection volume hologram grating 94, there are incident both a parallel pencil being a parallel pencil LL guided by internal total reflection at a large angle and having such an angle of field that the beam has been internally total-reflected a small number of times and a parallel pencil being a parallel pencil LS guided by internal total reflection at a small angle and having such an angle of field that the beam has been internally total-reflected a large number of times.

Note that the parallel pencil indicated with a dashed line in FIG. 23 is a parallel pencil LM having been guided by internal total reflection at an angle that is intermediate between the angles of total reflection of the parallel pencil LL having been guided by the internal total reflection at the large angle and parallel pencil LS having been guided by the internal total reflection at the small angle.

On the other hand, upon a position of the second reflection volume hologram grating 95, distant from the first reflection volume hologram grating 94, there are incident mainly the parallel pencil LS having been guided by internal total reflection at a small angle.

That is, the parallel pencil incident upon each position on the second reflection volume hologram grating 95 will have the incident angle hereof determined to some extent. For example, it is assumed here that the second reflection volume hologram grating 95 has recorded thereon such an interference fringe as will evenly diffract and reflect a parallel pencil incident at an angle having some range in any position like the first reflection volume hologram grating 94. This is effective for increasing the pupil diameter, but in case the pupil has a fixed diameter, the light amount incident upon the pupil 16 will be reduced and the display image provided to the viewer will be very dark.

On this account, the second reflection volume hologram grating 95 is designed, based on the fact that the incident angle of a parallel pencil varies depending upon the incident position, to have recorded thereon such an interference fringe that a parallel pencil incident at an angle corresponding to its incident position will be diffracted with the maximum efficiency.

Figure 24:
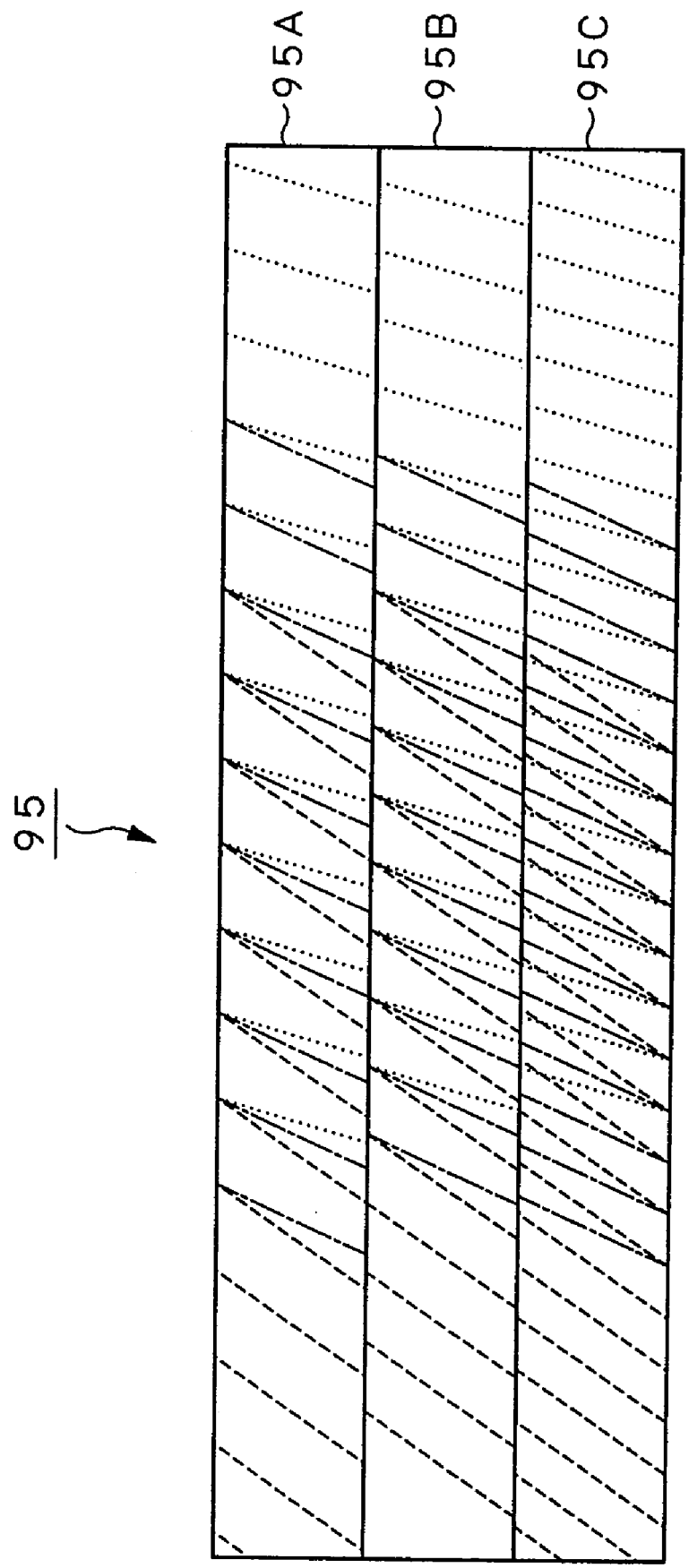
FIG. 24 is a side elevation of the second reflection volume hologram grating included in the virtual image display device in FIG. 22.

For example, the second reflection volume hologram grating 95 is formed from a stack of hologram layers 95A, 95B and 95C each having an interference fringe as shown in FIG. 24. The three hologram layers 95A, 95B and 95C have recorded thereon interference fringes different in grating pitch from each other to diffract and reflect mainly any of red, green and blue light, respectively.

Next, the interference fringe recorded on the hologram layer 95C of the second reflection volume hologram grating 95 shown in FIG. 24 will be explained with reference to FIG. 25. It should be noted that the interference fringes recorded on the hologram layers 95A and 95B will not be explained because they are similar to that recorded on the hologram layer 95C except that they are recorded with grating pitches different from that of the interference fringe on the hologram layer 95C. Also it should be noted that in FIG. 25, the side of the hologram layer 95C near the first reflection volume hologram grating 94 when provided on the optical waveguide 93 is taken as "R" side and the side opposite to this "R" side is taken as "L" side.

At the R side of the hologram layer 95C, an interference fringe 95R whose slant angle θR is small is recorded to a region R for a higher efficiency of diffracting a parallel pencil incident at a large angle. Also, at the L side, an interference fringe 95L whose slant angle θL is large is recorded to a region L for a higher efficiency of diffracting a parallel pencil incident at a small angle. An interference fringe 95M whose slant angle θM is intermediate between the slant angles θR and θL is recorded in a region M between the R and L sides.

The interference fringes 95R, 95L and 95M are different in slant angle from each other as above. However, they are laid with the same grating pitch on a hologram surface 95CS. Unless all the interference fringes are laid with the same grating pitch, parallel pencils incident with the same wavelength and at the same angle will be diffracted and reflected at different angles of diffraction. Such parallel pencils arriving at the pupil 16 of the viewer will form in a low-resolution, out-of-focus image.

The interference fringe recorded on each of the hologram layers 95A and 95B is a combination of three types of interference fringes different in slant angle from each other as in the hologram layer 95C except that the grating pitch is altered for diffraction and reflection of a parallel pencil of a waveband different from that mainly for diffraction and reflection by the hologram layer 95C.

Figure 25:
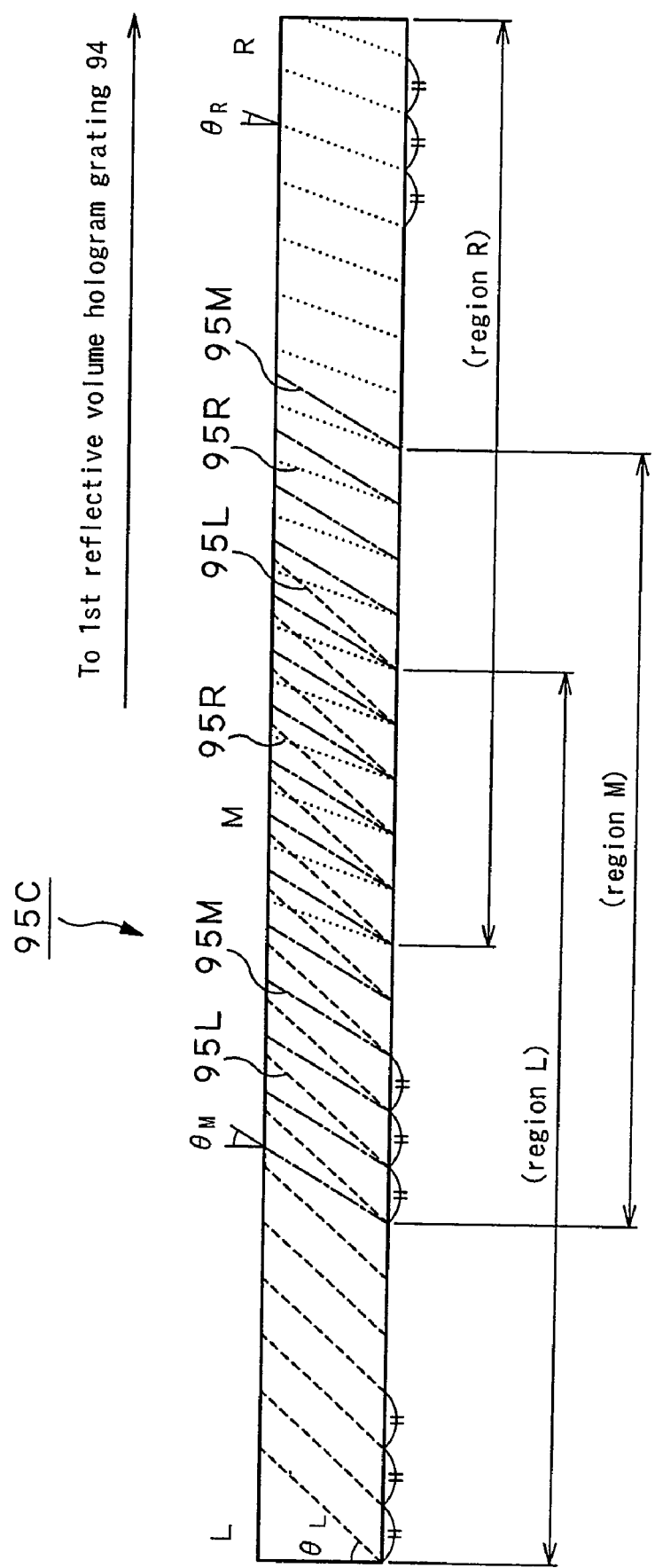
FIG. 25 is a side elevation of one of hologram layers included in the second reflection volume hologram grating in FIG. 22.

The hologram layer 95C shown in FIG. 25 has recorded thereon a combination of three types of interference fringes. It should be noted however that a stack of holograms having interference fringes 95R, 95L and 95M recorded thereon respectively as shown in FIG. 26 provides quite the same effect.

Figure 26:
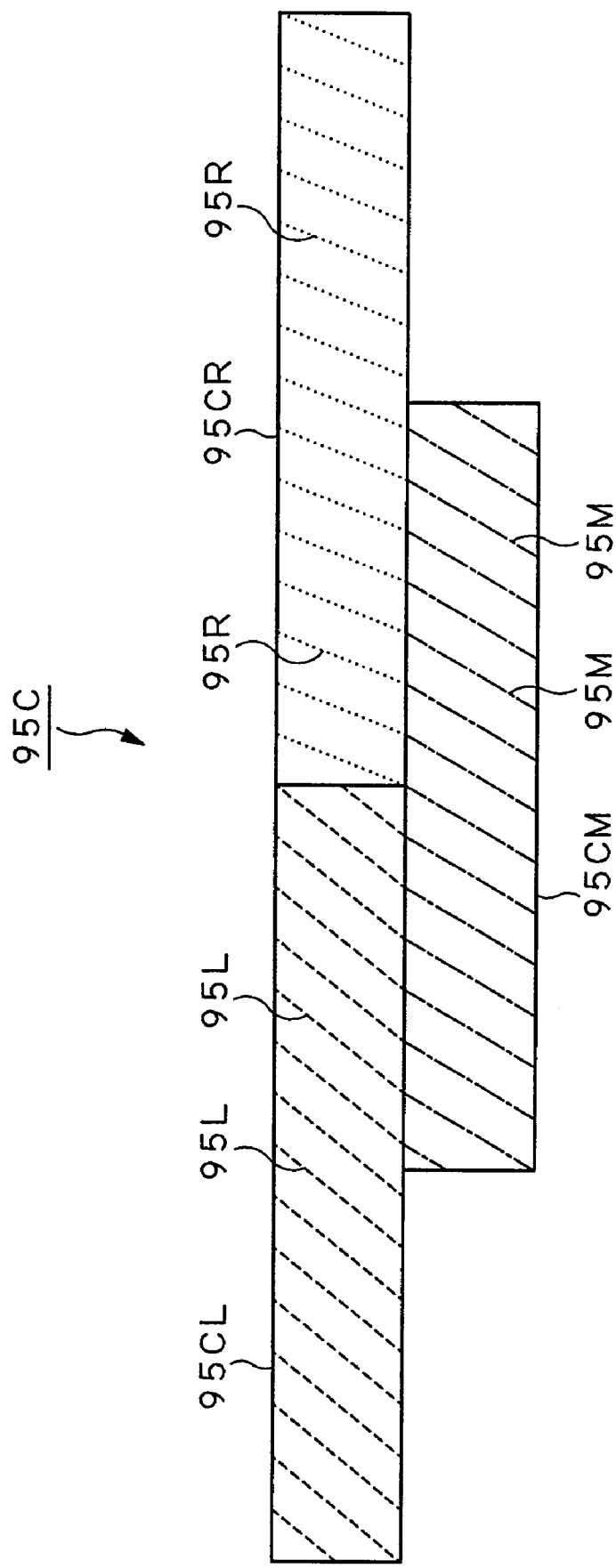
FIG. 26 is a side elevation of a variant of the hologram in the second reflection volume hologram grating in FIG. 22.

In the hologram layer 95C shown in FIG. 26, the hologram layers 95CR, 95CL and 95CM have the interference fringes 95R, 95L and 95M recorded thereon respectively, and the hologram layer 95CM is stacked in the intermediate position between the hologram layers 95CR and 95CL laid horizontally.

As mentioned above, by altering the slant angle of the interference fringe recorded on each of the regions R, L and M of the hologram layer included in the second reflection volume hologram grating 95, the diffraction can be made with a maximum efficiency correspondingly to the incident angle of an incident parallel pencil. On this account, a slant angle of an interference fringe for the maximum diffraction efficiency will be explained below taking a reflection volume hologram grating 96 shown in FIG. 27 as an example.

Figure 27:
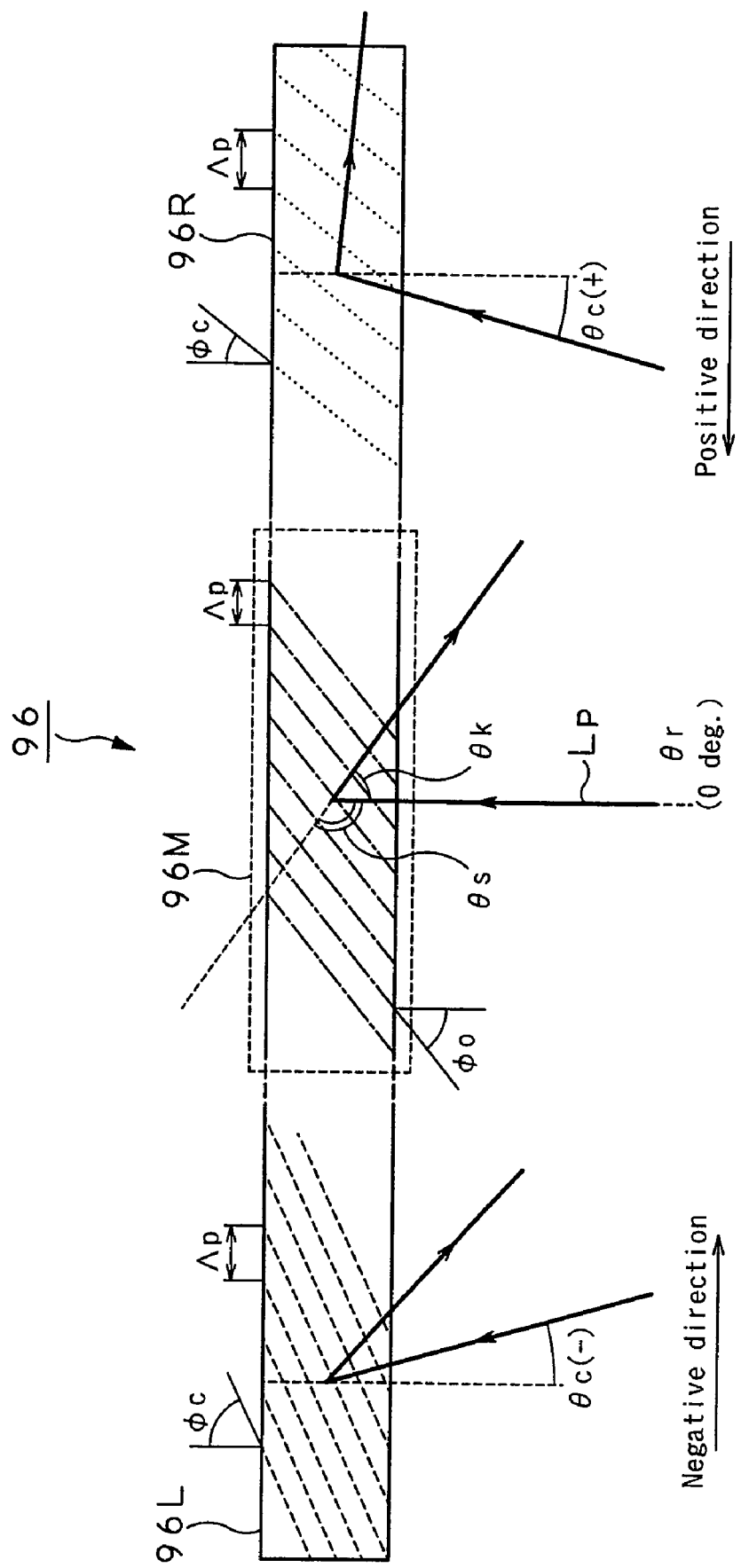
FIG. 27 explains the relation between the slant angle of an interference fringe recorded on the second reflection volume hologram grating in FIG. 22 and incident angle of incident parallel pencils.

For the convenience of explanation of the slant angle, it is assumed that the reflection volume hologram grating 96 shown in FIG. 27 is provided in place of the second reflection volume hologram grating 95 in the virtual image display device 90 shown in FIG. 25 and the pencil is traced starting at the pupil 16 of the viewer on the basis of the fact that the reflection volume hologram grating is reversible in property. Namely, the explanation will be given on the assumption that display light projected from a virtually provided image display element is collimated by the collimating optical system into a parallel pencil having a horizontal angle of field ±about 10 deg. and incident upon the reflection volume hologram grating 96 shown in FIG. 27. In this case, the incident light upon the reflection volume hologram grating 96 corresponds to the light diffracted and reflected by the second reflection volume hologram grating 95 and the light diffracted and reflected by the reflection volume hologram grating 96 corresponds to the incident light upon the second reflection volume hologram grating 95.

For diffraction and reflection of all incident parallel light-beams to meet a condition of total reflection inside the optical waveguide 93 in case the parallel light-beams of a horizontal angle of field ±about 10 deg. are incident upon the reflection volume hologram grating 96, the angle of diffraction and reflection has to be 55 to 60 deg. when there are incident a parallel pencil Lp at the central angle of field is incident at an angle of 0 deg.

That is, when the angle of diffraction and reflection is other than 55 to 60 deg. in case the parallel pencil Lp is incident at 0 deg., some of the parallel pencils incident at an angle other than 0 deg within a range of ±10 deg. will be diffracted and reflected at an angle not meeting the condition of total reflection inside the optical waveguide 93.

It is assumed here that in the hologram region 96M of the reflection volume hologram grating 96 shown in FIG. 27, there is recorded an interference fringe that diffracts and reflects, at angle θk of 55 to 60 deg., the parallel pencil Lp incident at an angle of 0 deg. upon the hologram region 96M. It should be noted that the angle θk of diffraction and reflection is represented by an angle of projection diffraction as a practice of coordinate definition as shown in FIG. 27. The angle θs is 120 to 125 deg.

The angle θr of incidence upon the hologram region 96M where the above interference fringe is recorded and angle θs of projection diffraction can be given by the following equation (1):

$$\sin \theta s = \sin \theta r + \lambda/\Lambda p \tag{1}$$

where λ is the wavelength of the incident parallel pencil and Λp is the grating pitch of the interference fringe on the hologram surface.

Also, in case the grating pitch Λp of the recorded interference fringe meets the equation (1), the slant angle φ0 of the interference fringe for a maximum diffraction efficiency when a parallel pencil is incident at the angle θr and diffracted and reflected at the angle θs can be given by the following equation (2) based on the Bragg condition:

$$\phi 0 = (\theta s + \theta r)/2 \tag{2}$$

Since it is when the parallel pencil is specular-reflected by the interference fringe that the parallel pencil incident at an angle θ and having been diffracted and reflected at the angle θs is diffracted with a maximum efficiency, the slant angle φ0 is also given by the equation (2).

Note here that the permissible range of incident angle for keeping the maximum diffraction efficiency of the grating of the reflection volume hologram grating is normally 0±3 deg. as shown in FIG. 6. Therefore, for any parallel pencil incident at an angle larger or smaller than above, a new interference fringe slanted at a different angle has to be recorded for diffraction and reflection at a maximum efficiency.

At this time, the grating pitch of the new interference fringe to be recorded has to be the same as that of the existing interference fringes. If the grating pitch of the interference fringes is altered, when parallel pencils of the same wavelength are incident at the same angle, the angle of projection diffraction will vary at the respective interference fringes, leading to a lower resolution.

Recording of interference fringes other than recorded in the hologram region 96M to the reflection volume hologram grating 96 will be considered. More specifically, it is assumed that there is newly recorded such an interference fringe which will radiate and diffract at an angle θc' when a parallel pencil having a wavelength λ is incident at an angle θc within a range of ±10 deg. or so. The grating pitch of the new interference fringe should be the same as that Λp of the interference fringe pre-recorded in the hologram region 96M.

At this time, the angle θc' of projection and diffraction is sin θc'=sin θc+λ/Λp: (λ/Λp=C) and can be given by the following equation (3):

$$\theta c' = \arcsin(\sin \theta c + C) \tag{3}$$

At this time, the slant angle φc for the maximum diffraction efficiency is φc=(θc'+θc)/2, and thus can be given by the following equation (4):

$$\phi c = \{\arcsin(\sin \theta c + C) + \theta c\}/2 \tag{4}$$

where C=λ/Λp.

Figure 28:
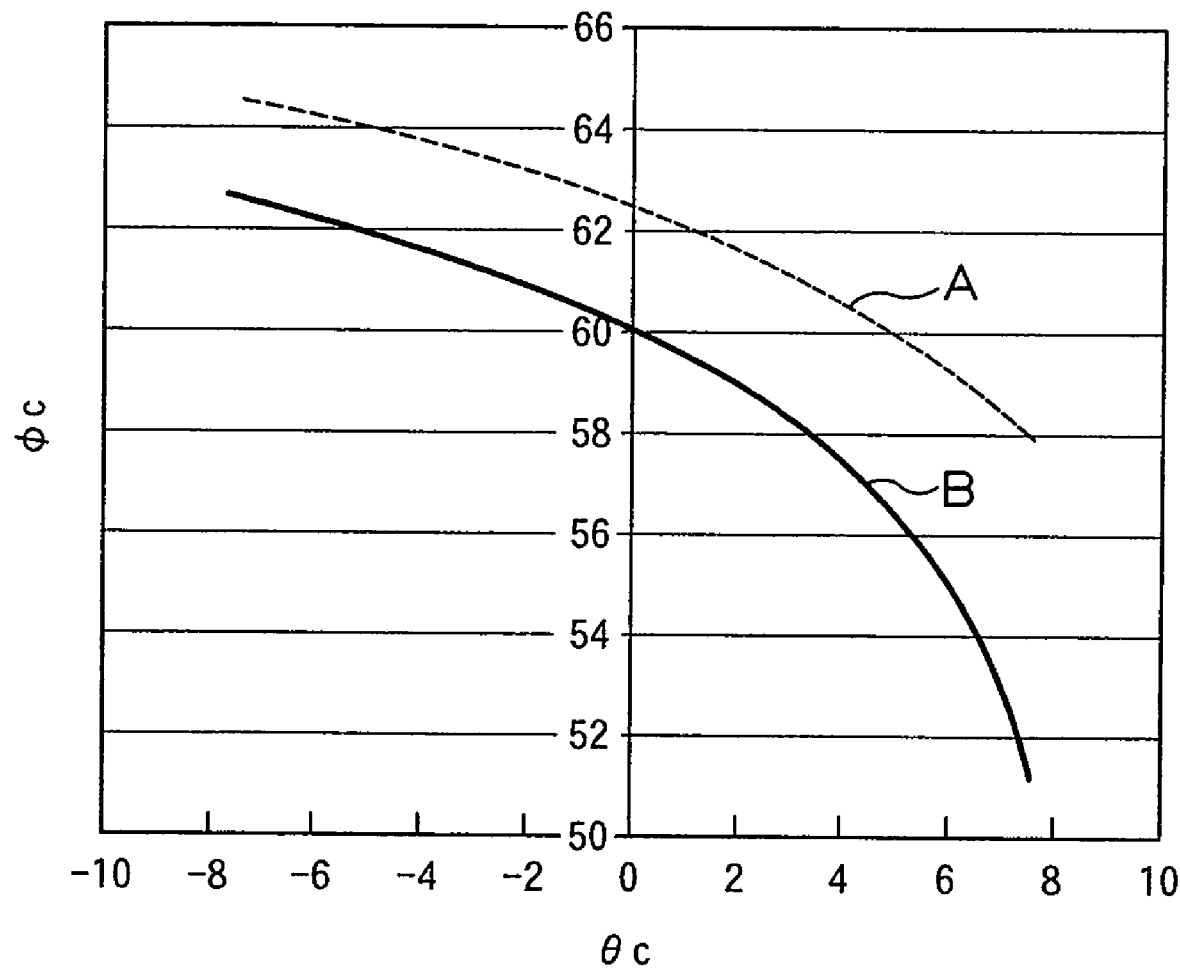
FIG. 28 shows a variation of the slant angle of an interference fringe for a maximum diffraction efficiency when a parallel pencil is incident at a different angle upon the second reflection volume hologram grating in FIG. 22.

FIG. 28 shows a plot of the variation, plotted using the above equation (4), of the slant angle θc of the interference fringe for maximum diffraction efficiency when a parallel pencil is incident at an angle θc changed within a range of about ±10 deg. The grating pitch Λp can be calculated by the equation (1). In FIG. 28, the dashed line A indicates the slant angle φc for the maximum efficiency of diffraction of parallel pencil incident at the angle θc when the grating pitch Λp is determined with an incident angle θr of 0 deg. and projection and diffraction angle θs of 125 deg. The solid line B in FIG. 28 indicates the slant angle θc for the maximum efficiency of diffraction of parallel pencil incident at the angle θc when the grating pitch Λp is determined with an incident angle θr of 0 deg. and projection and diffraction angle θs of 120 deg.

As shown in FIG. 28, the slant angle c for the maximum diffraction efficiency is larger with a parallel pencil incident at a negative-going angle of field and smaller with a parallel pencil incident at a positive-going angle of field.

As shown in FIG. 27 for example, when an interference fringe of a smaller slant angle θc than that of the interference fringes recorded in the hologram region 96M is recorded with a grating pitch Λp in the hologram region 96R of the reflection volume hologram grating 96, the parallel pencil incident at a positive-going angle of field can be diffracted with a maximum efficiency.

Also, when an interference fringe of a larger slant angle θc than that of the interference fringes recorded in the hologram region 96M is recorded with a grating pitch Λp in the hologram region 96L of the reflection volume hologram grating 96, the parallel pencil incident at a negative-going angle of field can be diffracted with a maximum efficiency.

Therefore, the second reflection volume hologram grating 95 included in the virtual image display device 90 shown in FIG. 24 can provide very efficient diffraction and reflection with the slant angle of the interference fringe near the first reflection volume hologram grating 94 being reduced while the slant angle of the interference fringe distant from the first reflection volume hologram grating 94 is increased. Thus, the light amount of an image incident as a virtual image to the pupil of a predetermined diameter can be increased considerably.

Provided with the first and second reflection volume hologram gratings 94 and 95 that do not act as any lens, the virtual image display device 90 can eliminate and reduce the monochromatic eccentric aberration and diffraction chromatic aberration.

Note that although the first and second reflection volume hologram gratings 94 and 95 are disposed for their hologram surfaces to be parallel to the optical surface 93b of the optical waveguide 93, the present invention is not limited to this geometry but they may be disposed for their hologram surfaces to be at a predetermined angle in relation to the optical surface 93b.

Since the optical waveguide included in the virtual image optical devices having been described as the first to sixth embodiments of the present invention can be designed slimmer, so this virtual image display device used as an HMD (Head Mounted Display) will be considerably less uncomfortable to the viewer wearing the HMD.

Note that although the first to sixth embodiments of the present invention have been described and illustrated in the foregoing as ones having the optical waveguides 13, 23, 43, 63, 83 and 93, respectively, that are all a slim, parallel, flat one, the present invention is not limited to any such slim optical waveguide but a optical waveguide, gently curved, can be equal in effect to the parallel, flat optical waveguides.

Also, in the aforementioned first to sixth embodiments of the present invention, the collimating optical system may be formed from a combination of a reflection optical element and optical lens, for example, for a more compact and lightweight device. There will be described the seventh to fifteenth embodiments of the present invention adopting a collimator compact and of which the curvature of field is extremely small for an improved resolution of the image display device and a more compact and lightweight of the entire device.

Seventh Embodiment

Figure 29:
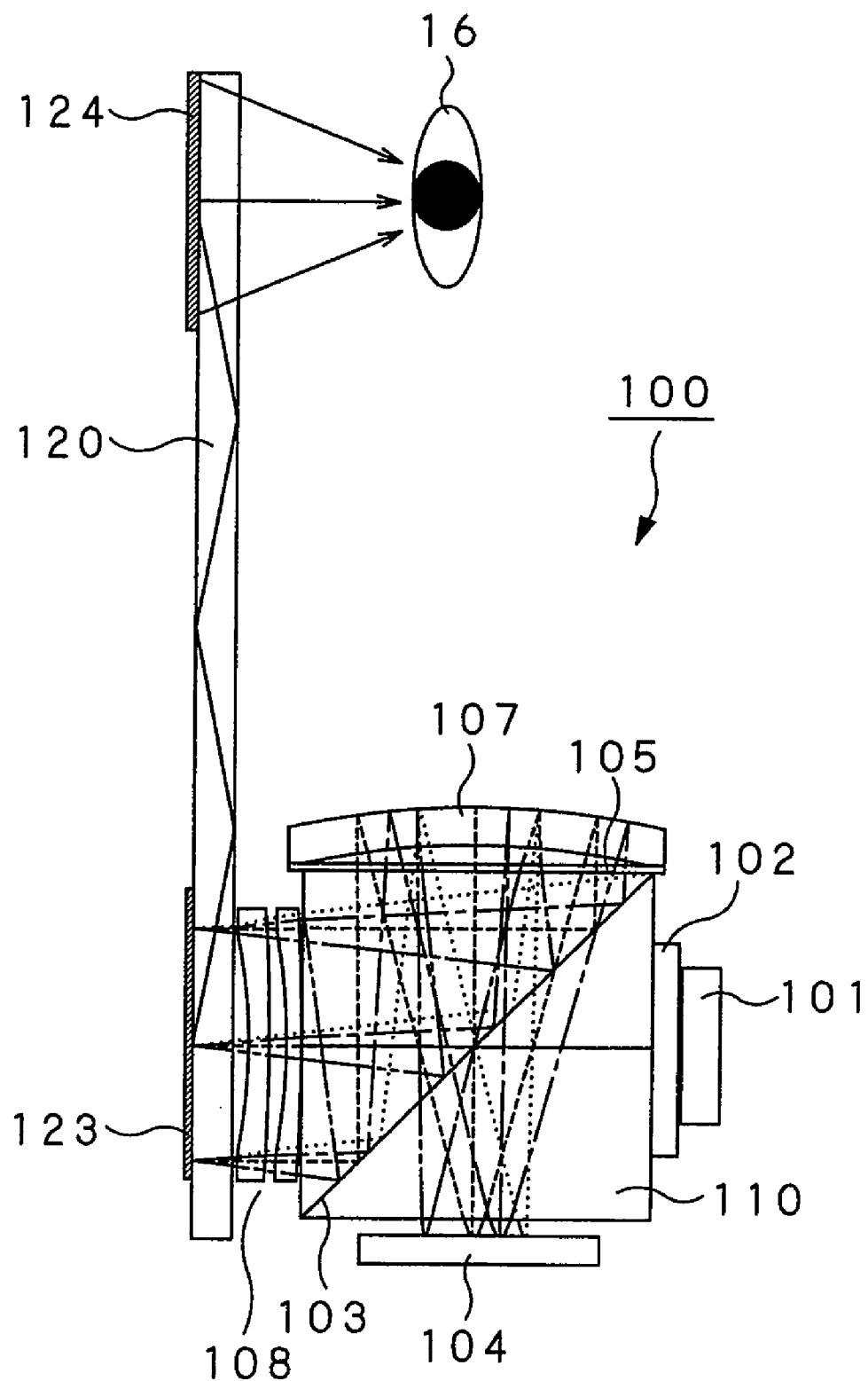
FIG. 29 is a side elevation of an image display device as a seventh embodiment of the present invention.

FIG. 29 shows an image display device as a seventh embodiment of the present invention. The image display device is generally indicated with a reference numeral 100.

The image display device 100 includes an illumination light source 101, reflection spatial optical-modulating element 104 to reflect illumination light emitted from the illumination light source 101 and make spatial modulation of the light, and a virtual image optical system to receive the illumination light spatial-modulated by the reflection spatial optical-modulating element 104 and guide it to the pupil 16 of the viewer.

The reflection spatial optical modulator 104 is for example a reflection liquid crystal display or the like, and it makes spatial modulation of incident illumination light per pixel. The spatial-modulated illumination light is incident upon the virtual image optical system.

The virtual image optical system includes a collimating optical system, optical waveguide 120, and first and second reflection hologram elements 123 and 124 provided on the optical waveguide 120.

The first and second reflection hologram elements 123 and 124 are designed similarly to the first and second reflection volume hologram gratings 14 and 15 shown in FIGS. 5, 6 and 7, for example.

Note that the first and second reflection hologram elements 123 and 124 may be constructed similarly to the first ad second reflection volume hologram gratings 24 and 25 shown in FIGS. 8, 9 and 10. Also, they may be constructed similarly to the first and second reflection volume hologram gratings 44 and 45 shown in FIGS. 11, 12 and 13. Moreover, they may be constructed similarly to the first and second reflection volume hologram gratings 64 and 65 shown in FIGS. 14, 15 and 16. Also, they may be constructed similarly to the first and second reflection volume hologram gratings 94, 95 and 96 shown in FIGS. 20, 21 and 24.

The collimating optical system includes an aspheric concave mirror 107 as a reflection optical element to reflect light from the reflection type spatial optical modulator 104, aspheric optical lens 108 as an optical lens to refract light from the aspheric concave mirror 107, polarizing beam splitter (PBS) 110 disposed between the reflection spatial optical modulator 104 and aspheric concave mirror 107, and a quarter waveplate 105 disposed between the polarizing beam splitter 110 and aspheric concave mirror 107. This collimating optical system is to project light reflected at an arbitrary position on the reflecting surface of the reflection spatial optical modulator 104 as parallel pencil groups from the optical lens 108.

The polarizing beam splitter 110 includes a polarizing selective reflecting surface 103 formed from a polymer film as a polarized light selector to allow P-polarized light to pass by and reflect S-polarized light.

The illumination light source 101, reflection spatial optical modulator 104, aspheric concave mirror 107 and aspheric optical lens 108 are disposed near or in close contact with four optical surfaces, respectively, of the polarizing beam splitter 101. Between the illumination light source 111 and polarizing beam splitter 110, there is provided a polarization plate 102.

Illumination light projected from the illumination light source 101 is detected by the polarization plate 102 to be an S-polarized light to the polarizing selective reflecting surface 103 of the polarizing beam splitter 110, and the majority of the light is reflected by the polarizing selective reflecting surface 103. The illumination light thus reflected illuminates the reflection spatial optical modulator 104 where it will be reflected in the incident polarizing direction kept as it is or in a direction resulted from rotation of the incident polarizing direction through 90 deg.

In case the illuminated light has been reflected in the polarizing direction kept as it is, it will be reflected again at the polarizing selective reflecting surface 103 and return to the illumination light source 101. On the other hand, the light of which the polarizing direction has been rotated through 90 deg. and which has become a P-polarized light to the polarizing selective reflecting surface 103 passes by the surface 103 and is reflected by the aspheric concave mirror 107.

In this case, the quarter waveplate 105 is provided between the aspheric concave mirror 107 and polarizing beam splitter 110 to rotate the polarizing direction of the light reflected by the aspheric concave mirror 107 through 90 deg. and the light is incident as an S-polarized light again upon the polarizing selective reflecting surface 103. The light is thus reflected at this polarizing selective reflecting surface 103. The light is projected from the polarizing beam splitter 110 and incident upon an optical waveguide 120 through the aspheric optical lens 108.

The light incident upon the optical waveguide 120 is diffracted and reflected by the first reflection hologram element 123 for total reflection inside the optical waveguide 120, and travels through the optical waveguide 120 while being total-reflected. The light is diffracted and reflected by the second reflection hologram element 124 provided at the other end to depart from the condition of total reflection, projected from the optical waveguide 120 for incidence upon the pupil 16 of the viewer.

At this time, the divergent light projected from the reflection spatial optical modulator 104 is formed by a combination of the aspheric concave mirror 107 and aspheric optical lens 108 into parallel pencil groups whose curvature of field is very small.

The image display device 100 according to the present invention includes the reflection spatial optical modulator 104, collimating optical system to form the light reflected from the reflection spatial optical modulator 104 into parallel pencil groups, and waveguide optical system to guide the group of parallel pencils projected from the collimating optical system by total reflection inside the waveguide optical system.

By forming the collimating optical system from a combination of the aspheric concave minor 107 as a reflecting optical element and the aspheric optical lens 108 as an optical lens, it is possible to implement a collimator compact and of which the curvature of field is extremely small for an improved image resolution of the image display device and a more compact and lightweight of the entire device.

Eighth Embodiment

Figure 30:
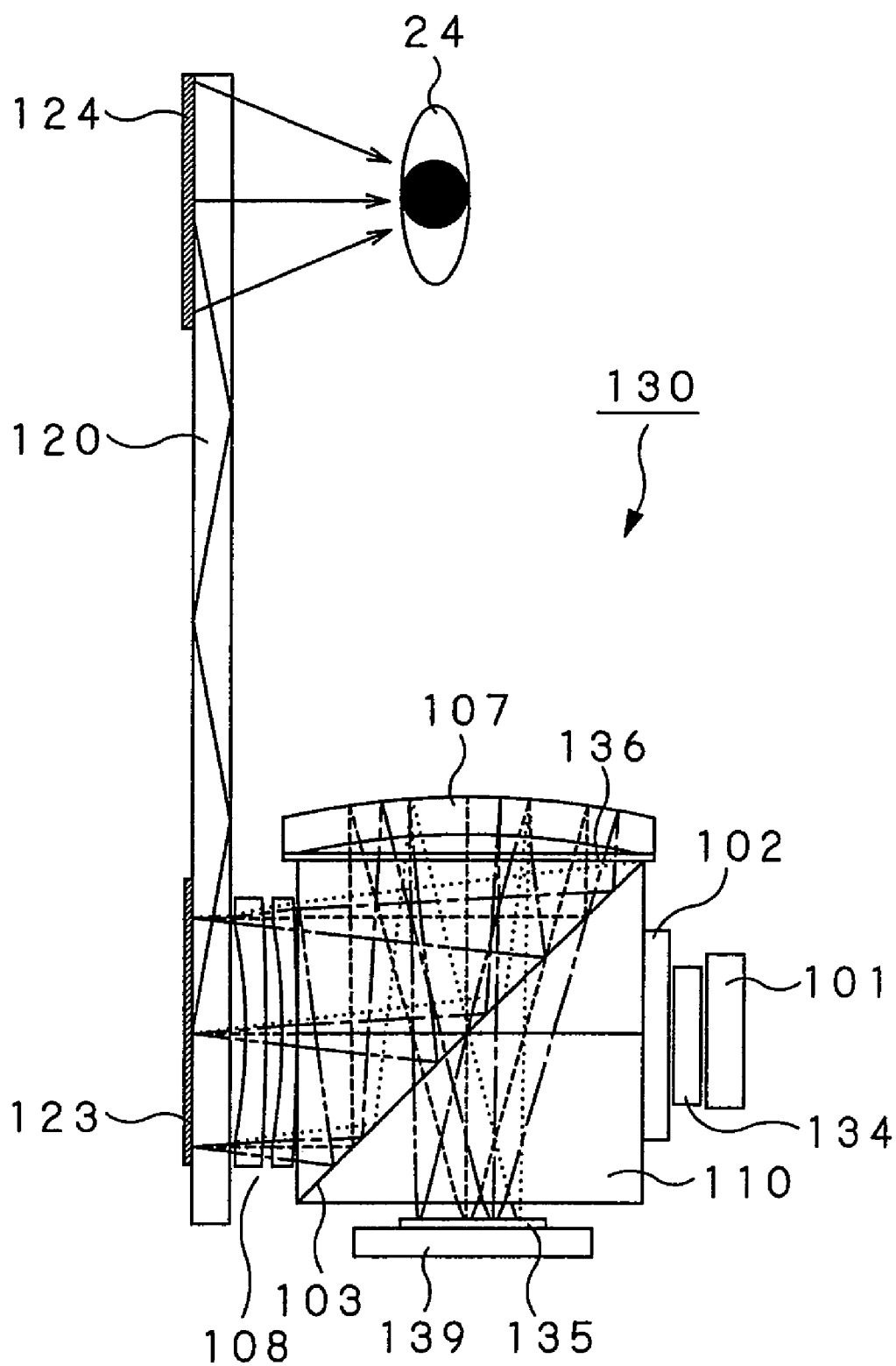
FIG. 30 is a side elevation of an image display device as an eighth embodiment of the present invention.

FIG. 30 shows an image display device as an eighth embodiment of the present invention. The image display device is generally indicated with a reference numeral 130. The image display device 130 includes an illumination light source 101, image display transmission liquid crystal image display element 134 as an image display element to display an image by making spatial modulation per pixel of illumination light emitted from the illumination light source 101, and a virtual image optical system to receive illumination light spatial-modulated by the transmission liquid crystal image display element 134 and guide it to the pupil 16 of the viewer.

The transmission liquid crystal image display element 134 is for example a transmission liquid crystal display or the like to make spatial modulation of incident illumination light per pixel. The spatial-modulated illumination light will be incident upon the virtual image optical system.

The virtual image optical system includes a collimating optical system, optical waveguide 120, and first and second reflection hologram elements 123 and 124 provided on the optical waveguide 120.

The collimating optical system includes a plane minor 139 as a first reflection optical element to reflect light projected from the transmission liquid crystal image display element 134, aspheric concave mirror 107 as a second transmission optical element to re-reflect the light reflected by the plane mirror 139, aspheric optical lens 108 as an optical lens to refract the light reflected by the aspheric concave mirror 107, polarizing beam splitter 110 provided between the plane mirror 139 and aspheric concave mirror 107, first quarter waveplate 135 provided between the plane mirror 139 and polarizing beam splitter 110, and a second quarter waveplate 136 provided between the polarizing beam splitter 110 and aspheric concave mirror 107. The collimating optical system is to project light projected from an arbitrary position on the image display surface of the transmission liquid crystal image display element 134 as a group of parallel pencils from the optical lens 108.

The transmission liquid crystal image display element 134, plane mirror 139, aspheric concave mirror 107 and aspheric optical lens 108 are disposed near or in close contact with four optical surfaces, respectively, of the polarizing beam splitter 134. An optical waveguide 120 is provided between the transmission liquid crystal image display element 134 and polarizing beam splitter 110.

Illumination light emitted from the illumination light source 101 illuminates the transmission liquid crystal image display element 134, the light projected from the transmission liquid crystal image display element 134 is detected by the polarization plate 102 to be an S-polarized light to the polarizing selective reflecting surface 103 of the polarizing beam splitter 110. The majority of the S-polarized light is reflected by the polarizing selective reflecting surface 103.

The reflected illumination light is re-reflected by the plane mirror 139 with which the first quarter waveplate 135 is in close contact, and incident again upon the polarizing selective reflecting surface 103. At this time, since the illumination light has been converted by the first quarter waveplate 135 into the P-polarized light, it will pass by the polarizing selective reflecting surface 103 and be reflected by the aspheric concave mirror 107.

In this case, the second quarter waveplate 136 is provided between the aspheric concave mirror 107 and polarizing beam splitter 110 to rotate the polarizing direction of the light reflected by the aspheric concave mirror 107 through 90 deg. and the light is incident as an S-polarized light again upon the polarizing selective reflecting surface 103. The light is thus reflected at this polarizing selective reflecting surface 103. The light is projected from the polarizing beam splitter 110 and incident upon an optical waveguide 120 through the aspheric optical lens 108.

The light incident upon the optical waveguide 120 is diffracted and reflected by the first reflection hologram element 123 for total reflection inside the optical waveguide 120, and travels through the optical waveguide 120 while being total-reflected. The light is diffracted and reflected by the second reflection hologram element 124 provided at the other end to depart from the condition of total reflection, projected from the optical waveguide 120 for incidence upon the pupil 16 of the viewer.

At this time, the divergent light projected from the transmission liquid crystal image display element 134 is formed by a combination of the aspheric concave mirror 107 and aspheric optical lens 108 into parallel pencil groups whose curvature of field is very small.

The image display device 130 according to the present invention includes the transmission liquid crystal image display element 134 as an image display element, collimating optical system to form the light projected from the transmission liquid crystal image display element 134 into parallel pencil groups, and waveguide optical system to guide the group of parallel pencils projected from the collimating optical system by total reflection inside waveguide optical system. By forming the collimating optical system from a combination of the aspheric concave mirror 107 as a reflecting optical element and the aspheric optical lens 108 as an optical lens, it is possible to implement a collimator compact and of which the curvature of field is extremely small for an improved image resolution of the image display device and a more compact and lightweight of the entire device.

Ninth Embodiment

Figure 31:
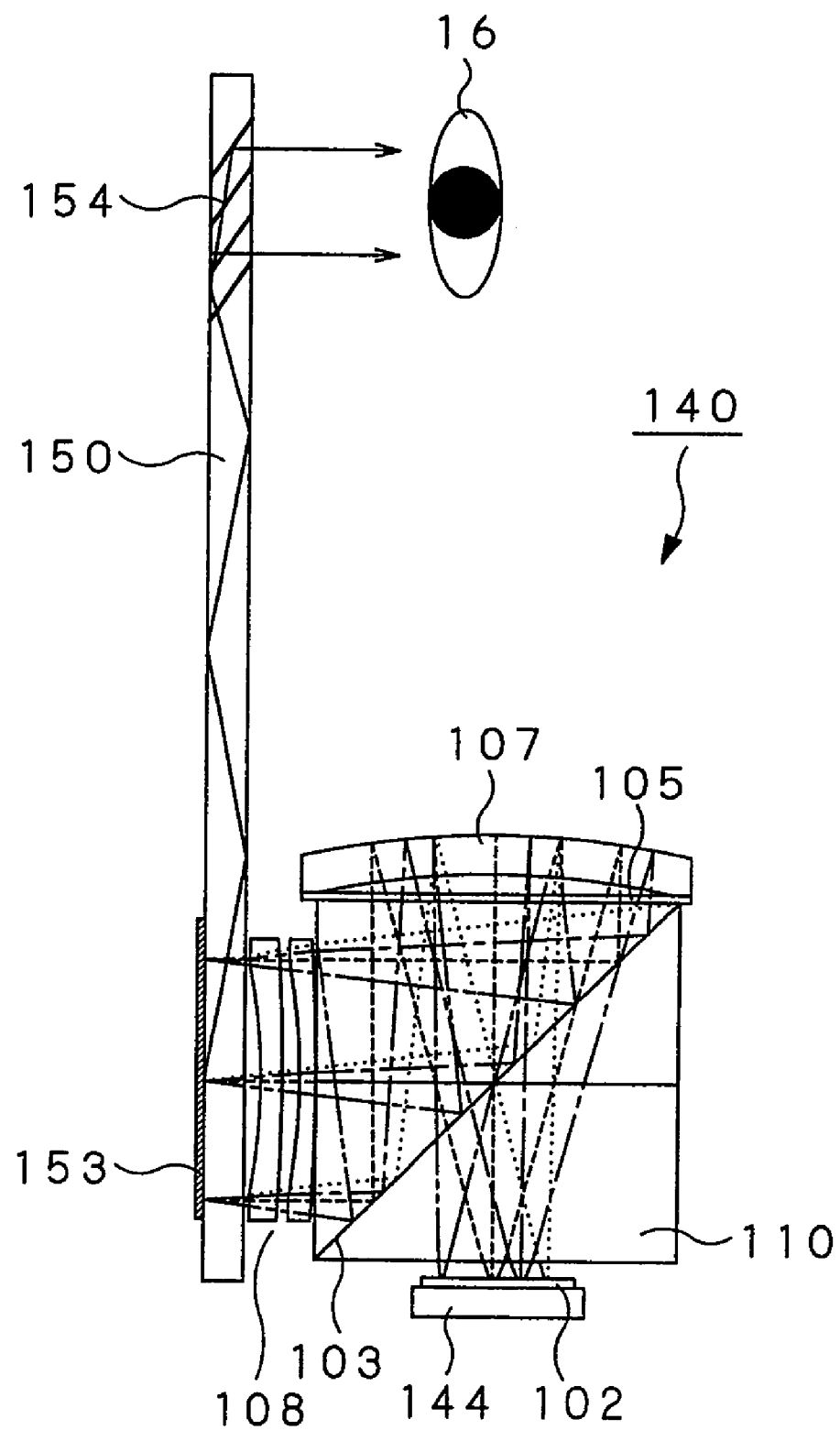
FIG. 31 is a side elevation of an image display device as a ninth embodiment of the present invention.

FIG. 31 shows a virtual image display device as a ninth embodiment of the present invention. The virtual image display device is generally indicated with a reference numeral 140. The virtual image display device 140 includes an image display element 144 to display an image, and a virtual image optical system to guide incident display light displayed on the image display element 144 to a pupil 16 of the viewer.

The image display element 144 is for example an organic EL (Electro Luminescence) display, inorganic EL display, liquid crystal display (LCD) or the like.

The virtual optical system includes a collimating optical system and waveguide optical system. The waveguide optical system includes an optical waveguide 150, reflecting mirror 153 provided at one end of the optical waveguide 150, and a group of translucent mirrors 154 provided at the other end and parallel to each other. The virtual optical system totally reflects incident group of parallel pencils inside it, and then projects the group of parallel pencils thus total-reflected as it is to outside.

The collimating optical system includes an aspheric concave mirror 107 as a reflection optical element to reflect light from the image display element 144, aspheric optical lens 108 as an optical lens to refract light from the aspheric concave mirror 107, polarizing beam splitter (PBS) 110 disposed between the image display element 144 and aspheric concave mirror 107, and a quarter waveplate 105 disposed between the polarizing beam splitter 110 and aspheric concave mirror 107. This collimating optical system is to project light coming from an arbitrary position on the reflecting surface of the image display element 144 as parallel pencil groups from the optical lens 108.

The image display element 144, aspheric concave mirror 107 and aspheric optical lens 108 are disposed near or in close contact with three optical surfaces, respectively, of the polarizing beam splitter 110. A polarization plate 102 is provided between the image display element 144 and polarizing beam splitter 110.

The light projected from the image display element 144 is detected by the polarizing plate 102 to be a P-polarized light to the polarizing selective reflecting surface 103 of the polarizing beam splitter 110. The majority of the P-polarized light is allowed by the polarizing selective reflecting surface 103 to pass by. The passing light is reflected by the aspheric concave mirror 107 with which the quarter waveplate 105 is in close contact, and incident again upon the polarizing selective reflecting surface 103. At this time, since the light has been converted by the quarter waveplate 105 into an S-polarized light, so it is reflected by the polarizing selective reflecting surface 103. The light is projected from the polarizing beam splitter 110 and incident upon the optical waveguide 150 through the aspheric optical lens 108.

The light incident upon the optical waveguide 150 is reflected by the reflecting mirror 153 to be total-reflected inside the optical waveguide 150, and travels while being total-reflected inside the optical waveguide 150. Then, it is reflected by the group of translucent mirrors 154 provided at the other end and parallel to each other to depart from the condition of total reflection, projected from the optical waveguide 150 and incident upon the pupil 16 of the viewer.

At this time, the divergent light projected from the image display element 144 is formed by the combination of the aspheric concave mirror 107 and aspheric optical lens 108 into parallel pencil groups of which the curvature of field is very small.

The image display device 140 according to the present invention includes an image display element 144, collimating optical system to form the light projected from the image display element 144 into parallel pencil groups, and waveguide optical system to guide the group of parallel pencils projected from the collimating optical system by total reflection inside waveguide optical system. By forming the collimating optical system from a combination of the aspheric concave mirror 107 as a reflecting optical element and the aspheric optical lens 108 as an optical lens, it is possible to implement a collimator compact and of which the curvature of field is extremely small for an improved image resolution of the image display device and a more compact and lightweight of the entire device.

Tenth Embodiment

Figure 32:
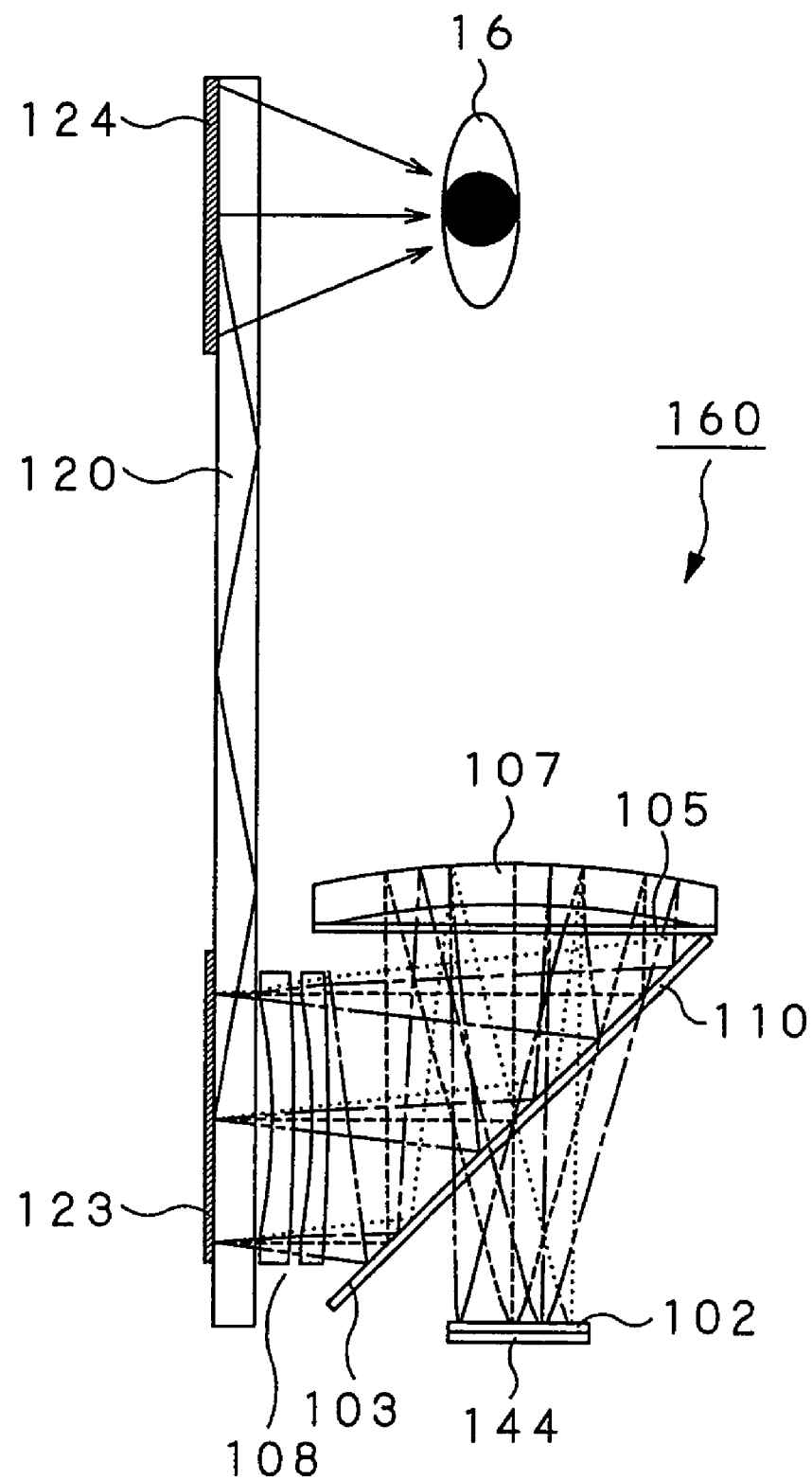
FIG. 32 is a side elevation of an image display device as a tenth embodiment of the present invention.

FIG. 32 shows an image display device as a tenth embodiment of the present invention. The image display device is generally indicated with a reference numeral 160. The image display device 160 includes an image display element 144 to display an image, and a virtual image optical system to guide incident display light displayed on the image display element 144 to a pupil 16 of the viewer.

The virtual image optical system includes a collimating optical system and waveguide optical system. The waveguide optical system includes an optical waveguide 120, and first and second reflection hologram elements 123 and 124 provided on the optical waveguide 120.

The collimating optical system includes an aspheric concave mirror 107 as a reflection optical element to reflect light from the image display element 144, aspheric optical lens 108 as an optical lens to refract light from the aspheric concave mirror 107, polarizing beam splitter 110 disposed between the image display element 144 and aspheric concave mirror 107, and a quarter waveplate 105 disposed between the polarizing beam splitter 110 and aspheric concave mirror 107. This collimating optical system is to project light projected from an arbitrary position on the reflecting surface of the image display element 144 as parallel pencil groups from the optical lens 108.

The image display element 144, aspheric concave mirror 107 and aspheric optical lens 108 are disposed near or in close contact with three optical surfaces, respectively, of the polarizing beam splitter 110. A polarization plate 102 is provided between the image display element 144 and polarizing beam splitter 110.

The light projected from the image display element 144 is detected by the polarizing plate 102 to be a P-polarized light to the polarizing selective reflecting surface 103 of the polarizing beam splitter 110. The majority of the P-polarized light is allowed by the polarizing selective reflecting surface 103 to pass by. The passing light is reflected by the aspheric concave mirror 107 with which the quarter waveplate 105 is in close contact, and incident again upon the polarizing selective reflecting surface 103. At this time, since the light has been converted by the quarter waveplate 105 into an S-polarized light, so it is reflected by the polarizing selective reflecting surface 103. The light is incident upon the optical waveguide 120 through the aspheric optical lens 108.

The light incident upon the optical waveguide 120 is reflected by the first reflection hologram element 123 to be totally reflected inside the optical waveguide 120, and travels while being total-reflected inside the optical waveguide 120. Then, it is reflected by the second reflection hologram element 124 provided at the other end to depart from the condition of total reflection, projected from the optical waveguide 120 and incident upon the pupil 16 of the viewer.

At this time, the divergent light projected from the image display element 144 is formed by the combination of the aspheric concave mirror 107 and aspheric optical lens 108 into parallel pencil groups of which the curvature of field is very small.

The image display device 160 according to the present invention includes an image display element 144, collimating optical system to form the light projected from the image display element 144 into parallel pencil groups, and waveguide optical system to guide the group of parallel pencils projected from the collimating optical system by total reflection inside waveguide optical system. By forming the collimating optical system from a combination of the aspheric concave mirror 107 as a reflecting optical element and the aspheric optical lens 108 as an optical lens, it is possible to implement a collimator compact and of which the curvature of field is extremely small for an improved image resolution of the image display device and a more compact and lightweight of the entire device.

Eleventh Embodiment

Figure 33:
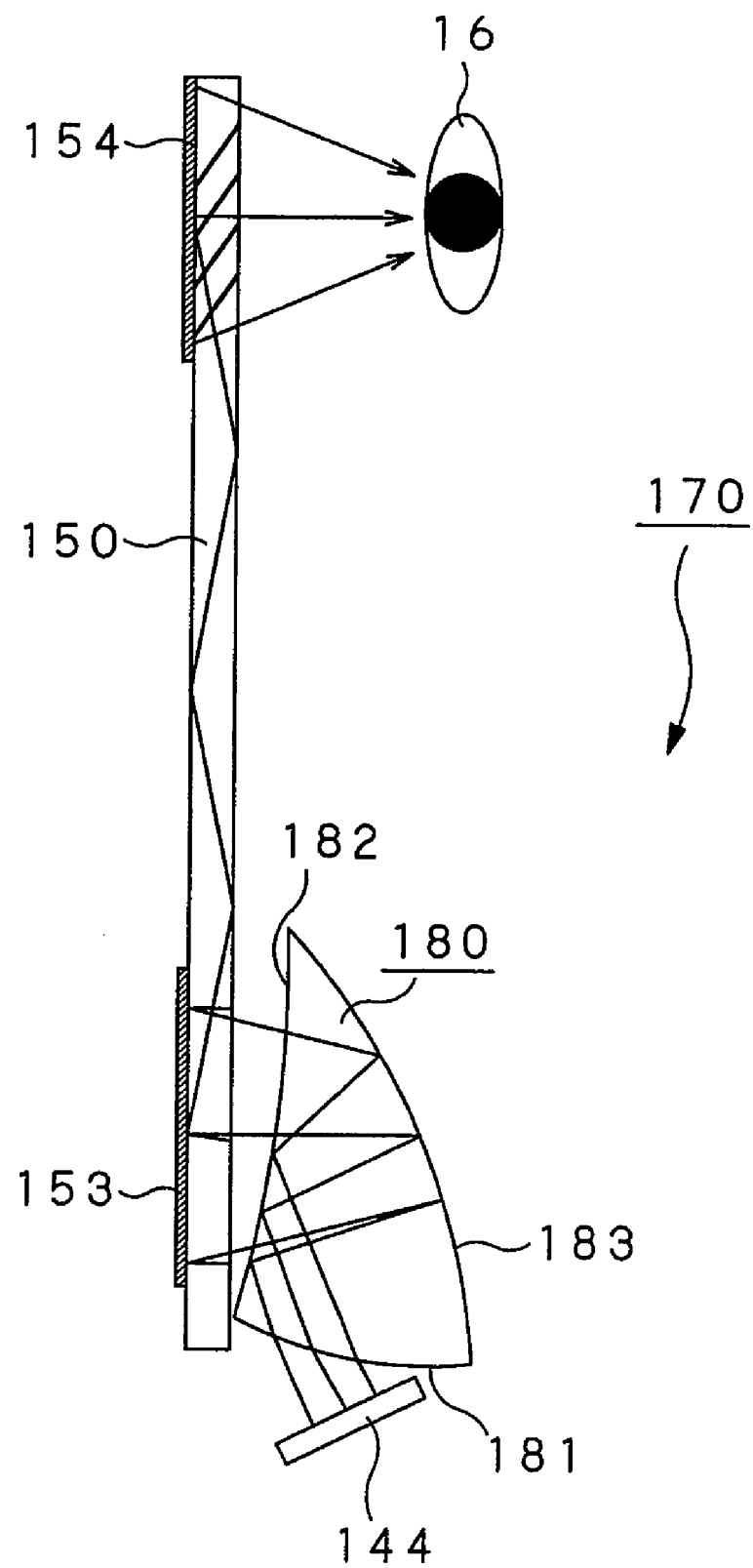
FIG. 33 is a side elevation of an image display device as an eleventh embodiment of the present invention.

FIG. 33 shows an image display device as an eleventh embodiment of the present invention. The image display device is generally indicated with a reference numeral 170. The image display device 170 includes an image display element 144 to display an image, and a virtual image optical system to guide incident display light displayed on the image display element 144 to a pupil 16 of the viewer.

The virtual image optical system includes a collimating optical system and waveguide optical system. The waveguide optical system includes an optical waveguide 150, reflecting mirror 153 provided at one end of the optical waveguide 150, and a group of translucent mirrors 154 provided at the other end and parallel to each other. The virtual image optical system totally reflects an incident group of parallel pencils inside it and ten projects it as it is to outside.

The collimating optical system includes a prism 180 having at least one total-reflecting surface. It is an optical system to project light projected from an arbitrary position on the image display surface of the image display element 144 as parallel pencil groups.

The prism 180 includes a first optical surface 181 provided at the light-incident side upon which the display light from the image display element 144 is incident and having no axis of rotational symmetry, a second optical surface 182 provided at the light-outgoing side contributed to both the internal total reflection and refraction, and an aluminum-made reflecting surface 183 as a third optical surface also contributed to the total reflection.

The pencil projected from the image display element 144 is incident upon the prism 180 formed from the optical surfaces having no axis of rotational symmetry first at the first optical surface 181. The pencil incident into the prism 180 is internally reflected at the second optical surface 182, then reflected at the aluminum-made reflecting surface 183, and incident again upon the second optical surface 182. At this time, the incident pencil does not meet the condition of internal total reflection, and so it will be refracted and pass by the second optical surface 182 for incidence upon the optical waveguide 120.

The light incident upon the optical waveguide 150 is reflected by the reflecting mirror 153 to be total-reflected inside the optical waveguide 150, and travels while being total-reflected inside the optical waveguide 150. Then, it is reflected by the group of translucent mirrors 154 provided at the other end and parallel to each other to depart from the condition of total reflection, projected from the optical waveguide 150 and incident upon the pupil 16 of the viewer.

At this time, the divergent light projected from the image display element 144 is formed by a combination of the second optical surface 182 and aluminum-made reflecting surface 183 as reflecting surfaces and the first and second optical surfaces 181 and 182 as refracting surfaces into parallel pencil groups whose curvature of field is extremely small.

The image display device 170 according to the present invention includes an image display element 144, collimating optical system to form the light projected from the image display element 144 into parallel pencil groups, and waveguide optical system to guide the group of parallel pencils projected from the collimating optical system by internal total reflection. By forming the collimating optical system from a combination of the aluminum-made reflecting surface 183 as a reflecting optical element and the first and second optical surfaces 181 and 182 as optical lenses, it is possible to implement a collimator compact and of which the curvature of field is extremely small for an improved image resolution of the image display device and a more compact and lightweight of the entire device.

Also, in the image display device 170 according to the present invention, the collimating optical system can be designed further shorter and more compact and the image display device 170 itself can be designed more compact by providing the prism 180 having at least a total-reflecting surface in the collimating optical system.

Twelfth Embodiment

Figure 34:
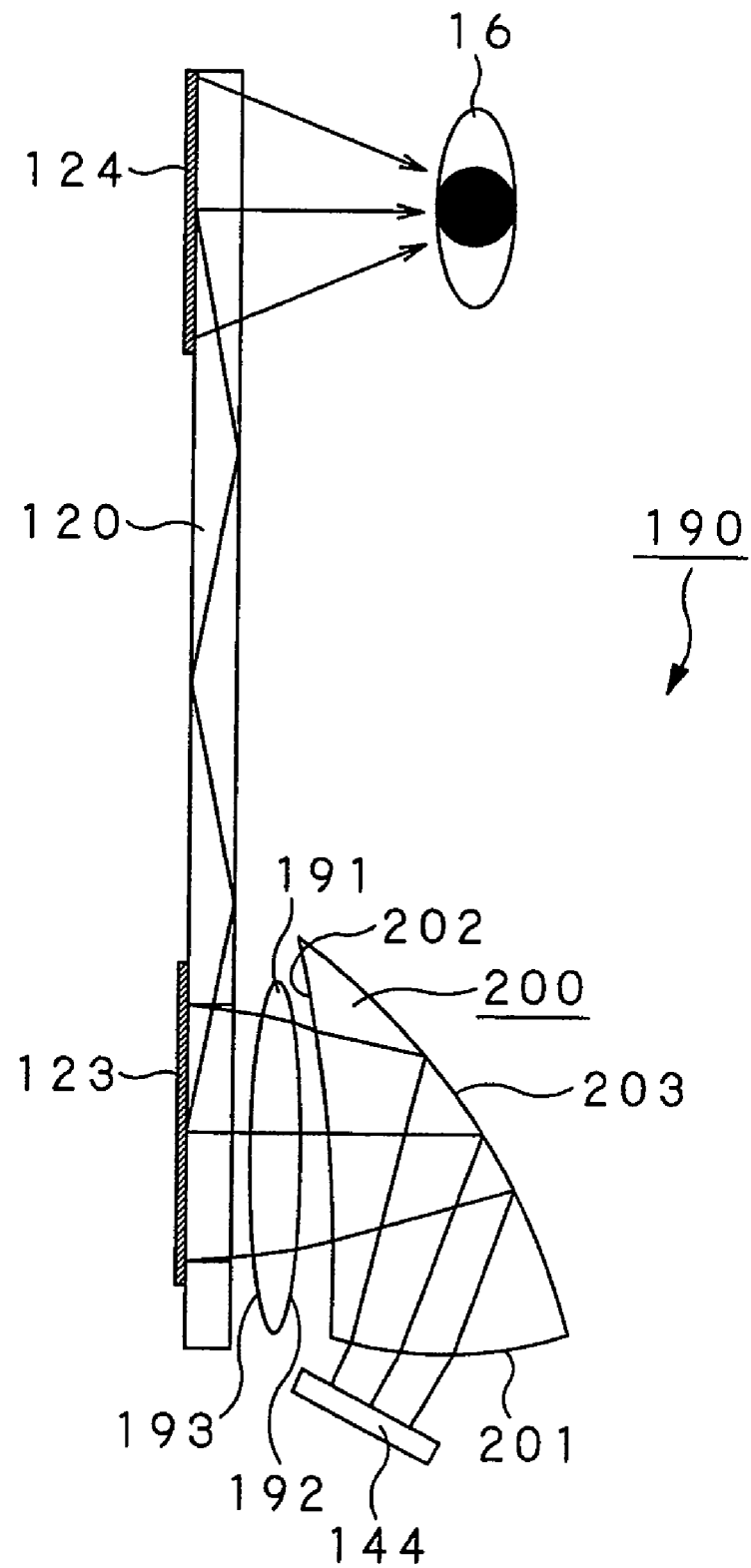
FIG. 34 is a side elevation of an image display device as a twelfth embodiment of the present invention.

FIG. 34 shows an image display device as a twelfth embodiment of the present invention. The image display device is generally indicated with a reference numeral 190.

The image display device 190 includes an image display element 144 to display an image, and a virtual image optical system to guide incident display light displayed on the image display element 144 to a pupil 16 of the viewer.

The virtual image optical system includes a collimating optical system and waveguide optical system. The waveguide optical system includes an optical waveguide 120, and first and second reflecting hologram elements 123 and 124 provided on the optical waveguide 120.

The collimating optical system includes a prism 200 having at least one total-reflecting surface and an optical lens 191. It is an optical system to project light projected from an arbitrary position on the image display surface of the image display element 144 as parallel pencil groups.

The optical lens 191 has a first optical surface 192 provided at the prism 200 and a second optical surface 193 provided at the optical waveguide 120.

The prism 200 includes a first optical surface 201 provided at the light-incident side upon which the display light from the image display element 144 is incident and having no axis of rotational symmetry, a second optical surface 202 provided at the light-outgoing side and having no axis of rotational symmetry, and an aluminum-made reflecting surface 203 as a third optical surface also contributed to the total reflection.

The pencil projected from the image display element 144 is incident upon the prism 200 formed from the optical surfaces having no axis of rotational symmetry first at the first optical surface 201. The pencil incident into the prism 200 is reflected at the aluminum-made reflecting surface 203, then refracted and pass by the second optical surface 202 and incident upon the optical waveguide 120 through the first and second optical surfaces 192 and 193 of the optical lens 191.

The light incident upon the optical waveguide 120 is reflected by the first reflection hologram element 123 to be total-reflected inside the optical waveguide 120, and travels while being total-reflected inside the optical waveguide 120. Then, it is reflected by the second reflection hologram element 124 provided at the other end to depart from the condition of total reflection, projected from the optical waveguide 120 and incident upon the pupil 16 of the viewer.

At this time, the divergent light projected from the image display element 144 is formed by a combination of the aluminum-coated reflecting surface 203 and first and second optical surfaces 201 and 202 as refracting surfaces and the first and second optical surfaces 192 and 193 of the optical lens 191 into parallel pencil groups whose curvature of field is very small.

The image display device 190 according to the present invention includes an image display element 144, collimating optical system to form the light projected from the image display element 144 into parallel pencil groups, and waveguide optical system to guide the group of parallel pencils projected from the collimating optical system by internal total reflection. By forming the collimating optical system from a combination of the aluminum-made reflecting surface 203 as a reflecting optical element and the first and second optical surfaces 201 and 202 as optical lenses and optical lens 191, it is possible to implement a collimator compact and of which the curvature of field is extremely small for an improved image resolution of the image display device and a more compact and lightweight of the entire device.

Also, by providing the prism 200 having at least a total-reflecting surface in the collimating optical system of the image display device 190 according to the present invention, the collimating optical system can be designed further shorter and more compact and the image display device 190 itself can be designed more compact.

Thirteenth Embodiment

Figure 35:
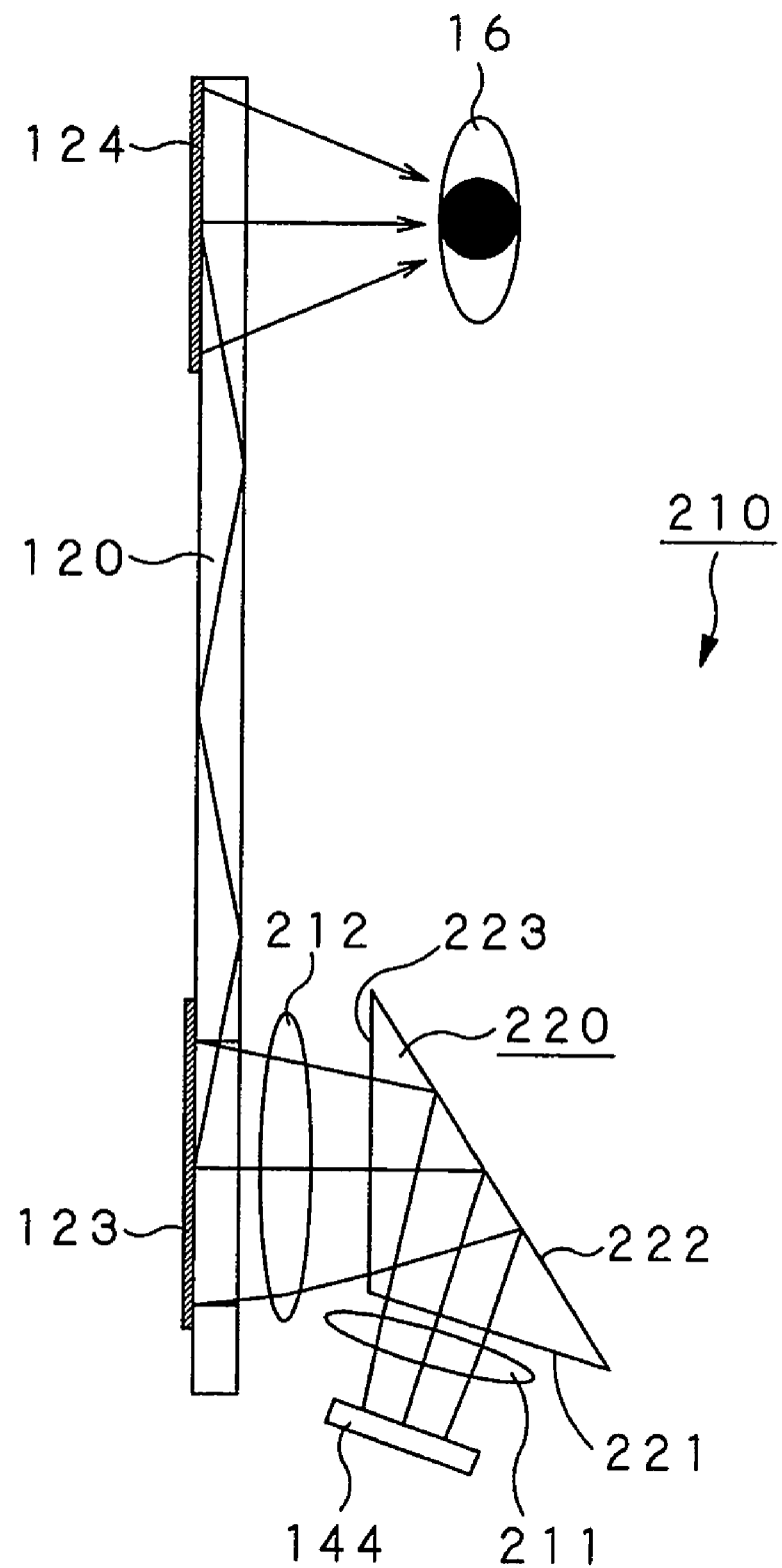
FIG. 35 is a side elevation of an image display device as a thirteenth embodiment of the present invention.

FIG. 35 shows an image display device as a thirteenth embodiment of the present invention. The image display device is generally indicated with a reference numeral 210.

The image display device 210 includes an image display element 144 to display an image, and a virtual image optical system to guide incident display light displayed on the image display element 144 to a pupil 16 of the viewer.

The virtual image optical system includes a collimating optical system and waveguide optical system.

The waveguide optical system includes an optical waveguide 120, and first and second reflecting hologram elements 123 and 124 provided on the optical waveguide 120.

The collimating optical system includes a triangular prism 220 having at least one total-reflecting surface, first optical lens 211 disposed between the image display element 144 and triangular prism 220 and a second optical lens 212 disposed between the triangular prism 220 and optical waveguide 120. It is an optical system to project light projected from an arbitrary position on the image display surface of the image display element 144 as parallel pencil groups.

The triangular prism 220 has a first optical surface 221 provided at the light-incident side where the display light from the image display element 144 is incident, reflecting surface 222 as a second optical surface to totally reflect the pencil, and a third optical surface 223 provided at the light-outgoing side.

The pencil projected from the image display element 144 is incident upon the triangular prism 220 defined by planes first at the first optical surface 221 through the first optical lens 211. The pencil incident into the triangular prism 220 is reflected at the aluminum-made reflecting surface 222, then passes by the third optical surface 223, and is incident upon the optical waveguide 120 through the second optical lens 212.

The pencil incident upon the optical waveguide 120 is reflected by the first reflection hologram element 123 to be totally reflected inside the optical waveguide 120, and travels while being totally reflected inside the optical waveguide 120. Then, the pencil is reflected by the second reflection hologram element 124 provided at the other end to depart from the condition of total reflection, projected from the optical waveguide 120, and incident upon the pupil 16 of the viewer.

The image display device 210 according to the present invention includes an image display element 144, collimating optical system to form the light projected from the image display element 144 into parallel pencil groups, and waveguide optical system to guide the group of parallel pencils projected from the collimating optical system by internal total reflection. By forming the collimating optical system from a combination of the reflecting surface 222 as a reflecting optical element and the first and third optical surfaces 221 and 223 as optical lenses and the first and second optical lenses 211 and 212, it is possible to implement a collimator compact and of which the curvature of field is extremely small for an improved image resolution of the image display device and a more compact and lightweight of the entire device.

Also, by providing the triangular prism 220 having at least a total-reflecting surface in the collimating optical system of the image display device 210 according to the present invention, the collimating optical system can be designed further shorter and more compact and the image display device 210 itself can be designed more compact.

Fourteenth Embodiment

Figure 36:
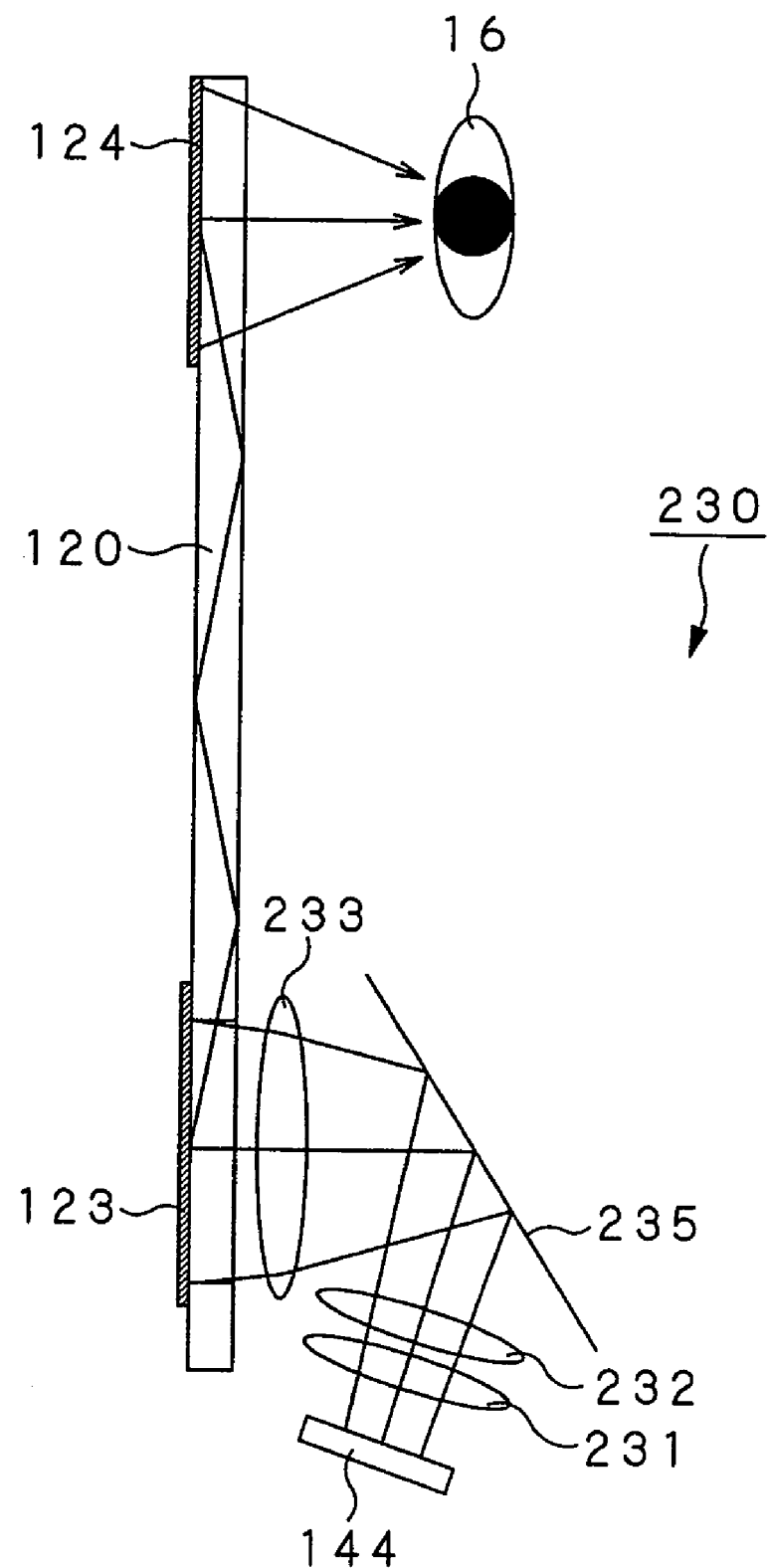
FIG. 36 is a side elevation of an image display device as a fourteenth embodiment of the present invention.

FIG. 36 shows an image display device as a fourteenth embodiment of the present invention. The image display device is generally indicated with a reference numeral 230.

The image display device 230 includes an image display element 144 to display an image, and a virtual image optical system to guide incident display light displayed on the image display element 144 to a pupil 16 of the viewer.

The virtual image optical system includes a collimating optical system and waveguide optical system. The waveguide optical system includes an optical waveguide 120, and first and second reflecting hologram elements 123 and 124 provided on the optical waveguide 120.

The collimating optical system includes a plane mirror 235 to totally reflect incident pencil, first and second optical lenses 231 and 232 disposed between the image display element 144 and plane mirror 235 and a third optical lens 233 disposed between the plane mirror 235 and optical waveguide 120.

The pencil projected from the image display element 144 passes by the first and second optical lenses 231 and 232, is reflected by the plane mirror 235, and then incident upon the optical waveguide 120 through the third optical lens 233.

The pencil incident upon the optical waveguide 120 is reflected by the first reflection hologram element 123 to be totally reflected inside the optical waveguide 120, and travels while being totally reflected inside the optical waveguide 120. Then, the pencil is reflected by the second reflection hologram element 124 provided at the other end to depart from the condition of total reflection, projected from the optical waveguide 120, and incident upon the pupil 16 of the viewer.

The image display device 230 according to the present invention includes an image display element 144, collimating optical system to form the light projected from the image display element 144 into parallel pencil groups, and waveguide optical system to guide the group of parallel pencils projected from the collimating optical system by internal total reflection. By forming the collimating optical system from a combination of the plane mirror 235 as a reflecting optical element and the first to third optical surfaces 231, 232 and 233, it is possible to implement a collimator compact and of which the curvature of field is extremely small for an improved image resolution of the image display device and a more compact and lightweight of the entire device.

Also, by providing the plane mirror 235 having at least a total-reflecting surface in the collimating optical system of the image display device 230 according to the present invention, the collimating optical system can be designed further shorter and more compact and the image display device 230 itself can be designed more compact.

Fifteenth Embodiment

Figure 37:
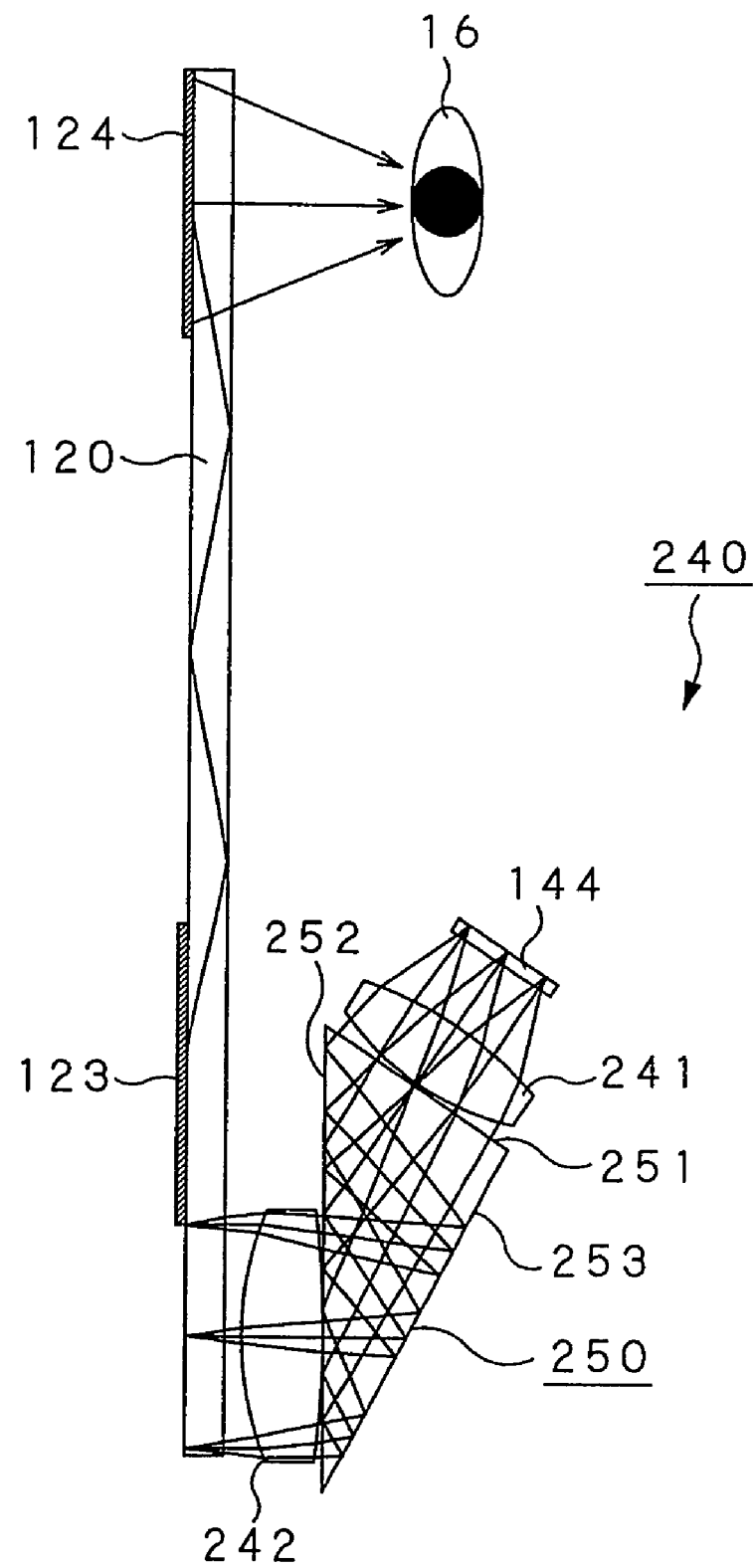
FIG. 37 is a side elevation of an image display device as a fifteenth embodiment of the present invention.

FIG. 37 shows an image display device as a fifteenth embodiment of the present invention. The image display device is generally indicated with a reference numeral 240.

The image display device 240 includes an image display element 144 to display an image, and a virtual image optical system to guide incident display light displayed on the image display element 144 to a pupil 16 of the viewer.

The virtual image optical system includes a collimating optical system and waveguide optical system. The waveguide optical system includes an optical waveguide 120, and first and second reflecting hologram elements 123 and 124 provided on the optical waveguide 120.

The collimating optical system includes a triangular prism 250 having at least one total-reflecting surface, first optical lens 241 disposed between the image display element 144 and triangular prism 250 and a second optical lens 242 disposed between the triangular prism 250 and optical waveguide 120. It is an optical system to project light projected from an arbitrary position on the image display surface of the image display element 144 as parallel pencil groups.

The triangular prism 250 has a first optical surface 251 provided at the light-incident side where the display light from the image display element 144 is incident, second optical surface 252 provided at the light-outgoing side and contributed to both the internal total reflection and refraction, and a aluminum-coated reflecting surface 253 as a third optical surface to totally reflect the pencil.

The pencil projected from the image display element 144 passes by the first optical lens 241, and is incident upon the triangular prism 250 defined by planes first at the optical surface 251 through the first optical lens 241. The pencil incident into the triangular prism 250 is reflected at the second optical surface 252 as an internal total-reflecting surface, and then re-reflected by the aluminum-coated reflecting surface 253. The reflected light is incident again upon the second optical surface 252. This time, however, the reflected light does not meet the condition of total reflection. So, it passes by the second optical surface 252 and then is incident upon the optical waveguide 120 through the second optical lens 242.

The pencil incident upon the optical waveguide 120 is diffracted and reflected by the first reflection hologram element 123 to be totally reflected inside the optical waveguide 120, and travels while being totally reflected inside the optical waveguide 120. Then, the pencil is reflected by the second reflection hologram element 124 provided at the other end to depart from the condition of total reflection, projected from the optical waveguide 120, and incident upon the pupil 16 of the viewer.

The image display device 240 according to the present invention includes an image display element 144, collimating optical system to form the light projected from the image display element 144 into parallel pencil groups, and waveguide optical system to guide the group of parallel pencils projected from the collimating optical system by internal total reflection. By forming the collimating optical system from a combination of the aluminum-coated reflecting surface 253 as a reflecting optical element and the first and second optical surfaces 251 and 252 as optical lenses and the first and second optical lenses 241 and 242, it is possible to implement a collimator compact and of which the curvature of field is extremely small for an improved image resolution of the image display device and a more compact and lightweight of the entire device.

Also, by providing the triangular prism 250 having at least a total-reflecting surface in the collimating optical system of the image display device 240 according to the present invention, the collimating optical system can be designed further shorter and more compact and the image display device 210 itself can be designed more compact.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

What is claimed is:

1. An image display device comprising: an image display element; an optical system; an optical waveguide; a transparent substrate; a first diffraction grating and a second diffraction grating each diffraction grating on a portion of the optical waveguide, and an air space in-between a surface of the optical waveguide and the transparent substrate, the air space being where the first diffraction grating and the second diffraction grating are not present on the optical waveguide; wherein, the optical waveguide is configured to receive light from the image display element via the optical system, and the transparent substrate is at the side where the first and second diffraction gratings are provided.

2. The image display device according to claim 1, further comprising a light shield for preventing leakage of the light through the first diffraction grating from the image display element.

3. The image display device according to claim 1, wherein, a part of the light guided through the optical waveguide is configured to be totally reflected a different number of times in the optical waveguide.

4. The image display device according to claim 1, wherein the first diffraction grating or/and the second diffraction grating have a plurality of interference fringes.

5. The image display device according to claim 1, wherein the first diffraction grating or/and the second diffraction grating have some layers stacked together each having an interference fringe.

6. The image display device according to claim 1, wherein the area of the second diffraction grating is larger than the area of the first diffraction grating.

7. The image display device according to claim 1, wherein interference fringes of the first and the second diffraction grating are recorded with the same pitch.

8. A head mounted display system comprising: an image display element; an optical system; an optical waveguide; a transparent substrate; a first diffraction grating and a second diffraction grating each diffraction grating on a portion of the optical waveguide; and an air space in-between a surface of the optical waveguide and the transparent substrate, the air space being where the first diffraction grating and the second diffraction grating are not present on the optical waveguide, wherein, the optical waveguide is configured to receive light from each pixel of the image display element via the optical system, and the transparent substrate is at the side thereof where the first and second diffraction gratings are provided.

* * * * *